US012792036B2

(12) United States Patent
Johnson et al.

(10) Patent No.: US 12,792,036 B2
(45) Date of Patent: Nov. 10, 2026

(54) AUTONOMOUS-READY VEHICLE

(71) Applicant: Polaris Industries Inc., Medina, MN (US)

(72) Inventors: Forrest W. Johnson, Stacy, MN (US); Jacob P. Horky, Shoreview, MN (US); Austin R. Bartz, Forest Lake, MN (US); Bradley A. Bracht, Salol, MN (US); Christopher Brown, Forest Lake, MN (US); David E. Foster, Wyoming, MN (US); Jacob H. Gerten, Chisago City, MN (US); Curtis DJ Johnson, Minneapolis, MN (US); Eric L. Ross, Howell, MI (US); Patrick D. Weldon, Roseville, MN (US); Jonathan Little, Roseau, MN (US); Michael A. Thomas, Salol, MN (US); Aidan B. Shaughnessy, Overland Park, KS (US); Kevin Dunn, Fenton, MI (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/219,258

(22) Filed: Jul. 7, 2023

(65) Prior Publication Data

US 2024/0012411 A1 Jan. 11, 2024

Related U.S. Application Data

(60) Provisional application No. 63/359,316, filed on Jul. 8, 2022.

(51) Int. Cl.

| | |
|---|---|
| ***G05D 1/00*** | (2024.01) |
| ***B60W 30/04*** | (2006.01) |

(Continued)

(52) U.S. Cl.

CPC ........... *G05D 1/0038* (2013.01); *B60W 30/04* (2013.01); *B60W 40/112* (2013.01);

(Continued)

(58) Field of Classification Search

None

See application file for complete search history.

(56) References Cited

U.S. PATENT DOCUMENTS 5,155,683 A 10/1992 Rahim
10,828,954 B2 * 11/2020 Mohamed ............... H04W 4/02

(Continued)

FOREIGN PATENT DOCUMENTS

AU 2023303034 A1 1/2025
CA 3261356 A1 1/2024

(Continued)

OTHER PUBLICATIONS

"European Application Serial No. 23748929.9, Communication Pursuant to Article 94(3) EPC mailed Jan. 29, 2026", 6 pgs.

(Continued)

*Primary Examiner* — Arslan Azhar

(74) *Attorney, Agent, or Firm* — SCHWEGMAN LUNDBERG & WOESSNER, P.A.

(57) ABSTRACT

The present disclosure relates to vehicle teleoperation and systems and methods for an autonomous-ready vehicle. As an example, the described aspects may provide a variety of functionality, including the use of a teleoperation assembly to provide a third-person perspective for vehicle teleoperation, vehicle width fit checking for a set of obstacles and an associated clearance, semi-autonomous clearance navigation, dynamic vehicle standoff adjustment according to a communication latency associated with teleoperation, vehicle contents change detection and notification generation, path navigation with increased granularity based on (Continued)

ground-engaging member paths, autonomous anchoring for increased traction, vehicle configuration according to a determined three-dimensional center of mass, automatic rocking for improved terrain traversal, audio-aware path generation and vehicle routing, and annunciation of vehicle modes to nearby individuals.

19 Claims, 26 Drawing Sheets

(51) Int. Cl.
*B60W 40/112* (2012.01)
*B60W 40/13* (2012.01)

(52) U.S. Cl.
CPC ........... *B60W 40/13* (2013.01); *G05D 1/0022* (2013.01); *B60W 2422/10* (2013.01); *B60W 2520/18* (2013.01); *B60W 2556/45* (2020.02)

(56) References Cited

U.S. PATENT DOCUMENTS

| | | | | |
|---|---|---|---|---|
| 2018/0022324 | A1* | 1/2018 | Bosscher | G05D 1/0016 180/167 |
| 2022/0238987 | A1* | 7/2022 | Davis | H01Q 1/1242 |
| 2022/0340158 | A1* | 10/2022 | Chambers | B60W 50/14 |
| 2023/0051111 | A1* | 2/2023 | Cyrus | G01M 3/04 |
| 2023/0193591 | A1* | 6/2023 | Spielman, Jr. | G05D 1/0022 701/50 |
| 2023/0303373 | A1* | 9/2023 | Chiu | G05D 1/0061 |

FOREIGN PATENT DOCUMENTS

| | | | |
|---|---|---|---|
| EP | 4552001 | A1 | 5/2025 |
| FR | 3050089 | A1 | 10/2017 |
| WO | WO-2004059410 | A1 | 7/2004 |
| WO | WO-2024011210 | A1 | 1/2024 |

OTHER PUBLICATIONS

"European Application Serial No. 23748929.9, Response to Communication pursuant to Rules 161(1) and 162 EPC filed Aug. 15, 2025", 12 pgs.
"International Application Serial No. PCT/US2023/069757, International Preliminary Report on Patentability mailed Jan. 23, 2015", 11 pgs.
"International Application Serial No. PCT/US2023/069757, International Search Report mailed Dec. 4, 2023", 5 pgs.
"International Application Serial No. PCT/US2023/069757, Invitation to Pay Additional fees mailed Oct. 11, 2023", 12 pgs.
"International Application Serial No. PCT/US2023/069757, Written Opinion mailed Dec. 4, 2023", 9 pgs.
"Israel Application Serial No. 317981, Office Action mailed Apr. 26, 2026", 2 pgs.
"European Application Serial No. 23748929.9, Response filed May 27, 2026 to Communication Pursuant to Article 943 EPC mailed Jan. 29, 2026", 19 pgs.

* cited by examiner

Pole Retracted in Chassis

AUTONOMOUS-READY VEHICLE

RELATED APPLICATION

The present disclosure claims the benefit of U.S. Provisional Patent Application No. 63/359,316, filed Jul. 8, 2022, titled AUTONOMOUS-READY VEHICLE, the entire disclosure of which is expressly incorporated by reference herein.

BACKGROUND

Recreational vehicles, such as motorcycles or off-road vehicles such as all-terrain vehicles (ATVs), utility vehicles (UVs), side-by-side vehicles, and snowmobiles, may be used for a variety of purposes. These vehicles might be used on roads and/or trails and may be equipped with systems to control vehicle functionality and/or to facilitate remote control of the vehicle accordingly.

It is with respect to these and other general considerations that embodiments have been described. Also, although relatively specific problems have been discussed, it should be understood that the embodiments should not be limited to solving the specific problems identified in the background.

SUMMARY

In an example, a vehicle is provided. The vehicle comprises: a plurality of ground engaging members; a frame supported by the plurality of ground engaging members; a teleoperation assembly supported by a mast that is coupled to the frame of the vehicle, the teleoperation assembly configured to capture image data including the vehicle and at least a part of an environment of the vehicle; and a controller operably coupled the teleoperation assembly, the controller configured to: provide, to a remote computing device, image data of the teleoperation assembly; receive, from the remote computing device, a vehicle control command; and control operation of the vehicle based on the vehicle control command.

In another example, a method for processing teleoperation data obtained from a vehicle is provided. The method comprises: receiving, from the vehicle, teleoperation data including the vehicle and at least a part of an environment surrounding the vehicle; extracting, from the teleoperation data, a portion of the teleoperation data that is associated with the vehicle; processing the extracted portion of the teleoperation data to amplify movement of the vehicle, thereby generating an amplified representation of the vehicle; generating an amplified teleoperation view including the amplified representation of the vehicle and at least a part of the teleoperation data; and providing the amplified teleoperation view for display to a vehicle operator.

In a further example, a method for controlling vehicle operation according to a path of a ground-engaging member of a vehicle is provided. The method comprises: localizing the vehicle within an associated environment to generate a location for the vehicle; generating, for each ground-engaging member of the vehicle, an estimated location of the ground-engaging member within the environment based on the generated location for the vehicle; and providing, to another vehicle, an indication comprising: data associated with the environment of the vehicle; and the estimated locations for ground-engaging members of the vehicle.

In yet another example, a method for controlling vehicle operation according to a path of a ground-engaging member of a leader vehicle is provided. The method comprises: receiving, from the leader vehicle, an indication comprising environment data and a set of ground-engaging member locations of the leader vehicle; localizing, based on the environment data of the leader vehicle, the vehicle within an associated environment to generate a location for the vehicle; generating, an estimated location of a ground-engaging member of the vehicle within the environment based on the generated location for the vehicle; generating, based on the estimated location of the ground-engaging member and a corresponding ground-engaging member location received from the leader vehicle, a vehicle command; and controlling operation of the vehicle based on the generated vehicle command.

In a further still example, a method for controlling vehicle operation based on an estimated center of mass for a vehicle is provided. The method comprises: determining, based on the one or more suspension position sensors, a two-dimensional (2D) center of mass (COM) location along a longitudinal axis and a lateral axis; collecting, during operation of the vehicle, a set of driving experiences, wherein each driving experience includes a force experienced by the vehicle and a set of suspension positions determined by one or more suspension position sensors of the vehicle; processing the set of driving experiences to determine a vertical component of the COM along a vertical axis of the vehicle, thereby generating a three-dimensional (3D) COM for the vehicle, wherein vertical component of the COM is determined based at least in part on a change in a roll angle for the vehicle sensed by the one or more suspension position sensors; and configuring operation of the vehicle based on the determined 3D COM.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. The following detailed description is therefore not to be taken in a limiting sense, and the scope of the present disclosure is defined by the appended claims and their equivalents.

Figure 1:
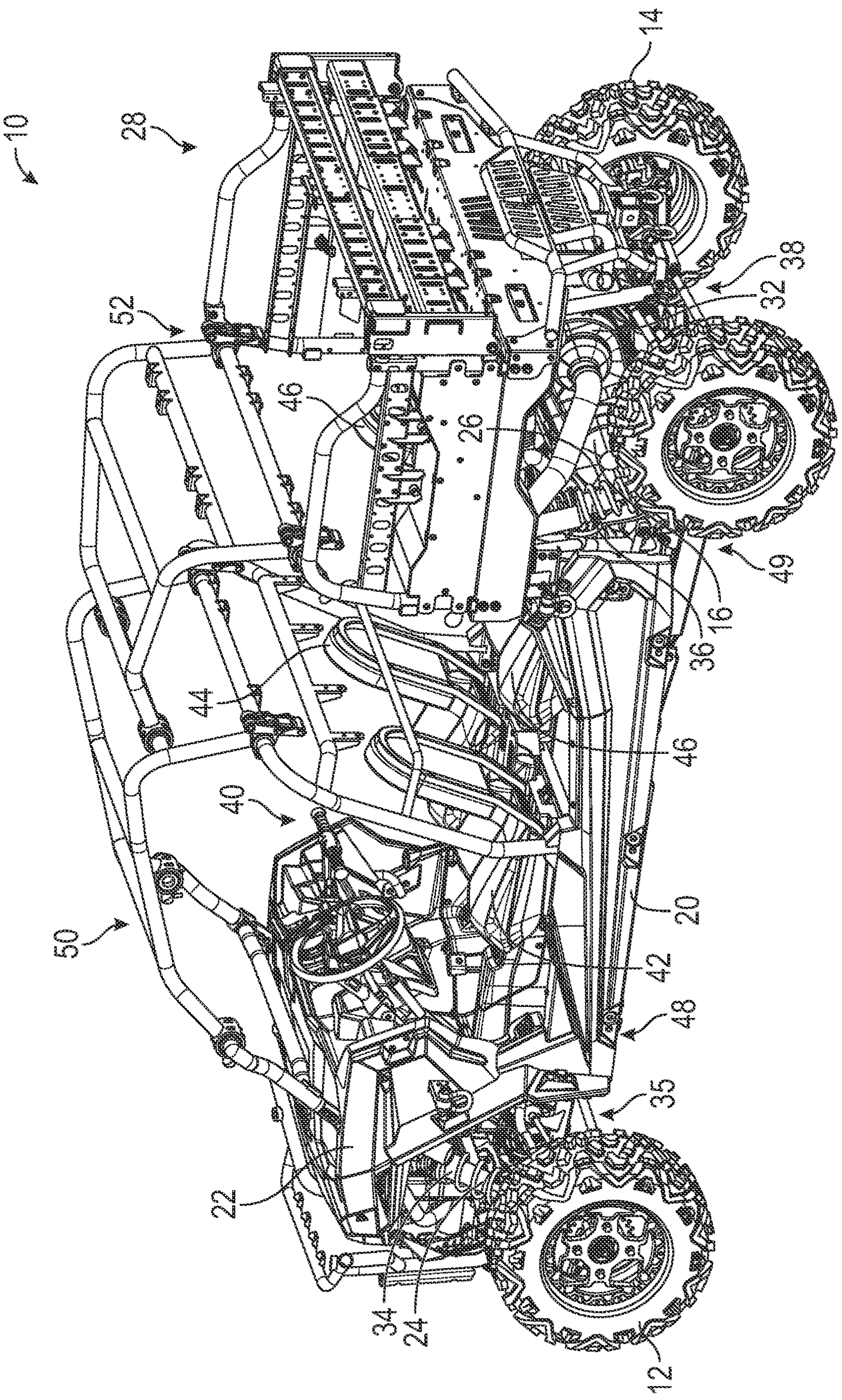
FIG. 1 is a rear left perspective view of an example utility vehicle of the present disclosure.

Referring to FIG. 1, an illustrative embodiment of a utility vehicle 10 is shown, and includes ground engaging members, including front ground engaging members 12 and rear ground engaging members 14, a powertrain assembly 16, a frame 20, a plurality of body panels 22 coupled to frame 20, a front suspension assembly 24, a rear suspension assembly 26, and a rear cargo area 28. In one embodiment, one or more ground engaging members 12, 14 may be replaced with tracks, such as the Prospector II tracks available from Polaris Industries, Inc. located at 2100 Highway 55 in Medina, Minnesota 55340, or non-pneumatic tires as disclosed in any of U.S. Pat. No. 8,109,308, filed on Mar. 26, 2008; U.S. Pat. No. 8,176,957, filed on Jul. 20, 2009; and U.S. Pat. No. 9,108,470, filed on Nov. 17, 2010; and U.S. Patent Application Publication No. 2013/0240272, filed on Mar. 13, 2013, the complete disclosures of which are expressly incorporated by reference herein. Vehicle 10 may be referred to as a utility vehicle ("UV"), an all-terrain vehicle ("ATV"), or a side-by-side vehicle ("S×S") and is configured for travel over various terrains or surfaces. More particularly, vehicle 10 may be configured for military, industrial, agricultural, or recreational applications.

Powertrain assembly 16 is operably supported on frame 20 and is drivingly connected to one or more of ground engaging members 12, 14. As shown in FIG. 1, powertrain assembly 16 may include an engine 30 and a transmission, for example a continuously variable transmission ("CVT") 32 and/or a shiftable transmission (not shown, and may be operably coupled to or included within a driveline assembly including front and rear differentials (not shown) and a drive shaft (not shown). Engine 30 may be a fuel-burning internal combustion engine, however, any engine assembly may be contemplated, such as hybrid, fuel cell, or electric engines or units. In one embodiment, powertrain assembly 16 includes a turbocharger (not shown) and engine 30 is a diesel internal combustion engine. Additional details of CVT 32 may be disclosed in U.S. Pat. Nos. 3,861,229; 6,176,796; 6,120,399; 6,860,826; and 6,938,508, the complete disclosures of which are expressly incorporated by reference herein.

Front suspension assembly 24 may be coupled to frame 20 and front ground engaging members 12. As shown in FIG. 1, front suspension assembly 24 includes a shock 34 coupled to each front ground engaging member 12 and a front axle arrangement which may include a front control arm assembly 35. Similarly, rear suspension assembly 26 may be coupled to frame 20 and rear ground engaging members 14. Illustratively, rear suspension assembly 26 includes a shock 36 coupled to each rear ground engaging member 14 and a rear axle arrangement 38. Additional details of powertrain assembly 16, the driveline assembly, and front suspension assembly 24 may be described in U.S. Pat. No. 7,819,220, filed Jul. 28, 2006, titled "SIDE-BY-SIDE ATV" and U.S. Patent Application Publication No. 2008/0023240, filed Jul. 28, 2006, titled "SIDE-BY-SIDE ATV"; and additional details of rear suspension assembly 26 may be described in U.S. Patent Application Publication No. 2012/0031693, filed Aug. 3, 2010, titled "SIDE-BY-SIDE ATV, the complete disclosures of which are expressly incorporated by reference herein.

Referring still to FIG. 1, vehicle 10 includes an operator area 40 supported by frame 20, and which includes seating for at least an operator and a passenger. Illustratively, one embodiment of vehicle 10 includes four seats, including an operator seat 42, a front passenger seat 44, and two rear passenger seats 46. More particularly, operator seat 42 and front passenger seat 44 are in a side-by-side arrangement, and rear passengers seats 46 also are in a side-by-side arrangement. Rear passenger seats 46 are positioned behind operator seat 42 and front passenger seat 44 and may be elevated relative to seats 42, 44. Operator seat 42 includes a seat bottom, illustratively a bucket seat, and a seat back. Similarly, front passenger seat 44 includes a seat bottom, illustratively a bucket seat, and a seat back. Likewise, each rear passenger seat 46 includes a seat bottom, illustratively a bucket seat, and a seat back.

Vehicle 10 further includes frame 20 supported by ground engaging members 12, 14. In particular, frame 20 includes a front frame portion 48 and a rear frame portion 49. Illustratively, rear frame portion 49 supports powertrain assembly 16 and rear cargo area 28. Vehicle 10 also includes an overhead or upper frame portion 50. Upper frame portion 50 is coupled to frame 20 and cooperates with operator area 40 to define a cab of vehicle 10. Additional details of vehicle 10 may be disclosed in U.S. Pat. No. 8,998,253, filed Mar. 28, 2013, the complete disclosure of which is expressly incorporated by reference herein.

Additional example aspects of vehicle 10 may be disclosed in U.S. Pat. No. 10,118,477, the complete disclosure of which is expressly incorporated by reference herein.

Figure 2:
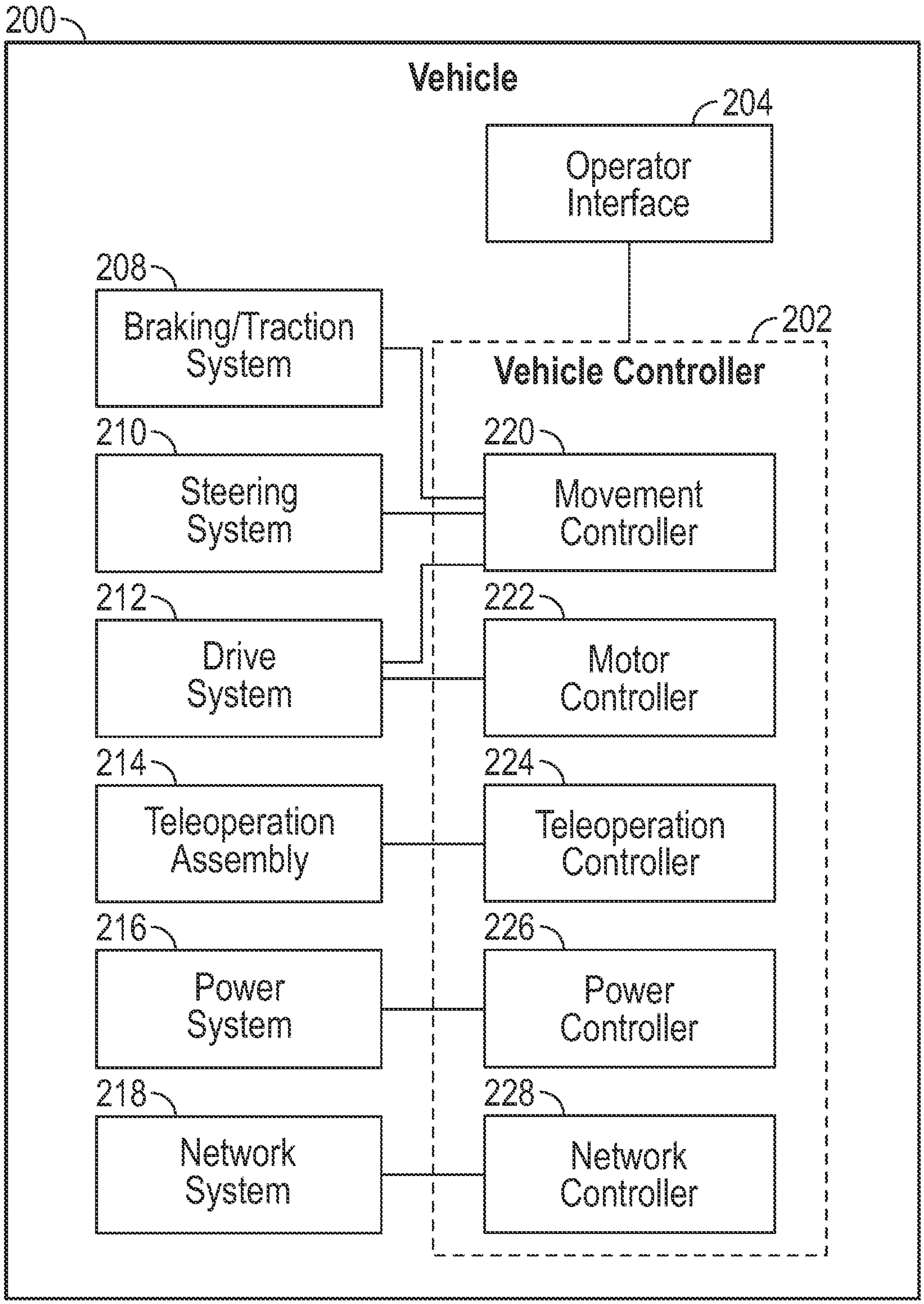
FIG. 2 is a representative view of an example vehicle according to aspects described herein.

FIG. 2 is a representative view of an example vehicle 200 according to aspects described herein. Aspects of vehicle 200 are similar to vehicle 10 discussed above with respect to FIG. 1 and are therefore not redescribed below in detail. For example, vehicle 200 may be a hybrid vehicle (e.g., having both an internal combustion engine 30 and a traction motor, not pictured), may be an electric vehicle, or may be an internal combustion vehicle, among other examples.

As illustrated, vehicle 200 includes vehicle controller 202 and operator interface 204. In examples, operator interface 204 includes at least one input device (not pictured) and at least one output device (not pictured). Example input devices include levers, buttons, switches, touch screens, soft keys, and other suitable input devices. Example output devices include lights, displays, audio devices, tactile devices, and other suitable output devices. An operator may signal to vehicle controller 202 to alter the operation of one or more systems of vehicle 200 through the input devices.

Vehicle controller 202 has at least one processor and at least one associated memory. Vehicle controller 202 may be a single device or a distributed device, and the functions of the vehicle controller 202 may be performed by hardware and/or as computer instructions on a non-transitory computer readable storage medium, such as the associated memory.

As illustrated, vehicle controller 202 includes movement controller 220, motor controller 222, teleoperation controller 224, power controller 226, and network controller 228. In examples, vehicle controller 202 controls functionality of vehicle 200, including braking/traction system 208, steering system 210, drive system 212, teleoperation system 214, power system 216, and network system 218. Vehicle controller 202 may communicate with systems of vehicle 200 using any of a variety of protocols, including, but not limited to, a controller area network (CAN) bus, an Ethernet or BroadR-Reach connection, a fiber connection, a universal serial bus (USB) connection, and/or a wireless connection.

As illustrated, movement controller 220 communicates with braking/traction system 208, steering system 210, and drive system 212. For example, movement controller 220 may control the pressure and frequency of the actuation of one or more brake calipers of braking/traction system 208, a steering angle of one or more ground engaging members (e.g., ground engaging members 12, 14) of steering system 210, and/or a power output of one or more engines (e.g., engine 20) and/or electric motors (e.g., a traction motor and/or an electric motor) of drive system 212, for example via a transmission. While example aspects are described herein with respect to braking/traction system 208 and/or steering system 210, it will be appreciated that similar techniques may be used in instances where drive system 212 includes an individual drive motor for each ground engaging member. For example, a set of drive motors may be used to provide vehicle stability aspects as an alternative to or in addition to control of braking/traction system 208 and/or steering system 210.

Drive system 212 may further include powertrain assembly 16. In examples, movement controller 220 may receive user input via external controls (e.g., of operator interface 204) and control system 208, 210, and/or 212 accordingly. In other examples, vehicle controller 202 may be an autonomous-ready system that automatically affects operation of vehicle 200 in response to detected conditions of the vehicle and/or the environment in which the vehicle is operating. As another example, vehicle 200 may be controlled by a remote device via teleoperation using teleoperation controller 224, for example based on data generated by teleoperation assembly 214 and transmitted to the remote device. Additionally, or alternatively, teleoperation controller 224 receives an indication from a remote device (e.g., a mobile computing device of a vehicle operator or other individual) to activate a camera of teleoperation assembly 214, such that image data from the camera is transmitted to the remote device, where it is displayed to a user of the device accordingly. In examples, the teleoperation assembly is activated even in an instance where the vehicle is in park or is otherwise powered off, thereby permitting an individual to monitor the surrounding environment of the vehicle. Additional examples of these and other aspects are described in greater detail below.

In examples where movement controller 220 controls an electric motor, movement controller 220 may communicate with motor controller 222 to control the electric motor accordingly. For example, motor controller 222 may control power provided from power system 216 to control the power output of the electric motor. Power system 216 includes any of a variety of power sources, including, but not limited to, battery packs and a motor/generator. In examples, an electric motor of drive system 212 operates using multiple phases of alternating current (AC) power, such that motor controller 222 adapts power from power system 216 according to supply power to the electric motor accordingly. For example, motor controller 222 may provide three-phase AC power.

As noted above, power system 216 provides power to an electric motor of drive system 212. In examples, power system 216 provides power for other functionality of vehicle 200, such as operator interface 204, vehicle controller 202, braking/traction system 208, steering system 210, drive system 212, teleoperation system 214, and network system 218. In some instances, power system 216 includes a high-voltage power system associated with drive system 212 and other high-voltage vehicle functionality, as well as a low-voltage power system that is associated with vehicle controller 202 and other low-voltage vehicle functionality.

Vehicle 200 is further illustrated as including network system 218 and network controller 228. Network controller 228 may control communications between vehicle 200 and other vehicles and/or devices. For example, network system 218 may be used to communicate via a local area network, a peer-to-peer network, the Internet, or any of a variety of other networks. In one embodiment, network controller 228 communicates with paired devices utilizing a BLUETOOTH or WI-FI protocol. In this example, network system 218 may include a radio frequency antenna. Network controller 228 controls the pairing of devices to vehicle 200 and the communications between vehicle 200 and such remote devices.

As an example, a remote computing device (e.g., a mobile computing device or a tablet computing device) may be used to control aspects of vehicle 200. Control by the remote computing device may be similar to the control functionality provided by operator interface 204. For example, an operator may view image/video data from one or more cameras of the vehicle and may provide user input to control vehicle 200 accordingly. It will be appreciated that any number of networks, network types, and associated technologies may be used. For example, network system 218 may include a cellular antenna, a satellite antenna, and/or one or more components for wired communication.

As noted above, vehicle controller 202 may be an autonomous-ready system. For example, vehicle controller 202 may monitor systems and sensors of vehicle 200 and affect operation of vehicle 200 accordingly. As another example, a teleoperation system of vehicle 200 (e.g., including teleoperation assembly 214 and teleoperation controller 224) may be used to facilitate remote control of vehicle 200 based on any of a variety of sensors. Example sensors include a vehicle speed sensor, an engine RPM sensor, a suspension position sensor, an inertial measurement unit (IMU), a global positioning system (GPS) sensor, a temperature sensor, a voltage sensor, a current sensor, a proximity sensor, an ultrasonic sensor, an image sensor, a light detection and ranging (LIDAR) sensor, and/or a radio detection and ranging (RADAR) sensor, among other examples. Operation of vehicle 200 may be affected by controlling one or more of systems 208, 210, and 212, among other examples. Additional teleoperation and autonomous-ready control aspects are discussed below.

Smart-Damped Mast for Third-Person Camera

Figure 3:
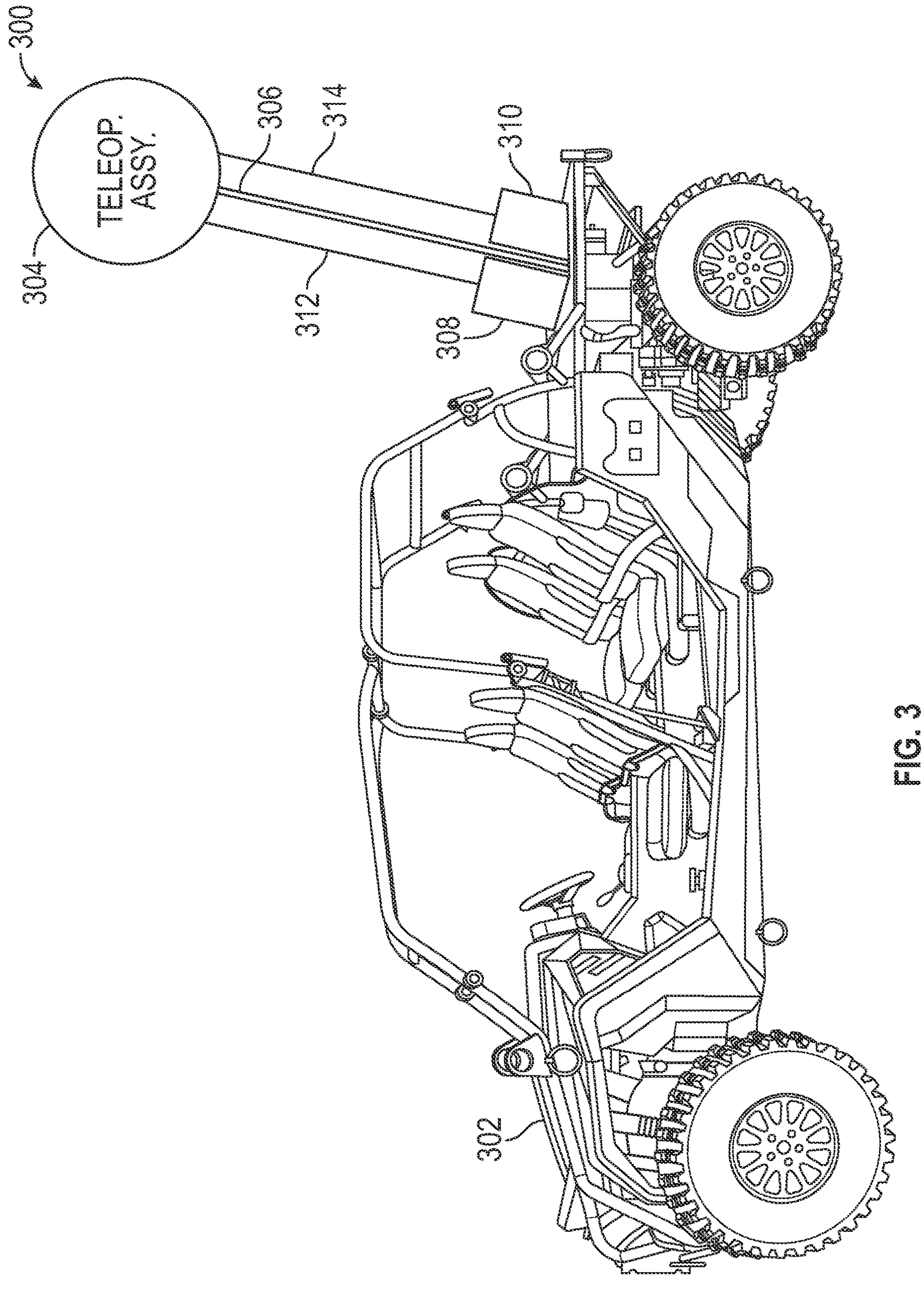
FIG. 3 illustrates a conceptual diagram of a vehicle including a teleoperation assembly according to aspects of the present disclosure.

In examples, a vehicle according to aspects of the present disclosure includes a teleoperation assembly with which data associated with the vehicle and/or the vehicle environment may be captured. For example, FIG. 3 illustrates a conceptual diagram 300 of vehicle 302 that includes teleoperation assembly 304.

Teleoperation assembly 304 may include any of a variety of sensors, including, but not limited to, one or more image sensors, LIDAR sensors, and/or RADAR sensors. For example, teleoperation assembly 304 may include a 180- or 360-degree camera, which may include multiple lenses and/or image sensors so as to have a high angular coverage (e.g., covering substantially all of vehicle 302 and/or its immediate environment). As compared to a pan-tilt-zoom camera or other image capture solutions, use of a 180- or 360-degree camera may enable improved visibility of the vehicle and surrounding environment without waiting for reconfiguration of the camera (e.g., operating a motor to pan and/or tilt the camera).

For example, as compared to instances where a third-person view is provided using a combination of sensors positioned around vehicle 302, teleoperation assembly 304 provides a perspective that includes both vehicle 302 and its surrounding environment, which may provide improved feedback by enabling a vehicle operator to view how the vehicle interacts with its environment (e.g., as it maneuvers around obstacles or across terrain). Additionally, teleoperation assembly 304 may enable greater visibility of "negative terrain," which may be difficult or otherwise impossible to see from an operator area of the vehicle (e.g., operator area 40 of vehicle in FIG. 1) or from a set of sensors in substantially the same plane as the frame of the vehicle. As compared to coverage provided by a drone or other aerial vehicle, teleoperation assembly 304 may be powered by vehicle 302, thereby improving operating time and reducing the likelihood of gaps in coverage.

In some examples, teleoperation assembly 304 may include communication hardware and/or data processing hardware. For example, sensor data of teleoperation assembly 304 may be processed (e.g., by teleoperation controller 224) and/or may be provided to a remote computing device for processing and/or display. As another example, teleoperation assembly 304 may be electrically coupled to vehicle 302, such that it may be powered by vehicle 302 and/or may communicate with a controller of vehicle 302 accordingly (e.g., vehicle controller 202 in FIG. 2).

As illustrated, teleoperation assembly 304 is located toward the rear of vehicle 302 and is coupled to vehicle 302 by mast 306. With reference to FIG. 1, mast 306 may be coupled to a rear portion 52 of upper frame 50 (e.g., behind operator area 40). As a result of positioning teleoperation assembly 304 above and toward the rear of vehicle 302, a "third-person view" of vehicle 302 and its surrounding environment is provided. While example configurations are illustrated, it will be appreciated that a teleoperation assembly may be located in any of a variety of other positions in other examples.

In examples, mast 306 may be a flexible mast, thereby dampening forces that are introduced as a result of movement by vehicle 302 and by obstacles encountered by vehicle 302 as it moves through the environment. Additionally, or alternatively, electromechanical dampeners 308 and 310 may be coupled to teleoperation assembly 304 using cables 312 and 314, respectively, such that electromechanical dampeners 308 and 310 may be used to control the tension of cables 312 and 314 to dampen forces that would otherwise be experienced by teleoperation assembly 304. Additional aspects of mast control are discussed below. It will thus be appreciated that any of a variety of dampening means may be used.

Retractable Flexible Mast in Rolled Metal Chassis Structure

Figure 4A:
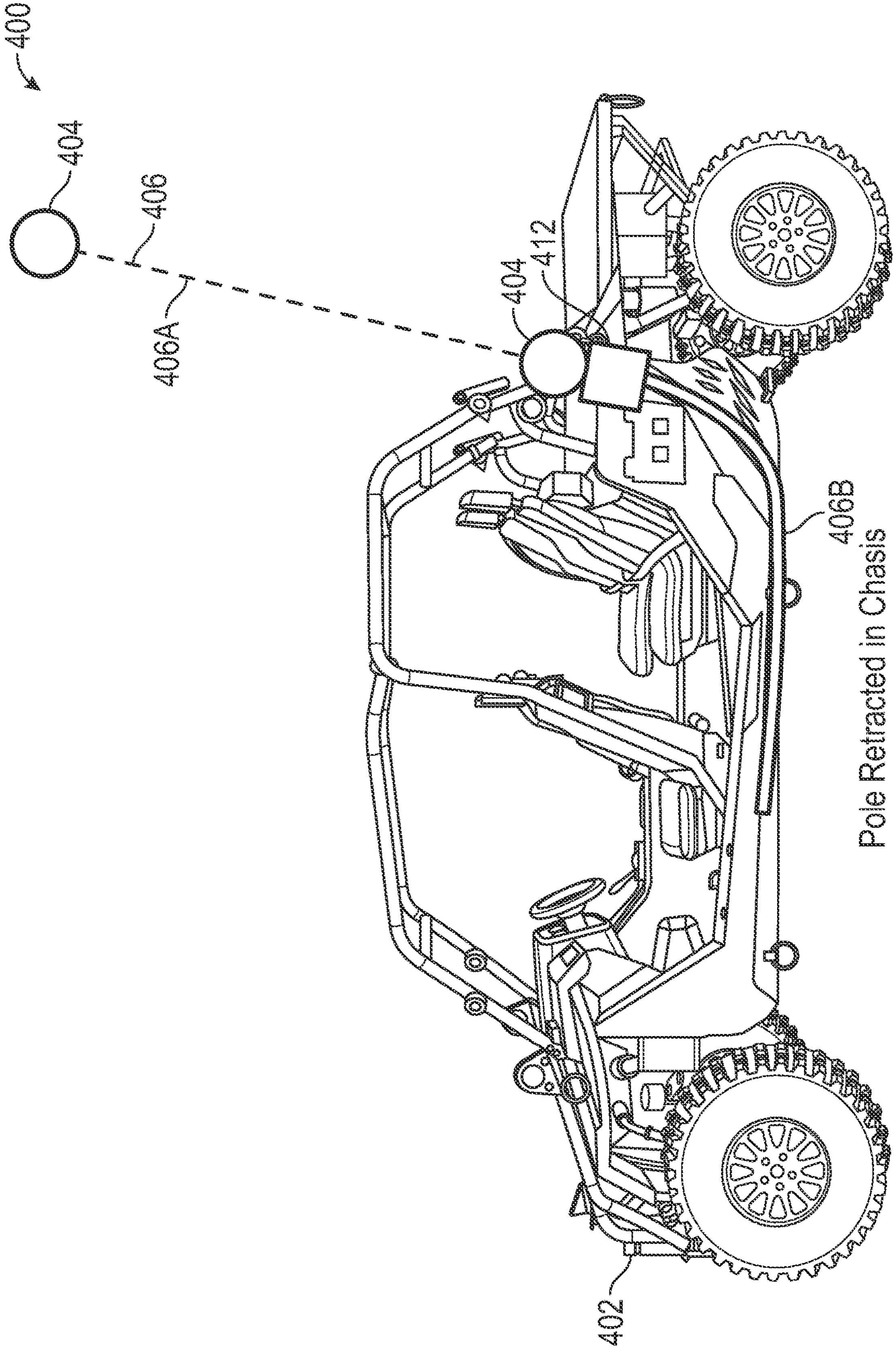
FIG. 4A illustrates a conceptual diagram showing example configurations for a mast on which a teleoperation assembly is mounted to a vehicle.

A mast on which a teleoperation assembly is mounted may be retractable, as depicted by conceptual diagram 400 in FIG. 4A. Aspects of vehicle 402, teleoperation assembly 404, and mast 406 are similar to those discussed above with respect to FIG. 3 and are therefore not redescribed in detail. As illustrated, mast 406 may have an extended configuration 406A (indicated by the dashed line) and a retracted configuration 406B (indicated by the solid line). Motor assembly 412 may be used to extend and retract mast 406, thereby raising and lowering teleoperation assembly 404 accordingly.

While the instant example is illustrated as having extended configuration 406A and retracted configuration 406B, it will be appreciated that mast 406 may be extended or retracted at any of a variety of positions between illustrated configurations 406A and 406B, such that teleoperation assembly 404 may be positioned at any of a variety of heights above vehicle 402.

For example, teleoperation assembly 404 may be lowered to a height below that of a detected obstacle (e.g., as may have been detected by one or more sensors of vehicle 402 and/or teleoperation assembly 404) and may subsequently be raised to fully extended configuration 406A after vehicle 402 has passed the detected obstacle. As another example, a vehicle operator may retract mast 406 so as to position teleoperation assembly 404 closer to vehicle 402 and/or its surrounding environment, thereby enabling the vehicle operator to obtain a closer view.

In examples, at least a part of the chassis of vehicle 402 (or, as another example, a rollover protection structure) may include one or more hollow metal tubes or other chassis members, such that mast 406 may be retracted (e.g., by motor assembly 412) into a hollow member of vehicle 402 accordingly. In examples, motor assembly 412 further includes a seal at an opening to the hollow member, thereby reducing the potential for fluid/debris ingress to the frame of vehicle 402. Additionally, or alternatively, an anti-corrosive coating could be used on the inside of such a hollow member, thereby reducing the likelihood of structural fatigue and/or surface contamination within the chassis of vehicle 402.

It will be appreciated that an opening through which mast 406 is received may be placed at any of a variety of other locations of vehicle 402. For example, the opening may be placed at the top of upper frame 454, such that a shorter mast may be used to place teleoperation assembly 404 at a desired location in extended configuration 406A. Similarly, such a location may enable at least partial use of teleoperation assembly 404 in fully retracted configuration 406B. As another example, the opening may be located above a waterline of vehicle 402.

As compared to instances where a telescoping or scissor-type mast is used, aspects of the present disclosure may provide reduced mechanical complexity and may thus have fewer associated points of failure. Additionally, as a result of storing mast 406 within the chassis of vehicle 402, teleoperation assembly 404 and mast 406 may occupy less space within vehicle 402 (e.g., in retracted configuration 406B) as compared to a configuration in which separate storage is used to store retracted mast 406B.

Mechanically Selectable Camera Position

Figure 4B:
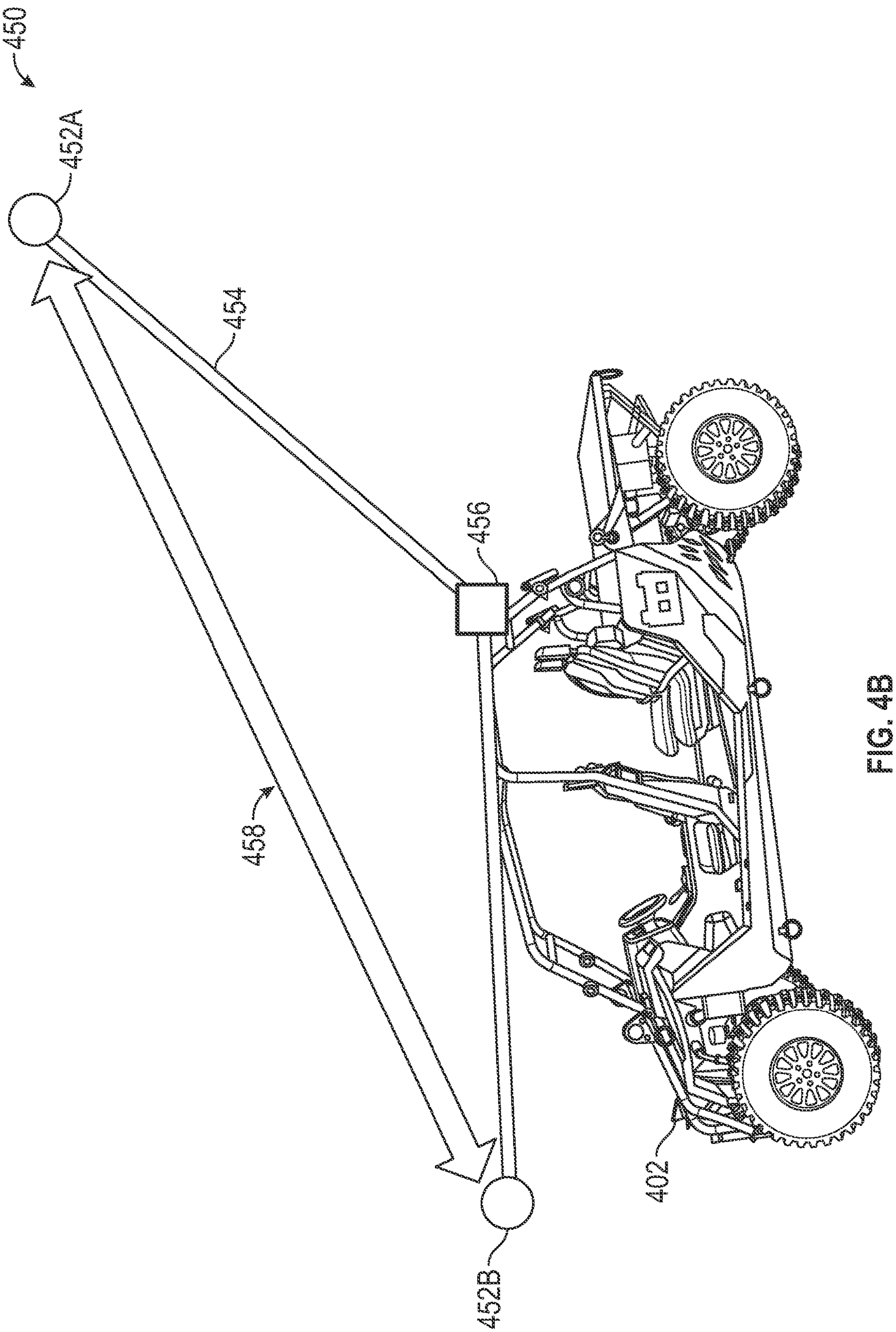
FIG. 4B illustrates a conceptual diagram showing example configurations for another teleoperation assembly mounted to a vehicle according to aspects of the present disclosure.

FIG. 4B illustrates a conceptual diagram 450 showing example configurations for another teleoperation assembly mounted to a vehicle according to aspects of the present disclosure. Aspects of diagram 450 are similar to diagram 400 and are therefore not redescribed in detail. As illustrated, vehicle 402 includes a teleoperation assembly (illustrated at positions 452A and 452B), which is supported by mast 454. As compared to FIG. 4A, electromechanical actuator 456 is included, which is usable to control the position of mast 454 to reposition the teleoperation assembly accordingly. Thus, in the illustrated example, the teleoperation assembly is repositioned from position 452A to position 452B (as illustrated by arrow 458) through use of electromechanical actuator 456. While FIGS. 4A and 4B are provided as separate examples, it will be appreciated that, in some examples, such aspects may be combined, for example to enable both retraction of mast 454 and finer-grained positioning of the teleoperation assembly accordingly.

As a result of moving the teleoperation assembly, it is possible to obtain image data from a variety of perspectives (e.g., from position 452A and position 452B) around vehicle 402. It will be appreciated that the illustrated positions are provided as examples, and any of a variety of additional or alternative lateral, longitudinal, and/or vertical changes may be made to the position of the teleoperation assembly in other examples. For example, such changes may enable different camera positions that enable a vehicle operator to view over a hill or obstacle, to view an obstacle close to the tires and/or body of vehicle 402, and/or to look under vehicle 402, among other examples. Any of a variety of additional or alternative actuation means may be used (e.g., in addition to or as an alternative to electromechanical actuator 456), including a rotary actuator, a hydraulic actuator, and/or a pneumatic actuator. Further, while FIG. 4B is illustrated as including a single teleoperation assembly, similar techniques may be used for any number of teleoperation assemblies. Thus, as a result of controlling the position of the teleoperation assembly using electromechanical actuator 456, image data and/or any of a variety of sensor data may be obtained via the teleoperation assembly that would not necessarily be obtainable from sensors of vehicle 402 itself.

Third-Person Teleoperation with Remote Control

Figure 5:
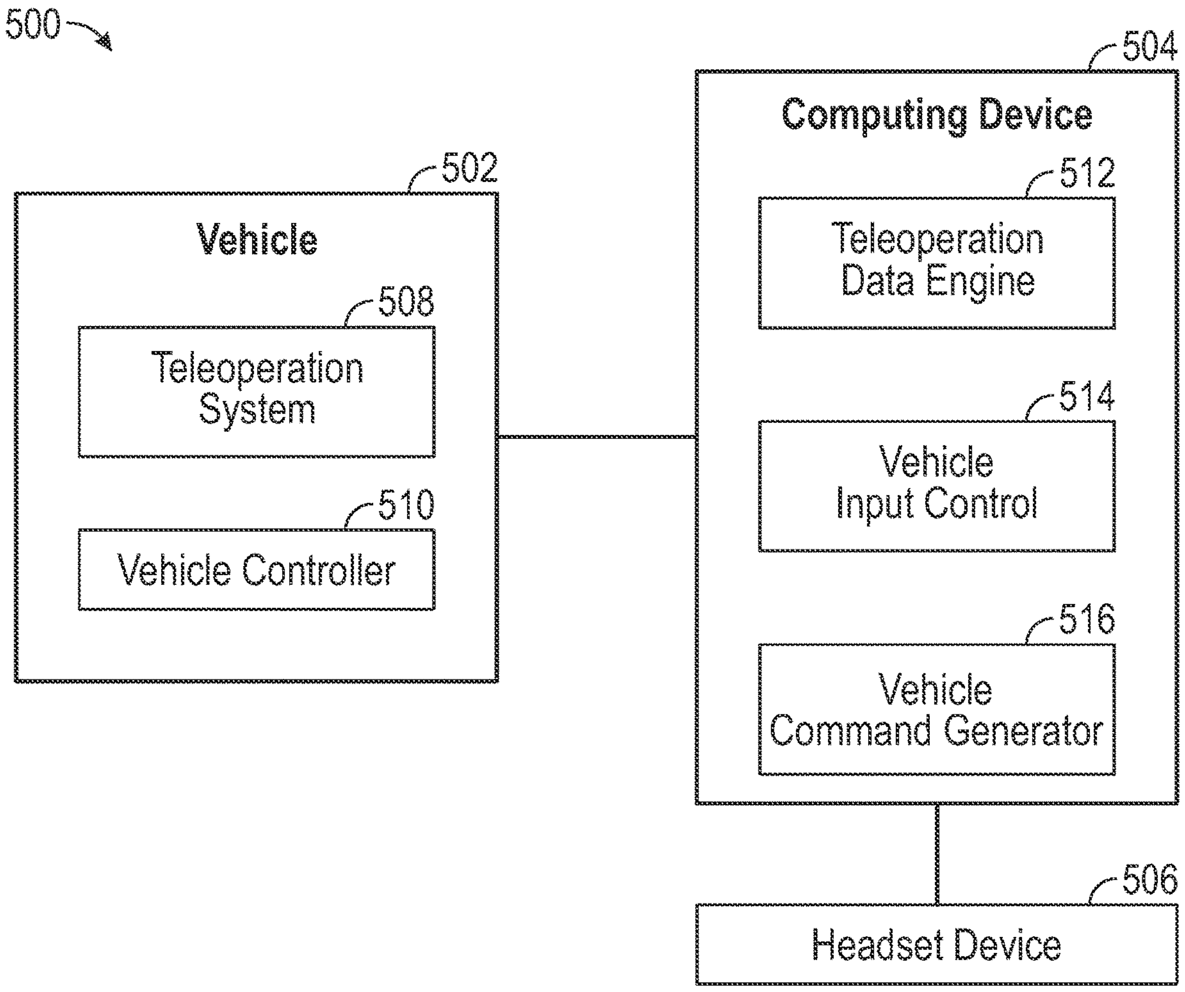
FIG. 5 illustrates an overview of an example system in which teleoperation may be used to control a vehicle according to aspects described herein.

FIG. 5 illustrates an overview of an example system 500 in which teleoperation may be used to control a vehicle according to aspects described herein. As illustrated, system 500 includes vehicle 502, computing device 504, and headset device 506. Vehicle 502, computing device 504, and headset device 506 may each be in communication using any of a variety of wired and/or wireless communication protocols, including, but not limited to, an Ethernet connection, a universal serial bus (USB) connection, a Wi-Fi connection, a BLUETOOTH connection, a satellite connection, and/or a cellular network connection, among other examples. For example, vehicle 502 and computing device 504 may communicate over a wireless connection, while computing device 504 and headset device 506 may communicate using a wired connection.

Aspects of vehicle 502 may be similar to those discussed above with respect to vehicle 10 of FIG. 1, vehicle 200 of FIG. 2, vehicle 302 of FIG. 3, and/or vehicle 402 of FIGS. 4A and 4B, and are therefore not redescribed below in detail. For example, aspects of vehicle controller 510 may be similar to those discussed above with respect to vehicle controller 202, while teleoperation system 508 may include a teleoperation controller (e.g., teleoperation controller 224 in FIG. 2) and a teleoperation assembly similar to that of teleoperation assembly 214, 304, or 404 in FIGS. 2, 3, and 4, respectively.

As noted above, teleoperation system 508 may enable remote control of vehicle 502. For example, computing device 504 may receive teleoperation data associated with vehicle 502 (e.g., from teleoperation system 508), which may be used to control vehicle 502 accordingly (e.g., based on commands from vehicle command generator 516, which may be processed by vehicle controller 510 to affect operation of vehicle 502).

Example teleoperation data includes, but is not limited to, image data, LIDAR data, and/or RADAR data, among other examples. In some instances, teleoperation system 508 may process the teleoperation data prior to transmission (e.g., to teleoperation data engine 512 of computing device 504 and/or vehicle controller 510). For example, teleoperation system 508 may perform image stabilization, horizon tracking, roll control (e.g., to lock and/or stabilize the camera to align it with the horizon), and/or object detection/classification. As another example, roll or one or more other transformations may be artificially introduced, thereby increasing the perception of vehicle stability for a remote operator. For instance, the left-right sway/roll of the teleoperation view may be advantageous to the remote operator, who may not otherwise perceive how close the vehicle is to rolling on terrain that is otherwise visually flat.

It will be appreciated that such aspects may additionally, or alternatively, be performed by a computing device (e.g., computing device 504). As another example, teleoperation data of teleoperation system 508 may be processed by vehicle controller 510 to present information to a vehicle operator within an operator area (e.g., operator area 40) of vehicle 502. For example, information associated with teleoperation system 508 may be presented using a display and/or indicator light of an operator interface (e.g., operator interface 204). As another example, information may be presented via a heads-up display (HUD) of vehicle 502, for example to emphasize objects determined to be obstacles or to provide an indication that the vehicle will fit through a gap having a narrow clearance, among other examples.

Teleoperation system 508 may manage an associated mast (e.g., mast 306 or 406 in FIGS. 3 and 4, respectively). For example, teleoperation system 508 may process data from one or more IMUS (e.g., of a teleoperation assembly and/or a vehicle) to control electromechanical dampeners (e.g., electromechanical dampeners 308 and 310) of teleoperation system 508, thereby mechanically stabilizing the teleoperation assembly accordingly. Teleoperation system 508 may additionally, or alternatively, process teleoperation data to control the electromechanical dampeners to maintain the position of a representation of vehicle 502 within the teleoperation data within a certain region. It will thus be appreciated that any of a variety of control techniques may be used to stabilize a teleoperation assembly according to aspects described herein. In other examples, teleoperation system 508 may control a motor assembly of teleoperation system 508 (e.g., motor assembly 412 in FIG. 4A) to extend or retract the mast automatically and/or in response to user input, among other examples.

Computing device 504 may be any of a variety of devices, including, but not limited to, a mobile computing device, a tablet computing device, a laptop computing device, or a desktop computing device. As illustrated, computing device 504 is in communication with headset device 506, which may be an augmented reality (AR) or virtual reality (VR) headset, among other examples. While computing device 504 and headset device 506 are illustrated as separate devices, it will be appreciated that aspects discussed herein with respect to computing device 504 and headset device 506 may be incorporated into a single device in other examples.

Computing device 504 may provide one or more commands to vehicle 502. For example, teleoperation commands may be provided to teleoperation system 508 to control data generated and/or otherwise collected by a teleoperation assembly or to control a mast position of teleoperation system 508, among other examples. In some instances, an indication may be provided to select, change, or otherwise control a region of data that is transmitted to computing device 504 (e.g., for display by headset device 506), as may be the case when user input is received to change a region that is displayed to a user of computing device 504. The user input may be received via a joystick (not pictured) or based on a head position of a user of computing device 504 (e.g., as may be determined by headset device 506). In other examples, such view changes may be processed locally by teleoperation data engine 512, which may receive 180- or 360-degree teleoperation data from teleoperation system 508 and may then determine a region of the teleoperation data to present to the user accordingly.

It will thus be appreciated that any of a variety of techniques may be used to control the view of the teleoperation data that is presented to the user. In other examples, multiple views may be presented, as may be the case when a first view is displayed via headset device 506 and a second view is displayed via a display (not pictured) of computing device 504.

Computing device 504 may provide vehicle control commands to vehicle 502. In examples, vehicle input control 514 receives user input to control the vehicle, which is used by vehicle command generator 516 to generate a set of commands with which to control vehicle 502. Vehicle input control 514 may include any of a variety of input controls, including, but not limited to, physical input controls (e.g., a joystick, a directional pad, a steering wheel, or a pedal) and/or software input controls (e.g., touch input, gesture input, and/or actuation of a variety of user interface elements). Vehicle controller 510 may receive vehicle commands generated by vehicle command generator 516 (e.g., via a network controller, such as network controller 228 discussed above with respect to vehicle 200 in FIG. 2) and control operation of vehicle 502 accordingly (e.g., controlling any of a variety of vehicle systems, such as system 208, 210, 212, 214, 216, and/or 218).

Thus, vehicle 502 may be remotely controlled (e.g., by a user of computing device 504) based on teleoperation data that is obtained from teleoperation system 508. In examples, a display presented to the user includes any of a variety of vehicle information (in addition to the image data captured by teleoperation system 508). Example vehicle information includes, but is not limited to, a vehicle speed, a vehicle gear (e.g., park, neutral, reverse, high, low, first, second, or third). As another example, the vehicle information may include an indication as to a payload of the vehicle, for example relating to occupants (e.g., that each occupant of the vehicle is wearing a helmet and/or using a harness of the vehicle), cargo (e.g., that the cargo has or has not shifted), and/or a hauled load (e.g., that the load is not experiencing vibration or other forces above a predetermined threshold). Additionally, the image data may be augmented based on other teleoperation data, for example to indicate identified objects/obstacles or to provide an indication as to whether a vehicle will fit between an area of low clearance. Additional examples of such aspects are discussed below. Further, teleoperation data may be recorded for later playback, as may be used for auditing purposes or to generate a highlight reel of vehicle 502 traversing an environment.

Thus, the teleoperation aspects described herein provide a familiar user experience (e.g., enabling remote operation of vehicle 502 using a third-person view) that is applicable in a variety of use cases and, as a result of the provided environmental view (in addition to the view of the vehicle itself), at a wider range of speeds. For example, the environmental view includes not only the immediate environment of the vehicle, but may further include negative terrain, which may not otherwise be visible from an operator area of the vehicle (e.g., as may be the case when the vehicle is overlooking a steep decline or is faced with an obstacle). Further, the view of the vehicle provides additional information to the user, such as the state of a vehicle payload and information about how the vehicle interacts with the environment as the vehicle traverses associated terrain.

Third-Person Teleoperation Articulation Exaggeration

In examples, teleoperation may be used to control a vehicle in an off-road environment (e.g., having uneven or unpredictable terrain). However, vehicle orientation, jostling, and suspension articulation, among other forms of vehicle feedback, may be less apparent to a vehicle operator when controlling the vehicle via teleoperation (e.g., using a third-person perspective provided by a teleoperation assembly as described above). As a result, stability and terrain influence on the vehicle may be more difficult to understand, until a critical point is reached where substantial changes in vehicle position or orientation (e.g., rollover) result.

Figure 6A:
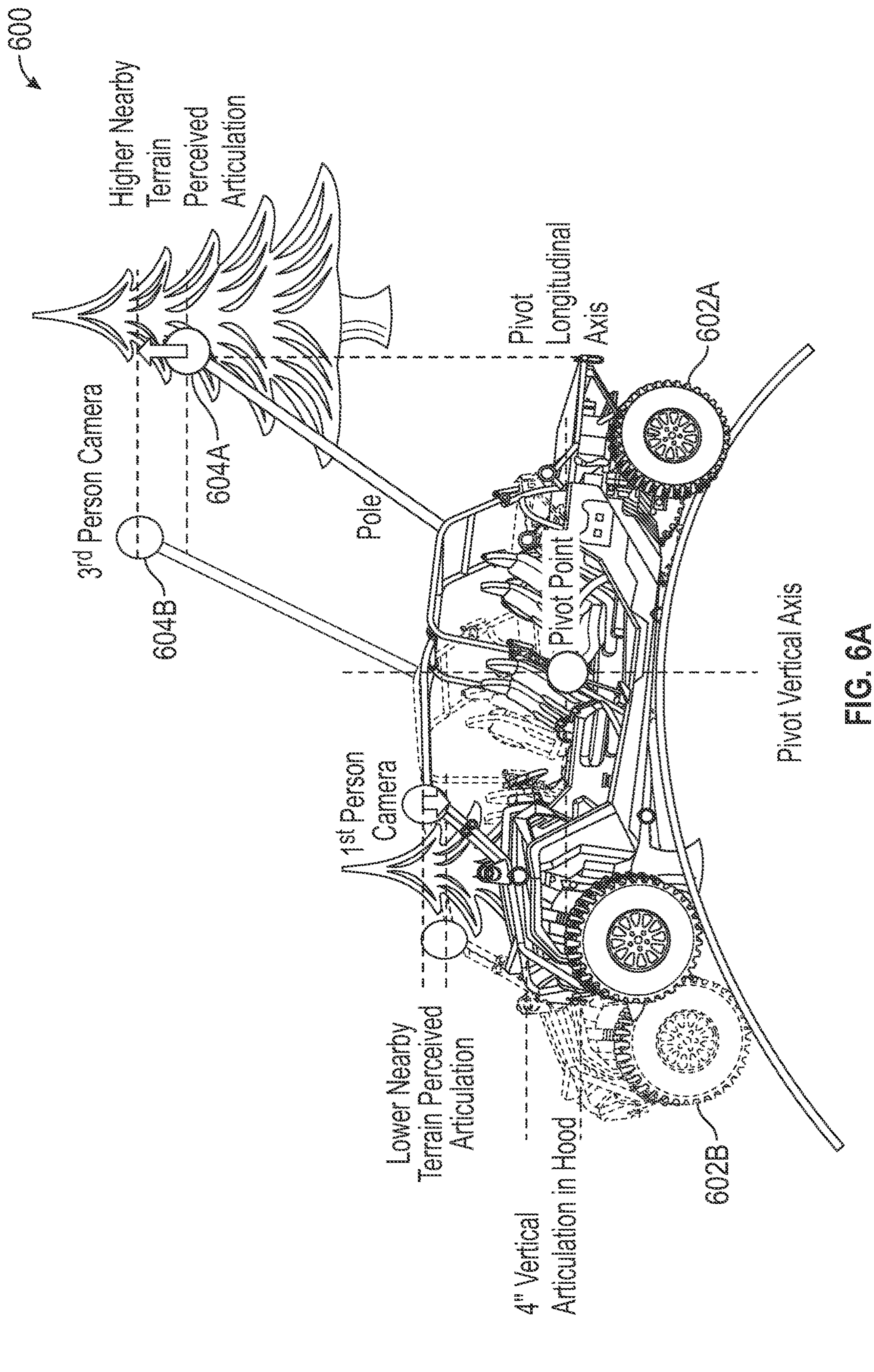
FIGS. 6A-6C illustrate example views of a system in which the articulation and orientation of the vehicle is exaggerated in relation to the visual translation of the camera according to aspects described herein.
Figure 6B:
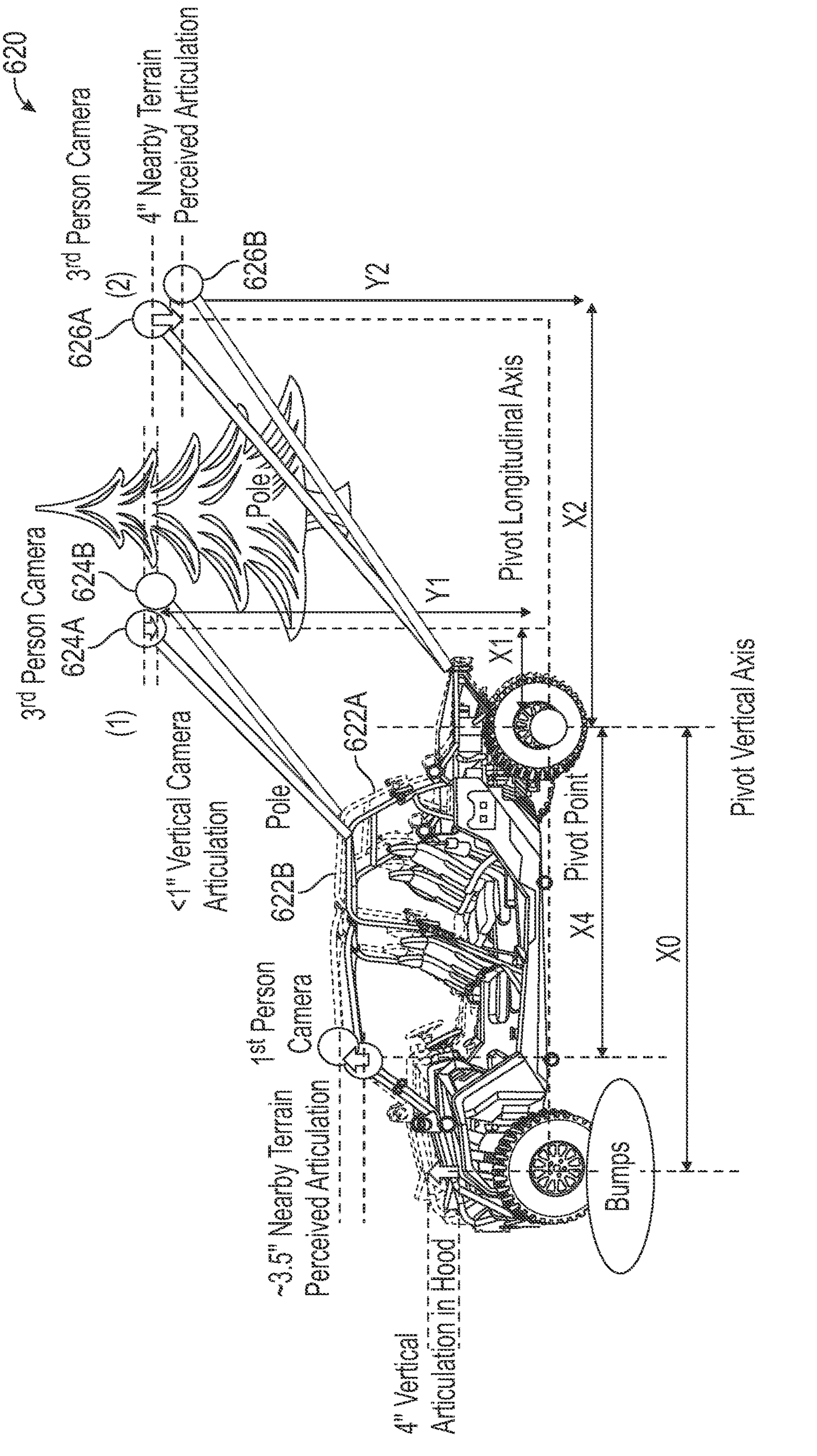
Figure 6C:
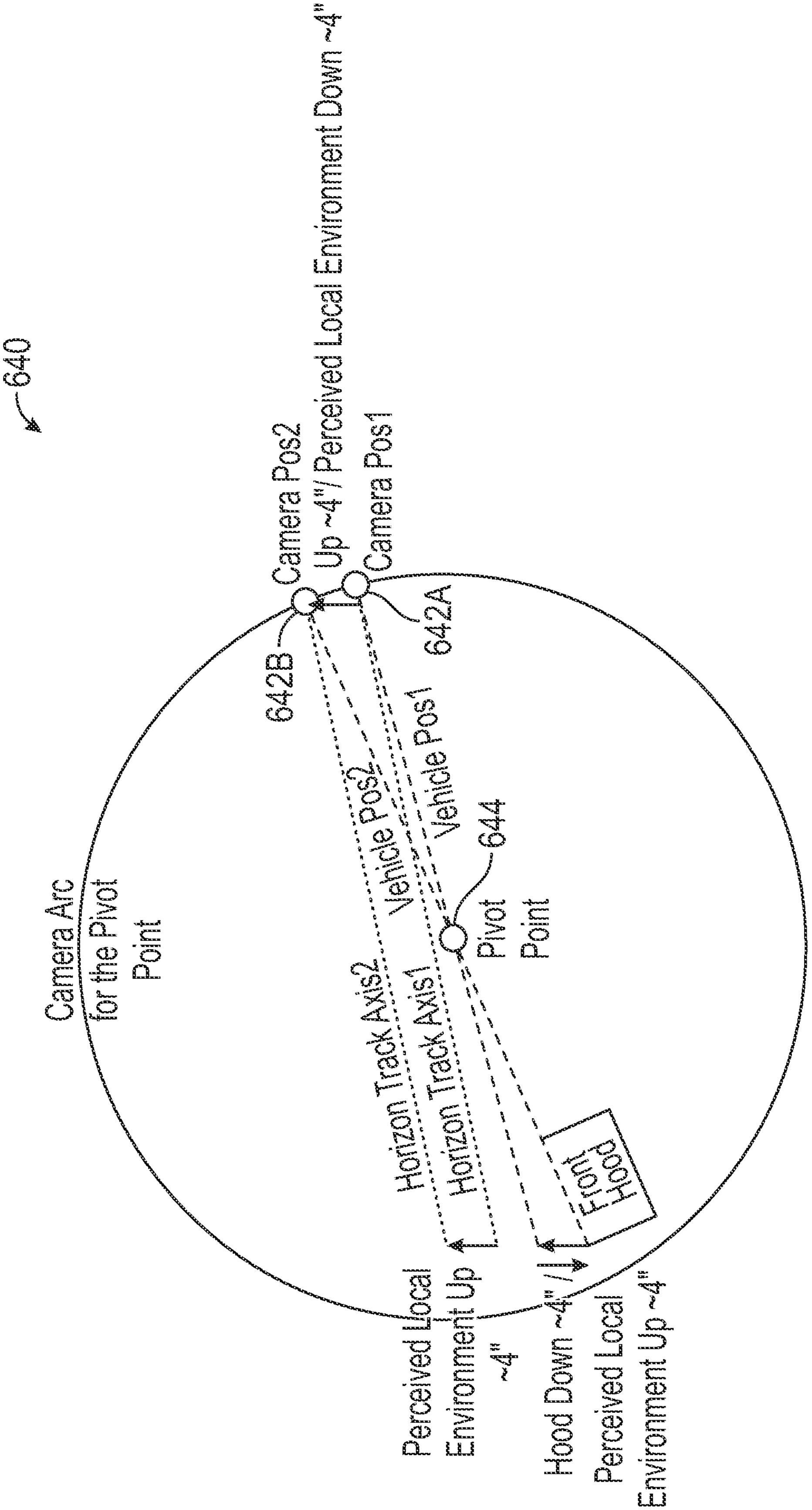

Accordingly, FIGS. 6A, 6B, and 6C illustrate example views 600, 620, and 640 of a system in which the articulation and orientation of the vehicle is exaggerated as a result of using horizon tracking to maintain a consistent orientation of the teleoperation view, such that the boundary between stability and instability may be easier to observe by the vehicle operator.

View 600 of FIG. 6A illustrates an example in which the front of the vehicle maneuvers from position 602A to position 602B. Accordingly, the front of the vehicle experiences a 4-inch downward articulation, while the teleoperation assembly (moving from position 604A to position 604B) experiences a four-inch upward articulation, while a first-person camera view may experience a smaller articulation. In such an example, use of horizon tracking may cause the teleoperation view to convey an exaggerated articulation of the vehicle, as may be the case when the distance from the third-person camera position to the pivot point is larger than the distance from the first-person camera position to the pivot point. Additionally, or alternatively, exaggeration may result from movement of the front of the vehicle in its local environment in combination with the influence of the camera moving up while the horizon tracking point remains substantially unchanged (e.g., the sum of the downward movement of the hood and the upward movement of the camera, which is thus perceived as downward movement of the local environment).

With reference now to FIG. 6B, view 620 illustrates another example in which a vehicle maneuvers from position 622A to 622B, thereby traversing a bump. Accordingly, as the vehicle moves from position 622A to position 622B, the hood of the vehicle experiences a four-inch upward articulation. The first-person camera view experiences a vertical translation (e.g., a perceived 3.5-inch upward articulation) that corresponds to the ratio of the longitudinal distance between the front wheels and the pivot point (indicated by X0) and the longitudinal distance between the first-person camera and the pivot point (indicated by X4). By contrast, a first teleoperation assembly (moving from position 624A to position 624B) experiences a vertical articulation having a reduced magnitude (e.g., a perceived 1-inch downward articulation), owing to the smaller distance between the first teleoperation assembly and the pivot point (indicated by X1). Further, the relatively large Y1 value (as compared to the vertical distance for the first-person camera) causes a longitudinal translation from position 624A to position 624B during the same event, which may be perceived as zooming in or zooming out. Finally, as compared to the first teleoperation assembly, a second teleoperation assembly (moving from position 626A to position 626B) experiences a vertical translation having a comparatively greater magnitude (e.g., a 4-inch downward articulation) as a result of the increased longitudinal distance between the second teleoperation assembly and the pivot point (indicated by X2, as compared to X1).

View 640 of FIG. 6C illustrates an example in which horizon tracking is used (e.g., so as to maintain a substantially consistent location of the horizon in a teleoperation view provided to a vehicle operator), which may convey an exaggerated articulation of the vehicle in relation to its surroundings. As illustrated, as the camera moves from position 642A to position 642B when the vehicle pivots around pivot point 644, the sum of the downward movement of the hood and the upward movement of the camera in its local environment is thus perceived as downward movement of the environment, which may be exaggerated in examples. For example, the articulation may be especially exaggerated in instances where the third-person camera is farther from the vehicle, as is the case for the teleoperation assembly depicted in FIG. 6B as compared to the teleoperation assembly in FIG. 6A. It will be appreciated that horizon tracking need not be limited to the Earth/sky boundary (e.g., which may be helpful when driving up a steep hill), but may additionally or alternatively include an intermediate region of the Earth and/or in the sky. For example, horizon tracking may take into account local terrain data and/or an understanding of the field of view of a vehicle operator (e.g., with the goal of keeping the vehicle in view and/or utilizing a low-pass filter on a changing horizon tracking point), which may thus help when maneuvering down a long hill, among other examples.

Thus, horizon tracking may be used in combination with the described teleoperation assembly to emphasize vehicle movements in relation to the surrounding terrain. Further, as the mast becomes longer (e.g., as illustrated by the second teleoperation assembly in FIG. 6B), the teleoperation view may increasingly amplify articulation by the vehicle. For instance, as the longitudinal distance between one or more anticipated pivot points and the teleoperation assembly increases (e.g., X2 versus X1 in FIG. 6B), the perceived articulation may be larger. In instances where vertical distance is increased (e.g., as indicated by Y1 and Y2), a perceived zooming effect may increase. Thus, the position of the teleoperation assembly in relation to the vehicle may be tuned to achieve a desired effect (e.g., increasing or decreasing the associated articulation and/or zooming effect). In examples, the length of the mast may be controlled (e.g., by extending or retracting the mast as described above; automatically or in response to user input) to affect the degree to which vehicle movements are amplified. As another example, the teleoperation assembly may be automatically or manually repositioned in two-dimensional or three-dimensional space. Additionally, or alternatively, image processing is used (e.g., based on vehicle speed, a relative camera speed and/or associated forces, and environment distances) to extrapolate a camera position that reduces or cancels the perceived zoom. In some examples, interpolation between multiple camera locations could also accomplish similar zoom reduction/cancellation.

Figure 7:
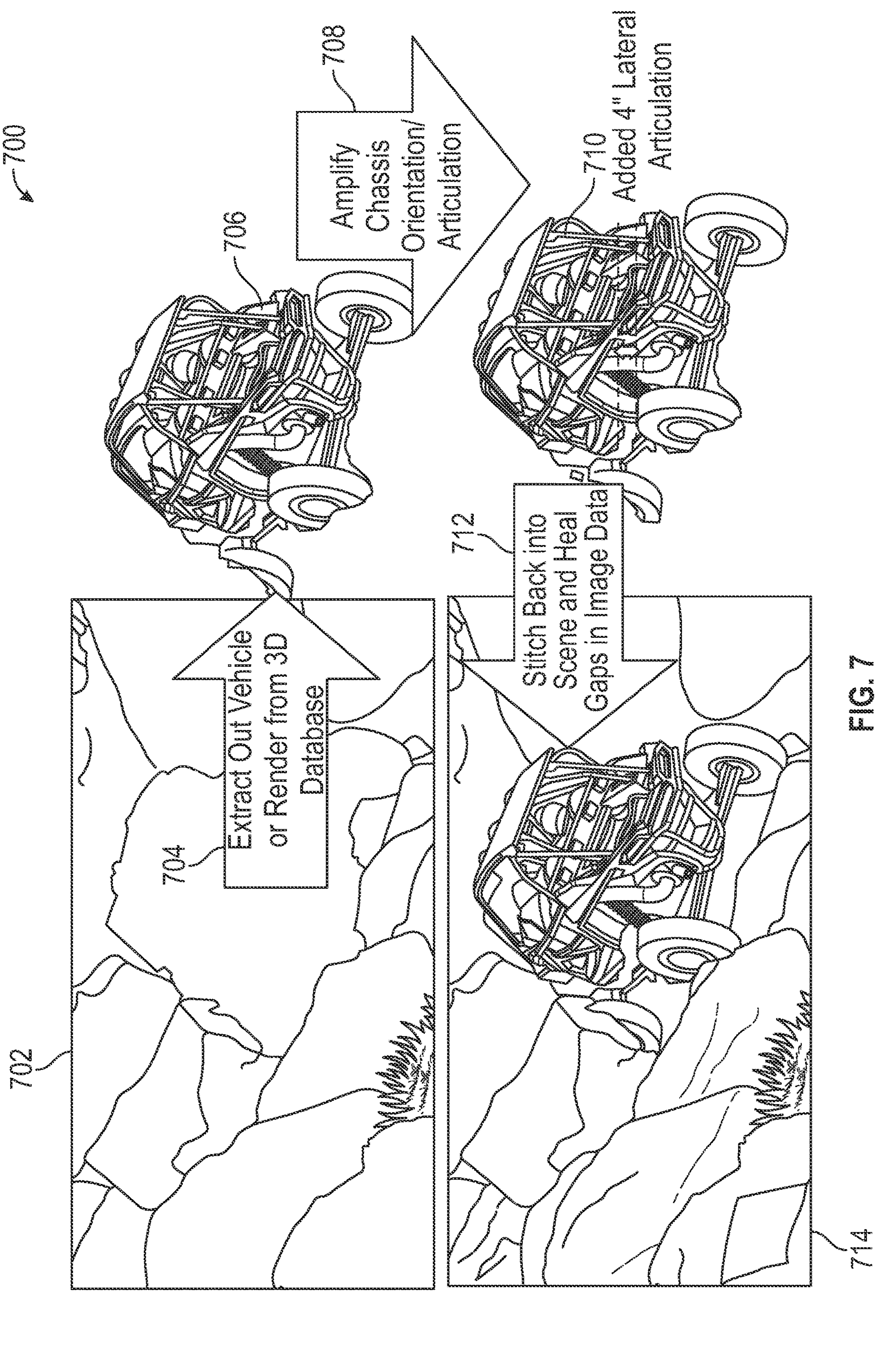
FIG. 7 illustrates an overview of an example method for amplifying a teleoperation view according to aspects described herein.

FIG. 7 illustrates an overview of an example method 700 for amplifying a teleoperation view according to aspects described herein. Method 700 may be used as an alternative to or in addition to the aspects discussed above with respect to FIGS. 6A-6C. In examples, aspects of method 700 are performed by a teleoperation system (e.g., teleoperation system 508 in FIG. 5), a vehicle controller (e.g., vehicle controller 510), and/or a teleoperation data engine (e.g., teleoperation data engine 512), among other examples.

Method 700 begins with teleoperation view 702 (e.g., as may be obtained from a teleoperation assembly), which may include image data associated with a vehicle. Accordingly, image data associated with the vehicle is extracted at operation 704. For example, operation 704 may include applying machine learning and/or computer vision techniques to identify and extract the vehicle from teleoperation view 702. In another example, a three-dimensional (3D) render, model, or other representation from a database may be used (e.g., rather than extracting actual image data associated with the vehicle).

Accordingly, representation 706 of the vehicle is obtained from teleoperation view 702, such that the vehicle orientation and/or articulation may be amplified at operation 708. For example, amplifying the vehicle orientation and/or articulation may include processing data from an IMU (e.g., of the vehicle and/or teleoperation assembly), one or more suspension position sensors of the vehicle, and/or data from any of a variety of other sources to determine movement associated with the vehicle. Example movements that may be identified include, but are not limited to, lateral articulation, longitudinal articulation, and/or rotation about one or more axes. As another example, if the vehicle has an IMU proximate to the vehicle's center of gravity, data from the IMU may be processed in combination with sensor data from the teleoperation assembly to model movement of the vehicle. Thus, amplified representation 710 may be generated (e.g., based on one or more of the measured vehicle movements) so as to provide an exaggerated representation of such movements to a vehicle operator.

Accordingly, amplified representation 710 is incorporated back into the teleoperation view at operation 712, thereby yielding amplified teleoperation view 714. In examples, operation 712 includes identifying one or more regions of amplified teleoperation view 714 associated with a gap (e.g., a region from which representation 706 was extracted that is not covered by amplified representation 710), such that identified gaps may be filled accordingly (e.g., with similar image data given a known vehicle trajectory and/or upcoming terrain, and/or programmatically generated image data, as may be generated by a generative machine learning model, so as to reduce a visual impact of the gap). Finally, amplified teleoperation view 714 may be provided for display to the vehicle operator, thereby enabling the vehicle operator to control the vehicle with an improved sense for the vehicle's interaction with its surrounding environment. It will be appreciated that, in some examples, an amplified representation and/or an amplified teleoperation view may include additional image data, as may be the case when user-configured image data and/or vehicle information is overlaid or otherwise incorporated accordingly.

As compared to examples where numbers, bars, and/or inclinometers are used to convey vehicle interactions with its surrounding environment, the disclosed aspects may be more intuitive and may therefore be more readily understandable by a vehicle operator. Further, as a result of conveying such information within the teleoperation view itself, a vehicle operator need not divert attention to view a separate presentation of such information. Additionally, the disclosed aspects may be more cost effective and have less associated maintenance as compared to instances where physical actuators and/or vibration are used to provide vehicle feedback to the vehicle operator.

While example configurations and techniques are discussed with respect to FIGS. 6A-6C and FIG. 7, it will be appreciated that, in other examples, a teleoperation assembly may be mounted at a different angle and/or at a different location with respect to the vehicle. As an example, a teleoperation assembly may be mounted more central to the vehicle, thereby providing increased coverage of the environment near the front of the vehicle and decreased coverage near the rear of the vehicle. In these and other configurations, teleoperation view exaggeration resulting from movement of the vehicle and associated teleoperation assembly may be further exaggerated digitally based on IMU data and/or other sensor data. Further, while examples are described where movements are exaggerated, it will be appreciated that similar techniques may be used to artificially reduce perceived vehicle movements in other examples. As another example, perception of vehicle articulation may be increased or decreased using a virtual camera point (e.g., a location different from the physical location of the teleoperation assembly), thereby transforming the teleoperation view that is provided to the vehicle operator. As another example, real-world longitudinal perception may be translated to include a vertical component (e.g., in addition to longitudinal articulation or as an alternative to longitudinal articulation) using similar camera virtualization techniques.

Teleoperation Vehicle Width-Fit Checking and Display

In addition to potential difficulties associated with gauging vehicle movement and interactions with the surrounding environment, it may be difficult for a vehicle operator to perceive depth and/or distance between objects, for example when navigating off-road terrain, in a snowy environment, or in any of a variety of other contexts. As a result, the vehicle operator may operate the vehicle at a reduced speed or may inadvertently attempt to steer the vehicle along a path that is too narrow for the vehicle, among other difficulties. Further, while teleoperation using stereo vision may at least partially address certain depth perception issues (e.g., in combination with an AR or VR headset), use of stereo vision may have an associated increase in expense (e.g., as a result of additional image sensors), bandwidth requirements, and/or processing requirements.

Accordingly, LIDAR and/or RADAR data (e.g., as may be obtained by a teleoperation assembly and/or one or more other sensors of a vehicle) may be used to evaluate a path in front of the vehicle and determine a clearance associated with a set of objects along the path. In some examples, the clearance may be determined for objects where the axis connecting the objects is not substantially perpendicular to the axis along which the vehicle is traveling (e.g., such that the vehicle would cross between the objects at a different direction than the current direction of travel). The clearance may be compared to a width of the vehicle (e.g., as may be known or otherwise determined), such that an indication may be provided to the vehicle operator as to whether the vehicle will fit between the objects. As another example, an indication as to a projected path of travel may be provided. Additionally, or alternatively, an indication of one or more vehicle adjustments may be provided (e.g., to change vehicle speed and/or steering angle), thereby enabling the vehicle operator to adjust the vehicle path to traverse the set of objects.

In examples, an autonomous or semi-autonomous mode may be provided that generates and provides commands to a vehicle controller of the vehicle (e.g., vehicle controller 202 in FIG. 2) to align the vehicle with a space between an identified set of objects. In examples, the vehicle operator may control the speed of the vehicle and may further be able to override commands associated with vehicle alignment. Thus, aspects of the present disclosure may enable a vehicle under remote control to travel at a higher speed than would otherwise be possible by virtue of such semi-autonomous clearance alignment.

Figure 8:
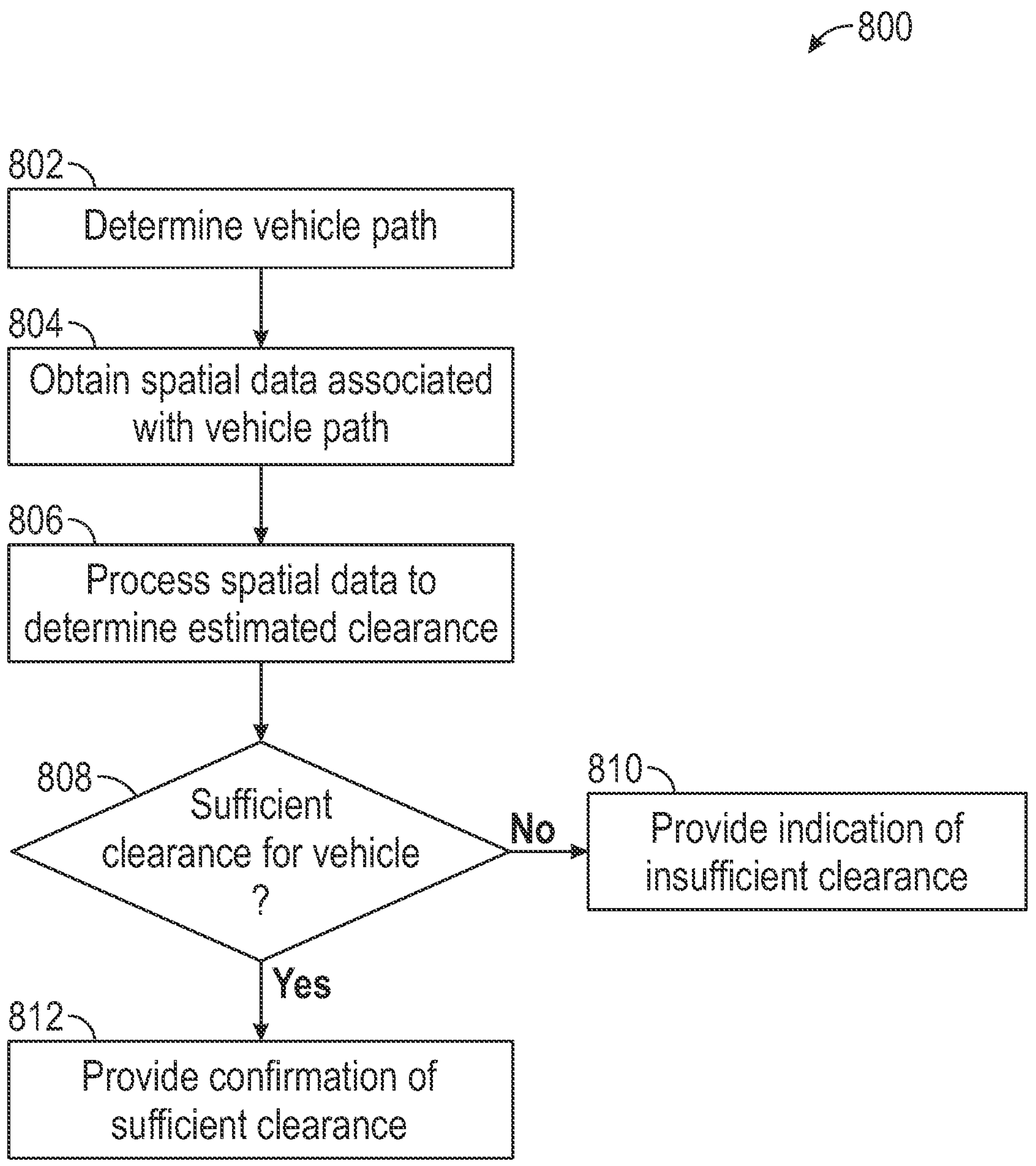
FIG. 8 illustrates an overview of an example method for evaluating clearance for a vehicle within an environment according to aspects described herein.

FIG. 8 illustrates an overview of an example method 800 for evaluating clearance for a vehicle within an environment according to such aspects. For example, method 800 may be performed by a teleoperation system (e.g., teleoperation system 508 in FIG. 5), a vehicle controller (e.g., vehicle controller 202 in FIG. 2 and/or vehicle controller 510), and/or a computing device (e.g., computing device 504), among other examples.

Method 800 begins at operation 802, where a vehicle path is determined. In examples, the path may be determined based on a current direction of the vehicle and a speed with which the vehicle is traveling (e.g., as may be determined based on one or more sensors of the vehicle, such as a global positioning system (GPS) sensor, a throttle position sensor, and/or a steering position sensor). As another example, computer vision and/or machine learning techniques may be used to evaluate teleoperation data associated with a vehicle (e.g., as may be obtained from a teleoperation assembly) and determine an expected path of the vehicle. It will be appreciated that, in other examples, the processing described herein need not be limited to a path along which a vehicle is traveling, such that clearance indications may be provided for any of a variety of objects and associated clearances within an environment of the vehicle (e.g., in a direction of travel and/or within a predetermined distance).

At operation 804, spatial data associated with the determined vehicle path is obtained. For example, the spatial data may be obtained using a LIDAR sensor and/or RADAR sensor of the vehicle and/or of an associated teleoperation assembly. Accordingly, the spatial data is processed at operation 806 to determine an estimated clearance associated with a set of objects along the determined vehicle path. In examples, operation 806 includes determining an estimated clearance between a set of objects that are closest to the vehicle, such that objects that are further away from the vehicle may be evaluated at a later time. As another example, the estimated clearance may have an associated certainty metric, which may increase as the vehicle approaches the set of objects (e.g., as a result of a subsequent iteration of method 800).

At determination 808, it is determined whether there is sufficient clearance for the vehicle. As noted above, the determined clearance may be compared to a known width of the vehicle or may be compared to a determined width for the vehicle (e.g., as may have been determined based on the spatial data obtained at operation 804 or based on a user indication as to the vehicle width). In examples, determination 808 accounts for an associated certainty metric, such that a margin of error associated with the certainty metric may be incorporated into the clearance determination.

If it is determined that there is not sufficient clearance for the vehicle, flow branches "NO" to operation 810, where an indication of insufficient clearance is provided. By contrast, if it is instead determined that sufficient clearance exists, flow branches "YES" to operation 812, where confirmation of sufficient clearance is provided. It will be appreciated that any of a variety of techniques may be used to provide such indications. For example, an indication may be presented via an operator interface of the vehicle (e.g., via a display or an indicator light), using a heads-up display (e.g., where an indication is superimposed over a region for which the clearance determination was made), or using laser lines to illuminate a region of the environment in front of the vehicle, among other examples. The indication may be presented in association with or based on a certainty metric (e.g., displaying the metric itself and/or having a color indicating a level of certainty). In some instances, an indication may be provided when it is determined there is insufficient clearance, while no indication may be provided when it is determined there is sufficient clearance. Such aspects may be user-configurable. Method 800 terminates at operation 810 or operation 812.

Dynamic Latency Detection for Speed/Standoff Adjustment

Due to the remote nature of teleoperation, vehicle operation may have an associated latency between when changes occur within the vehicle's environment, when teleoperation data indicating such changes is presented to a vehicle operator, when the vehicle operator reacts to the changes, and when one or more vehicle commands associated with the vehicle operator's reaction are received and processed by the vehicle. Accordingly, a standoff distance may be used between the vehicle and elements of its environment (e.g., individuals and/or obstacles).

In examples, the standoff distance may be a function of one or more metrics that define a vehicle's ability to detect and avoid a hazard. Hazard avoidance may include, but is not limited to, a set steering command, a braking command, and/or a throttle command, among other examples. The standoff distance may be a function of the instantaneous allowed maximum speed of the vehicle, a time duration associated detecting a problem, and/or a time duration associated with reacting to a detected problem, which may include a communication latency and the vehicle system's reaction time and/or deceleration rate. However, as the distance between a vehicle operator (and an associated computing device) and the vehicle increases, communication latency may increase or otherwise vary greatly. Accordingly, the standoff distance and/or maximum speed of the vehicle may be adapted according to aspects described herein to address higher communication latency associated with vehicle teleoperation at greater distances.

Figure 9:
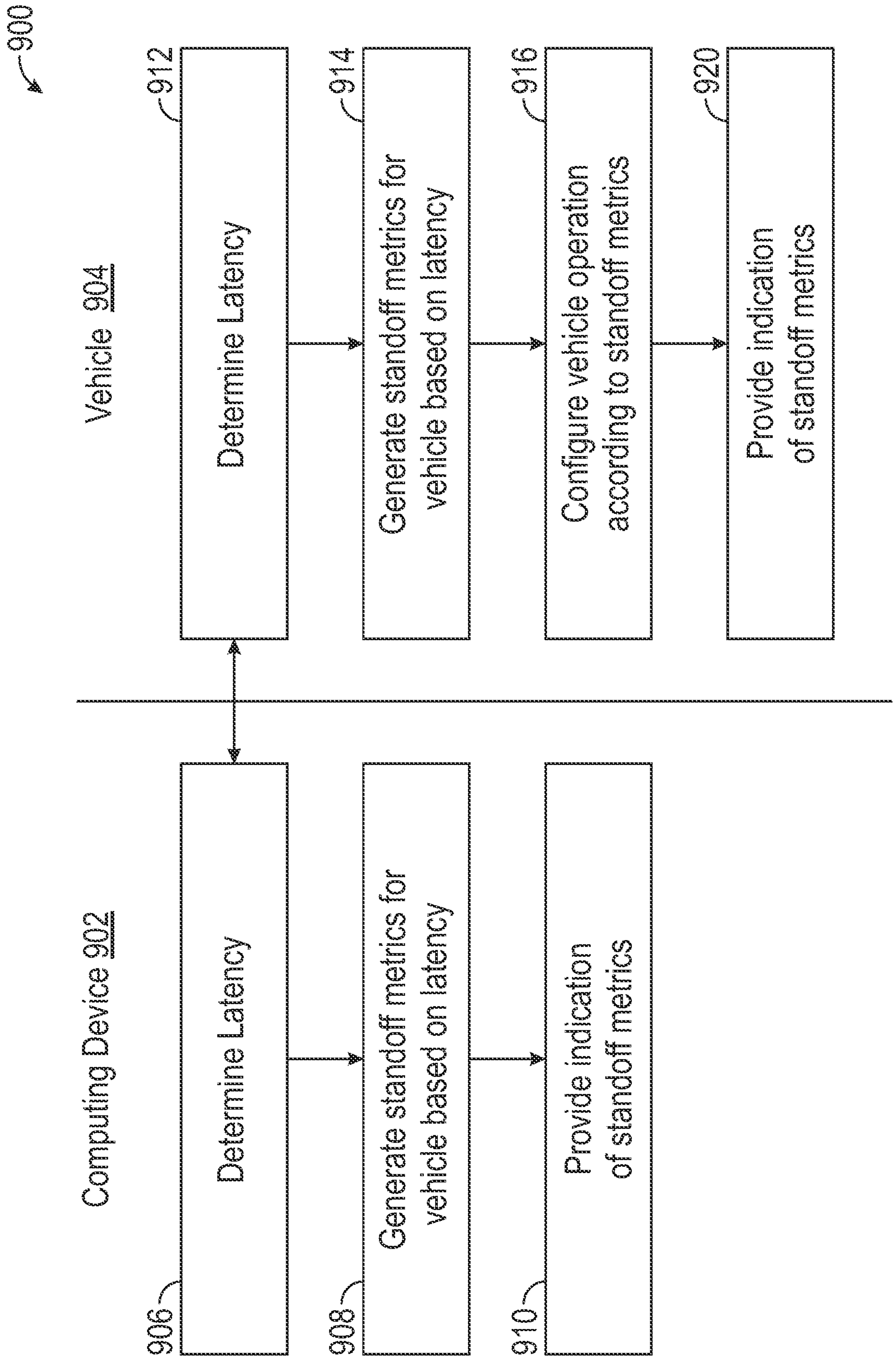
FIG. 9 illustrates an overview of an example method for generating a set of standoff metrics for a vehicle and configuring the vehicle accordingly.

Accordingly, FIG. 9 illustrates an overview of an example method 900 for generating a set of standoff metrics of a vehicle and configuring the vehicle based on the generated standoff metrics. As illustrated, aspects of method 900 are performed by computing device 902 and vehicle 904. For example, aspects of method 900 may be performed by a teleoperation data engine (e.g. teleoperation data engine 512 of computing device 504 in FIG. 5) and/or by a vehicle controller (e.g., vehicle controller 202 in FIG. 2 or vehicle controller 510), among other examples.

As illustrated, method 900 begins with operation 906 and operation 912, where a communication latency is determined between computing device 902 and vehicle 904. For example, a packet may be transmitted between computing device 902 and vehicle 904, such that vehicle 904 or computing device 902, respectively, may transmit an acknowledgement in response. The round-trip time of such a communication may thus be used as the communication latency.

In instances where the communication latency increases (e.g., as a result of an increasing distance between computing device 902 and vehicle 904 or due to changing communication conditions), computing device 902 and vehicle 904 may each generate a set of standoff metrics based on the determined latency at operation 908 or operation 914, respectively. For example, a standoff distance metric may be generated based on the determined latency. The standoff distance metric may account for additional factors, including an estimated reaction time for a vehicle operator, an estimated reaction time for a vehicle (e.g., once the vehicle is in receipt of a command), and/or a deceleration rate for the vehicle. As an example, the standoff distance metric may be determined based on the following equation:

$$D = V_{current\,speed} * (t_{latency} + t_{user\,reaction} + t_{vehicle\,reaction}) + \frac{V_{current\,speed}^2}{2 \times \text{deceleration}}$$

Where the vehicle's current speed is multiplied by a total delay (e.g., comprising a communication latency, user reaction time, and vehicle reaction time), thus accounting for the distance traveled by the vehicle before hazard avoidance is performed (e.g., before the total delay has elapsed), combined with the distance traveled as the vehicle decelerates.

As another example, a standoff distance may be held constant, such that a maximum velocity standoff metric is determined (e.g., solving for $V_{current\ speed}$ in the above equation). While example standoff metric calculations are described, it will be appreciated that any of a variety of other techniques may be used to generate a set of standoff metrics according to aspects described herein.

Accordingly, method 900 progresses from operation 914 to operation 916, where vehicle operation is configured according to the generated set of standoff metrics. For example, a vehicle controller may be configured to limit the speed of the vehicle according to a maximum speed standoff metric (e.g., as may be received via operator controls of the vehicle and/or according to the teleoperation aspects described herein).

Further, at operation 910 and operation 920 and indication of the generated standoff metrics is provided. For example, an indication at computing device 902 may indicate to a vehicle operator that a maximum speed of vehicle 904 has changed and/or that a standoff distance has changed. As another example, an indication at vehicle 904 may indicate that a maximum speed has changed and/or may indicate, to one or more individuals external to the vehicle, that the standoff distance has changed. In some examples, an indication may be provided consistent with aspects discussed below with respect to FIG. 16A. Method 900 terminates at operations 910 and 920.

It will be appreciated that method 900 is provided as an example in which standoff metrics are generated by both computing device 902 and vehicle 904. In other examples, the set of standoff metrics may be generated by either computing device 902 or vehicle 904, such that an indication of the generated standoff metrics is provided to the other device. Additionally, vehicle 904 may be configured according to any of a variety of additional or alternative metrics, such as a maximum turning angle or a maximum rate of deceleration. Aspects of method 900 may be performed periodically or in response to an identified change (e.g., a change in a distance between computing device 902 or to the environment of vehicle 904), among other examples.

Sensing of On-Vehicle Item Shifting/Loss/Gain and Notification

As a vehicle travels (e.g., maneuvering across uneven or unpredictable terrain), objects may shift within the vehicle or may be thrown from the vehicle (e.g., equipment or personal belongings). As another example, new objects may enter the vehicle (e.g., animals or branches). This may further be exacerbated in instances where at least a part of the operator area or cargo area of the vehicle is open-air (rather than enclosed). It will be appreciated that such issues may not be limited to objects and, in other examples, passengers of the vehicle may similarly undergo such changes. Further, in instances where a vehicle is being remotely controlled, the vehicle operator may be less attuned to the state of the vehicle and its associated contents.

Figure 10A:
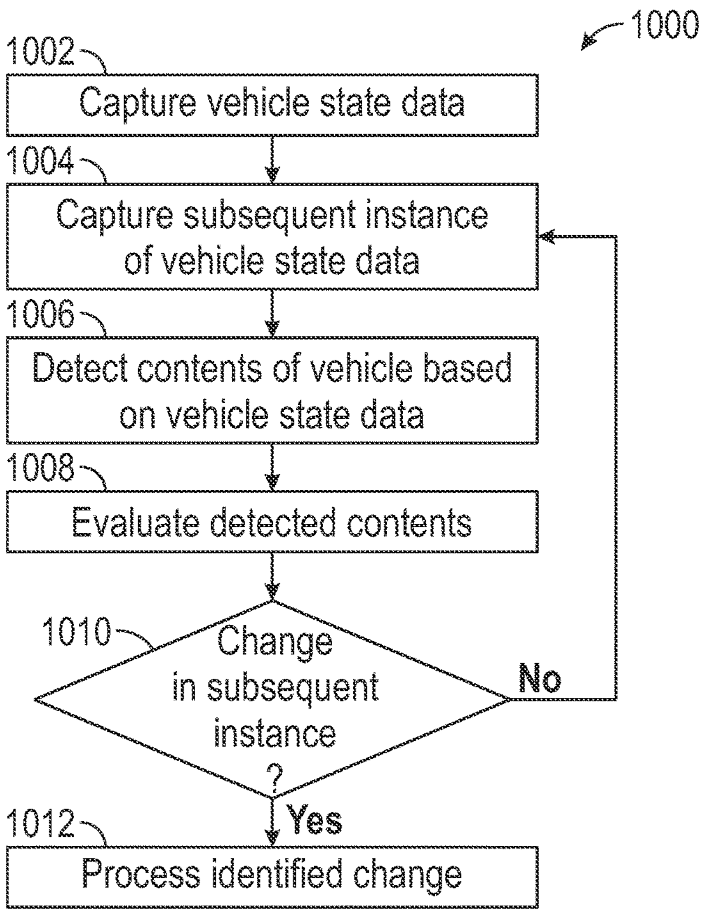
FIG. 10A illustrates an overview of an example method for monitoring the state of a vehicle to identify changes in vehicle contents.

Accordingly, FIG. 10A illustrates an overview of an example method 1000 for monitoring the state of a vehicle to identify changes in vehicle contents (e.g., objects and/or passengers). Aspects of method 1000 may be performed by a teleoperation system (e.g., teleoperation system 508 in FIG. 5), a teleoperation data engine (e.g. teleoperation data engine 512 of computing device 504) and/or by a vehicle controller (e.g., vehicle controller 202 in FIG. 2 or vehicle controller 510), among other examples.

At operation 1002, vehicle state data is captured. Vehicle state data may be captured by one or more sensors of the vehicle and/or of a teleoperation assembly (e.g., image sensors, LIDAR sensors, RADAR sensors, proximity sensors, and/or pressure sensors). For example, the teleoperation assembly may provide at least partial coverage of an operator area or cargo area of the vehicle. As another example, a sensor of the vehicle may be positioned so as to generate vehicle state data associated with an operator area and/or cargo area accordingly. As an example, passenger seats and/or surfaces on which objects may be placed are monitored.

Flow progresses to operation 1004, where a subsequent instance of vehicle state data is captured. Aspects of operation 1004 are similar to those discussed above with respect to operation 1002 and are therefore not redescribed. Subsequent vehicle state data may be captured after a predetermined amount of time has elapsed (e.g., since vehicle state data was captured at operation 1002 or at a previous iteration of operation 1004) or in response to an event (e.g., movement of the vehicle or a force above a predetermined threshold), among other examples. In examples, the vehicle state data includes a video feed captured from an image sensors, such that the vehicle state data may be captured on a substantially continuous basis.

At operation 1006, the contents of the vehicle are determined based on the vehicle state data. For example, image data may be processed using machine learning and/or computer vision techniques to identify one or more objects and/or individuals located therein. In examples, contents of the vehicle may be classified accordingly, for example to indicate whether an identified region is an object, an individual, or a part of the vehicle, among other examples. In some instances, debris (e.g., mud and snow) may similarly be classified. Operation 1006 may include performing such processing for successive instances of vehicle state data (e.g., as were captured at operations 1002 and 1004). In subsequent iterations of method 1000, previously detected contents may be retained and newly captured vehicle state data may be processed to generate a new or updated set of detected contents accordingly.

Moving to operation 1008, the detected contents are evaluated to determine whether any changes have occurred. For example, operation 1008 may include identifying a change in position (e.g., above a predetermined threshold), the appearance of a new object or individual, or the disappearance of an object or individual, among other examples. By contrast, operation 1008 may not identify accumulation of debris (e.g., as a result of categorizing such changes to be debris or as a result of ignoring certain regions of the vehicle) or may ignore such changes up to a predetermined threshold (e.g., until an amount of debris may result in reduced functionality).

At determination 1010, it is determined whether there is a change between contents of an earlier instance of vehicle state data (e.g., as may have been captured by operation 1002 or an earlier iteration of operation 1004) and contents of a subsequent instance of vehicle state data (e.g., as may have been captured by the most recent iteration of operation 1004). As noted above with respect to operation 1008, a change may be determined in instances where a position has changed (e.g., above a predetermined threshold or outside of a predetermined range), where a new object or individual is identified, or the disappearance of an object or individual, among other examples. If it is determined that there has not been a change, flow branches "NO" and returns to operation 1004, such that method 1000 may loop between operations 1004-1010 to monitor the contents of the vehicle accordingly.

By contrast, if it is determined there has been a change, flow instead branches "YES" to operation 1012, where the identified change is processed. As an example, the change may be processed to generate a notification of the identified change. The notification may be presented to a vehicle operator via an operator interface of the vehicle (e.g., operator interface 204 in FIG. 2) or via a computing device (e.g., computing device 504, as may be the case in a teleoperation scenario). The notification may include an indication of a category for the identified change (e.g., a type of object or an indication that the change is related to an individual), an indication of the type of change (e.g., that an object was lost, that a new object was gained, or that an individual shifted), and/or an indication of a location at which the object or individual was last seen (e.g., based on a set of coordinates obtained from a GPS sensor).

In other examples, operation 1012 may perform different processing depending on whether the identified change is associated with an object or an individual. For example, if the change is associated with an individual and it is determined that the individual has shifted above a predetermined threshold or outside of a predetermined range, operation 1012 may include configuring operation of the vehicle to reduce driving aggressiveness, a maximum velocity of the vehicle, and/or any of a variety of additional or alternative metrics to improve the ride comfort for the individual.

As another example, if it is determined that a new object has been added to the contents of the vehicle, the vehicle may be configured to increase driving aggressiveness or may be controlled to move more erratically in an attempt to eject the object from the vehicle. The vehicle may subsequently resume normal operation once it is determined that the object has been ejected.

Additionally, or alternatively, operation 1012 may include storing a record of identified changes to vehicle contents, which may include an associate timestamp, image data, a GPS location, an associated category, and/or a change type, among other examples. In some instances, operation 1012 may perform different processing based on an associated operating mode of the vehicle (e.g., whether the vehicle is parked, under local manual control, under remote manual control, or under autonomous operation). Method 1000 terminates at operation 1012.

Sensor Feedback for Vehicle Diagnostics

In examples, vehicle health monitoring is performed by one or more onboard vehicle systems (e.g., vehicle controller 202 in FIG. 2). In such examples, monitoring is typically performed by a set of associated sensors, such that a vehicle system can determine when a sensor indicates a state that differs from an expected state (e.g., a sensor value above a threshold and/or outside of a range). However, due to various limitations (e.g., cost limitations, input/output limitations, and/or processing limitations), a limited number of sensors may be used, such that it may not be possible or may otherwise be very difficult to identify certain issues.

Figure 10B:
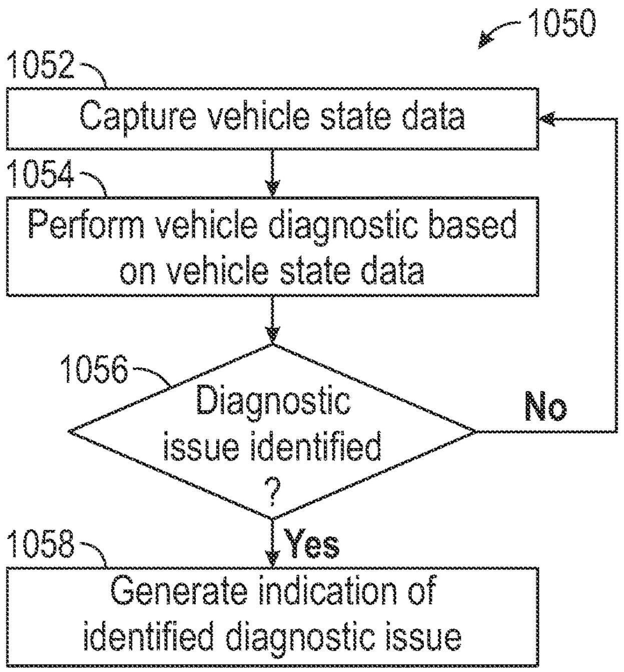
FIG. 10B illustrates an overview of an example method for monitoring the state of a vehicle for vehicle diagnostics according to aspects described herein.

Accordingly, FIG. 10B illustrates an overview of an example method 1050 for monitoring the state of a vehicle for vehicle diagnostics according to aspects described herein. Aspects of method 1000 may be performed by a teleoperation system (e.g., teleoperation system 508 in FIG. 5), a teleoperation data engine (e.g. teleoperation data engine 512 of computing device 504) and/or by a vehicle controller (e.g., vehicle controller 202 in FIG. 2 or vehicle controller 510), among other examples. Similar to aspects of method 1000 in FIG. 10A, method 1050 enables evaluation of a vehicle via the vehicle's teleoperation system, where vehicle diagnostics are performed in the present example.

As illustrated, method 1050 begins at operation 1052, where vehicle state data is captured. Vehicle state data may be captured by one or more sensors of the vehicle and/or of a teleoperation assembly (e.g., image sensors, LIDAR sensors, RADAR sensors, proximity sensors, and/or pressure sensors). In certain contexts, data from the vehicle sensors and/or the teleoperation assembly is masked to omit data relating to the vehicle (e.g., as may be the case when such data is used for autonomous operation and/or driver assistance systems). However, in the instant example, method 1050 processes data relating to the vehicle that may otherwise be masked for other processing. In examples, the sensors and/or teleoperation assembly provide at least partial coverage of the vehicle, thereby enable diagnostics to be performed on the vehicle that would otherwise not be possible or that would otherwise have one or more additional associated sensors (thereby increasing vehicle complexity and/or cost). While examples are described with respect to vehicle state data from sensors of the vehicle and/or from the teleoperation assembly, it will be appreciated that similar techniques may be performed based on state data obtained from another vehicle and/or from another data source (e.g., a drone).

In some examples, method 1052 includes repositioning a teleoperation assembly, such that a perspective offering an improved view of the vehicle is used to obtain the vehicle state data. However, it will be appreciated that the disclosed aspects may additionally or alternatively use vehicle state data captured from the teleoperation assembly at a pre-existing position. For example, a first instance of vehicle state data is captured at the pre-existing position, after which the teleoperation assembly is repositioned to obtain more detailed vehicle state data as a result of determining a diagnostic issue may exist (e.g., as a result of a previous iteration of method 1050).

Flow progresses to operation 1054, where one or more vehicle diagnostics are performed based on the vehicle state data. For example, operation 1054 includes processing the vehicle state data to perform object recognition (e.g., of vehicle doors, tires, body panels, and/or other vehicle members) and further processing the recognized objects to determine an associated state. Additionally, or alternatively, a machine learning model is used to classify vehicle state data, where the machine learning model is trained using image data corresponding to vehicles both in a good state and in a bad state (e.g., having damage and/or experiencing mechanical failure).

For example, as a result of such vehicle diagnostics performed at operation 1054, a loose physical part, wheel, or suspension of the vehicle may be identified. Additionally, or alternatively, smoke, steam, or liquid coming from the vehicle may be identified (e.g., as may be emitted from the vehicle and/or may be present on the ground). Further, debris encountered by the vehicle may be identified (e.g., a log stuck under the vehicle). As another example, internal/external lighting and/or an operator interface may be evaluated to identify an issue associated therewith. It will therefore be appreciated that the vehicle state data may thus enable any of a variety of vehicle diagnostic issues to be identified according to aspects described herein. In examples, processing performed at operation 1054 is performed local to and/or remote from the vehicle.

At determination 1056, it is determined whether a diagnostic issue is identified. For example, determination 1056 is a binary determination, where the presence or absence of an issue as a result of the processing performed at operation 1054 is determined. As another example, determination 1056 comprises evaluating a severity of an identified issue, such that an issue having a severity beneath a threshold is determined to not indicate a diagnostic issue. In some instances, a diagnostic issue is identified after further analysis is performed (e.g., based on vehicle state data captured from another perspective). If it is determined that a diagnostic issue has not been identified, flow branches "NO" and returns to operation 1052, such that the vehicle state is monitored as a result of a subsequent iteration of method 1050 as described above.

By contrast, if it is instead determined that a diagnostic issue has been identified, flow branches "YES" to operation 1058, where an indication of the identified diagnostic issue is generated. In examples, the indication is presented via an operator interface and/or transmitted to a remote computing device, such that it is displayed to a vehicle operator accordingly. Additionally, or alternatively, the identified diagnostic issue is added to a log associated with the vehicle. In some examples, the indication includes at least a part of the vehicle state data that corresponds to the identified issue (e.g., a portion of image data that depicts the identified issue). While method 1050 is illustrated as an example in which an indication is generated as a result of identifying a diagnostic issue, it will be appreciated that any of a variety of additional or alternative actions may be performed, such as adapting operation of the vehicle to account for the identified issue (e.g., imposing or reducing a vehicle top speed and/or restricting other vehicle functionality). As illustrated, method 1050 terminates at operation 1058.

Follow My Tracks

In instances where multiple vehicles are traversing terrain, it may be beneficial for a subsequent vehicle to follow the tracks of an earlier vehicle. For example, if there is narrow clearance obstacles, large local changes in terrain, deep sections of water or mud, snow-covered obstacles, and/or ice, a successful traversal by the earlier vehicle may enable the subsequent vehicle to traverse the terrain with increased confidence and reduced likelihood of an unfavorable outcome (e.g., vehicle damage, rolling over, or getting stuck). In other instances, it may be beneficial to follow a path that is substantially different than that of an earlier vehicle (e.g., when traversing a swamp trail), such that knowledge of the earlier vehicle's path may still improve the likelihood of a favorable outcome for the subsequent vehicle. Thus, the path of a vehicle's ground-engaging members (e.g., four tires or two treads) may be used in such instances, rather than a less granular, single-point path (e.g., as may be determined using GPS data alone). Further, GPS may not provide a sufficient level of accuracy and may be unreliable, as hills, buildings, vegetation, or other obstacles may distort GPS signals.

Figure 11A:
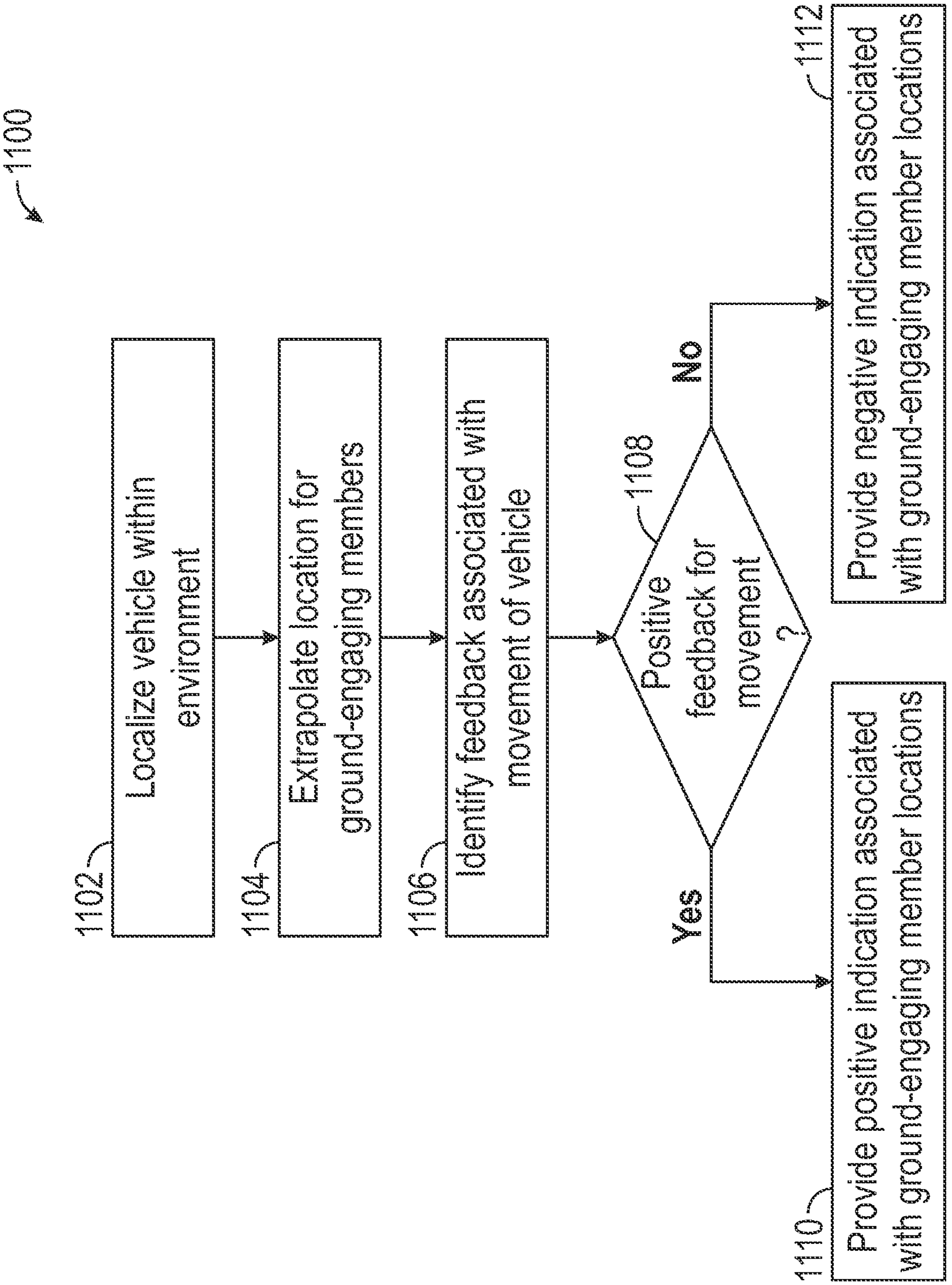
FIGS. 11A-11B illustrate overviews of example methods for traversing terrain based on the path of a set of ground-engaging members of a vehicle.
Figure 11B:
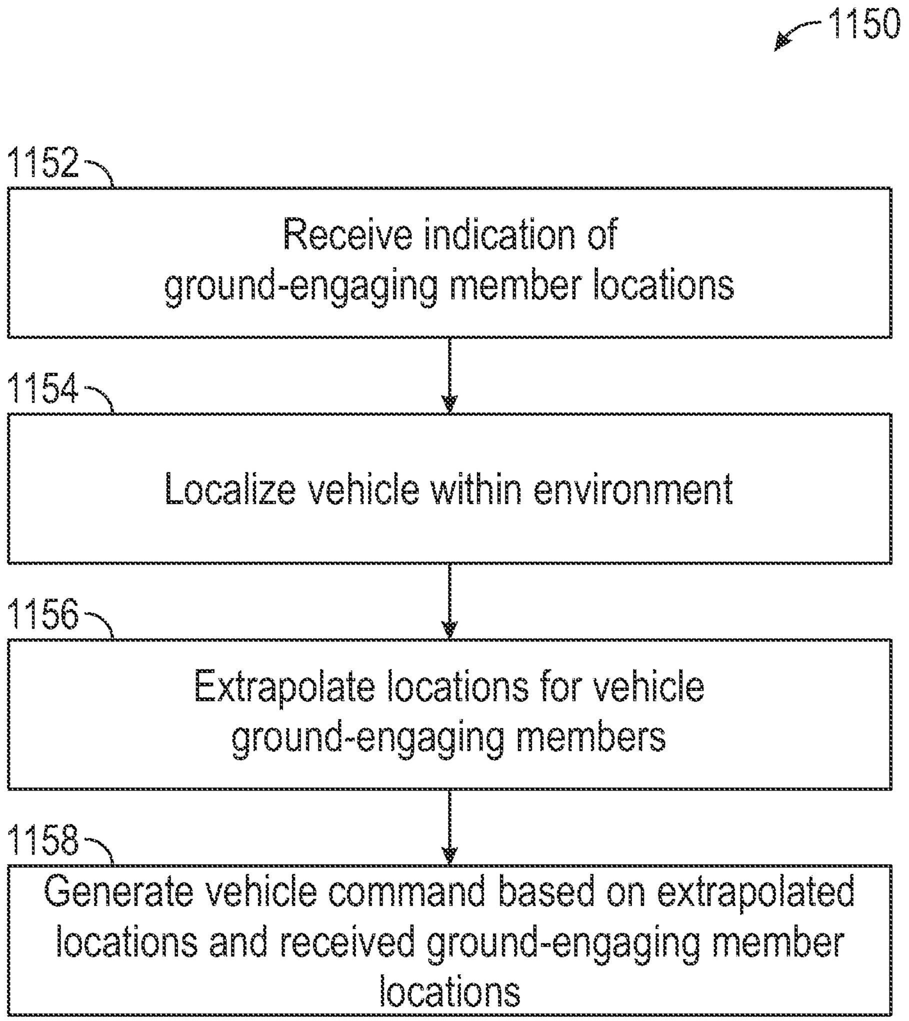

Accordingly, FIGS. 11A-11B illustrate overviews of example methods for traversing terrain based on the path of a set of ground-engaging members of a vehicle. The disclosed aspects may be used to operate a vehicle in a manned autonomy mode or a full autonomy mode, among other examples. As an example, an autonomous lead vehicle may traverse a terrain, such that one or more subsequent vehicles operating in a manned autonomy mode traverse the terrain according to a similar path. As another example, a follower vehicle may operate in an autonomy mode to follow a leader vehicle that is under manual control.

With reference to FIG. 11A, method 1100 illustrates an example method that may be performed by a vehicle generating traversal data for one or more subsequent vehicles (which may also be referred to as a "leader" vehicle). It will be appreciated that, in some examples, a first vehicle may be a leader vehicle with respect to a second vehicle and may also be a follower vehicle with respect to a third vehicle (such that the third vehicle is a leader vehicle with respect to the first vehicle). In examples, aspects of method 1100 may be performed by a vehicle controller, such as vehicle controller 202 in FIG. 2.

Method 1100 may be performed iteratively so as to provide successive updates to ground-engaging member locations of the vehicle to one or more other vehicles, thereby enabling the other vehicles to traverse a substantially similar path to the vehicle (e.g., by performing aspects of method 1150 discussed below with respect to FIG. 11B).

Method 1100 begins at operation 1102, where the vehicle is localized within its environment. In examples, localizing the vehicle includes processing data from image sensors, LIDAR sensors, and/or RADAR sensors (e.g., as may be part of the vehicle and/or a teleoperation assembly according to aspects described herein) to generate a 3D representation of the environment. In instances where a subsequent iteration of method 1100 is performed and operation 1102 is used to update the localization of the vehicle, the 3D representation of the environment may be processed using machine learning techniques to reorient the vehicle within its environment while accounting for changes, as may result from vehicle interactions with the environment and/or due to environmental conditions (e.g., wind, rain, or snow), among other examples.

At operation 1104, positions for ground-engaging members of the vehicle are extrapolated based on the localization that was performed at operation 1102. In examples, a 3D model of the vehicle is used to simulate a location for each ground-engaging member within the environment. As an example, a location may be determined for each wheel or tread of the vehicle. In some instances, operation 1104 further includes evaluating sensor data indicating a state of the vehicle, such as a steering position sensor to determine a steering position of the ground-engaging members. Thus, the extrapolated location for each ground-engaging member of the vehicle may include a location in 3D space, as well as an orientation and/or associated size in some examples, among other attributes.

Flow progresses to operation 1106, where feedback associated with movement of the vehicle is identified. In examples, operations 1102 and 1104 may be performed multiple times prior to operation 1106, as may be the case when a path of the vehicle is being recorded, such that the recorded path of the vehicle may subsequently be labeled as either a positive path or a negative path for a subsequent vehicle to follow. Feedback identified at operation 1106, may include explicit feedback (e.g., from a vehicle operator or a passenger) and/or feedback from any of a variety of vehicle sensors (e.g., determining whether an IMU experienced a force above a predetermined threshold). In other examples, the feedback may comprise evaluating a state of the vehicle to determine whether the vehicle is in a good state (e.g., whether the vehicle is operational or has become stuck and is thus immobile).

Accordingly, at determination 1108, it is determined whether the feedback indicates that movement of the vehicle was positive. If it is determined that the feedback is positive, flow branches "YES" to operation 1110, where a positive indication is provided to one or more other vehicles that includes a set of locations for the vehicle's ground-engaging members. By contrast, if the feedback is negative, flow instead branches "NO" to operation 1112, where a negative indication is provided that includes the set of ground-engaging member locations. In addition to the ground-engaging member locations, such indications may further include data usable to localize a recipient vehicle within the environment, including, but not limited to, image data, landmarks, and/or 3D geometry of the environment that was identified at operation 1102. Thus, the path of the vehicle including the ground-engaging member locations may be used as a positive or a negative example by which a subsequent vehicle will travel, as discussed in greater detail below with respect to FIG. 11B.

As noted above, a follower vehicle in one instance may operate as a leader vehicle in another instance (e.g., with respect to a different vehicle). In such examples, an indication provided by the vehicle may include at least part of an earlier-received set of ground-engaging member locations, thereby indicating that a previously received path was successful or, as another example, revising or expanding such an earlier-received path. Method 1100 terminates at operation 1110 or operation 1112.

FIG. 11B illustrates an overview of an example method 1150 for control of a follower vehicle based on localized ground-engaging member locations received from a leader vehicle according to aspects described herein. In examples, aspects of method 1150 may be performed by a vehicle controller, such as vehicle controller 202 in FIG. 2. Method 1150 may be performed iteratively so as to follow a leader vehicle based on successive updates from the leader vehicle.

Method 1150 begins at operation 1152, where an indication of ground-engaging member locations is received from a leader vehicle. For example, the indication may be received as a result of the leader vehicle performing aspects of method 1100 discussed above with respect to FIG. 11A. As noted above, the indication may include ground-engaging member locations and environment data usable to localize the vehicle within the environment, including, but not limited to, image data, landmarks, and/or 3D geometry of the environment. The indication may be received directly from the leader vehicle or using mesh networking, among other examples Accordingly, at operation 1154, the vehicle is localized within the environment. Aspects of operation 1154 are similar to those discussed above with respect to operation 1102 and are therefore not redescribed in detail. In examples, a 3D representation of the environment generated at operation 1154 to localize the vehicle may further be processed based on environment data that was received at operation 1152, thereby orienting the vehicle with respect to a location of the leader vehicle as indicated by the environment data.

Flow progresses to operation 1156, where a location is extrapolated for each ground-engaging member of the vehicle. Aspects of operation 1156 are similar to those discussed above with respect to operation 1104 in FIG. 11A and are therefore not redescribed in detail.

At operation 1158, one or more vehicle commands are generated based on the extrapolated ground-engaging member locations and the corresponding received ground-engaging member locations. For example, as a result of generating a location for each ground-engaging member of the vehicle, a difference between the extrapolated locations and the received locations may be evaluated to generate a set of vehicle commands that cause the vehicle to maneuver in a way that ultimately achieves substantially similar ground-engaging member locations of the vehicle as compared to the received locations. In examples, movements of the vehicle may be simulated or otherwise determined using a 3D model of the vehicle so as to determine the set of vehicle commands that will result in ground-engaging member locations that are similar to the received locations. As another example, a subset of locations may be processed, for example to control the front ground-engaging members, as the rear ground-engaging members will follow a similar path as the leader vehicle as a result of controlling the front ground-engaging members accordingly.

In other examples, one or more commands may have been received at operation 1152, such that the received commands may be performed by the vehicle. For example, once it is determined that the vehicle is at a similar location as the leader vehicle was when the received commands were executed by the leader vehicle (e.g., as a result of localizing the vehicle within the environment as described above), the commands may be executed by the vehicle, thereby traversing the terrain in a similar manner to the leader vehicle.

It will be appreciated that similar techniques may be used in instances where a follower vehicle is to take a different path than the leader vehicle, where ground-engaging member locations may be compared to received locations to ensure the vehicle travels a different path within the environment (e.g., maintaining a minimum distance from the path of the leader vehicle). Further, similar techniques may be applied in instances where the follower vehicle is different than the leader vehicle (e.g., having a different wheelbase, a different number and/or type of ground-engaging members, or tires of different width). In such examples, vehicle control commands may be determined in a way that maximizes or otherwise prioritizes overlap with the path traveled by the leader vehicle or may aim to maintain a center of the vehicle at a similar location along the path as the leader vehicle, among other examples.

Similar to method 1100 in FIG. 11A, method 1150 may be performed iteratively to maneuver a vehicle along a path that is similar to that of the leader vehicle. Further, vehicle localization may be iteratively performed to address instances where the localized location of the vehicle may gradually shift or instances where changes to the environment may otherwise introduce an amount of processing error. Further, it will be appreciated that similar techniques may be used to facilitate semi-autonomous or manual control of the vehicle. For example, an indication of one or more paths may be presented to a vehicle operator (e.g., via an operator interface and/or remote computing device). Additionally, or alternatively, an indication of one or more vehicle adjustments may be provided (e.g., to change vehicle speed and/or steering angle), thereby instructing the vehicle operator to provide manual inputs with which to traverse the terrain accordingly. As another example, the vehicle may operate under autonomous control and may present a path to be traversed by the vehicle, while the vehicle operator may provide input to assert manual control over the vehicle in some instances (e.g., to change which path the vehicle is following or to account for changing terrain). Method 1100 terminates at operation 1158.

Autonomous Anchor Mode.

In some instances, a vehicle may be used as an anchor point. For example, the vehicle may include a winch to pull an object or another vehicle toward the vehicle (e.g., to rescue the other vehicle from mud or another scenario in which the vehicle has become stuck). However, traction of the vehicle may be insufficient in some instances, such that the vehicle is instead pulled toward the object or other vehicle.

Figure 12:
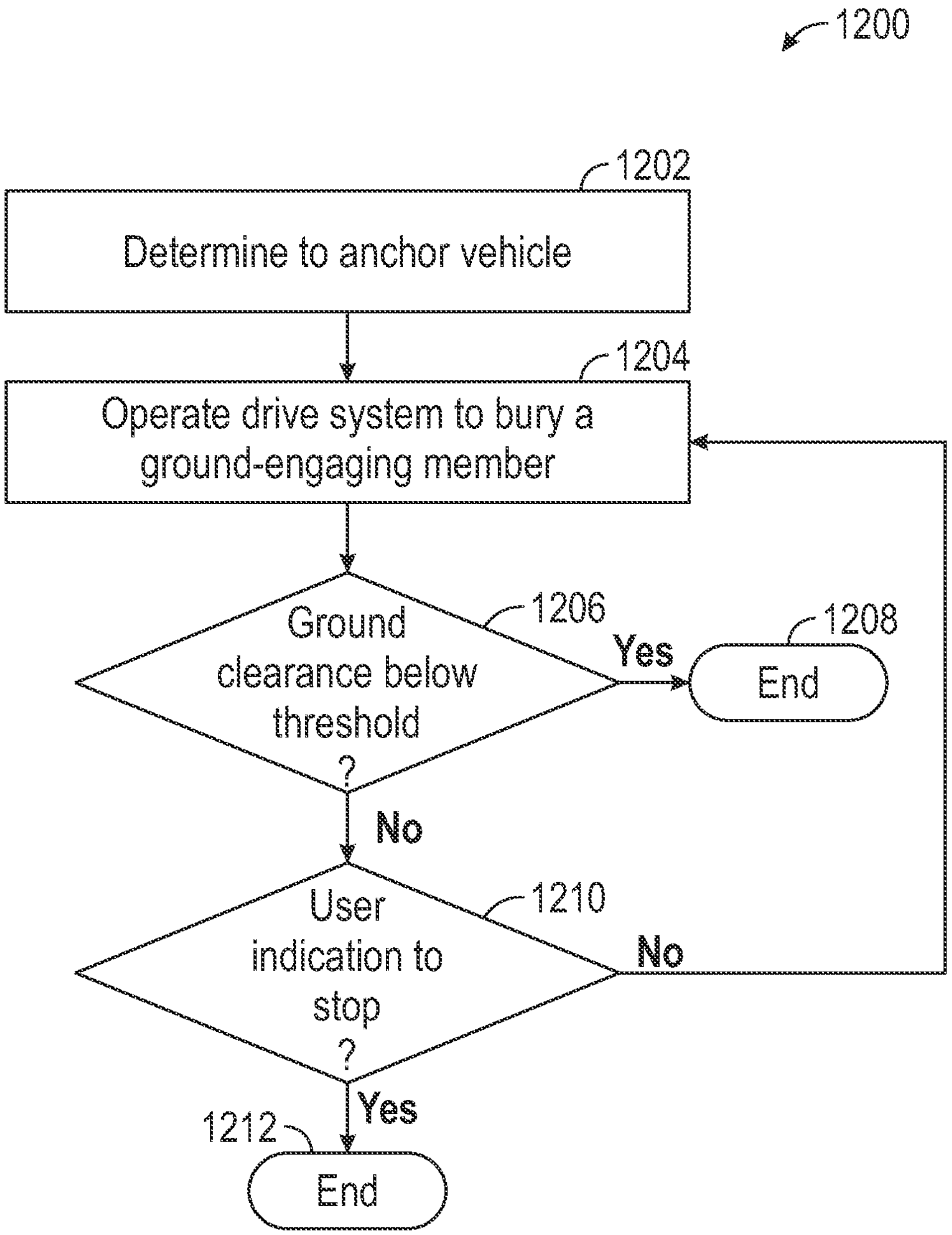
FIG. 12 illustrates an overview of an example method for automatically anchoring a vehicle to increase the amount of traction available to the vehicle.

Accordingly, the vehicle may be operated to intentionally bury one or more ground-engaging members below the surface of the ground, thereby increasing the amount of traction that is available to the vehicle. FIG. 12 illustrates an overview of an example method 1200 for automatically anchoring a vehicle according to such aspects. In examples, aspects of method 1200 may be performed by a vehicle controller, such as vehicle controller 202 discussed above with respect to FIG. 2.

Method 1200 begins at operation 1202, where it is determined to anchor the vehicle. For example, it may be determined to anchor the vehicle based on received user input (e.g., as a result of a user actuating a control in an operator area of the vehicle or based on a command received from a remote computing device). In other examples, it may automatically be determined to anchor the vehicle, for example based on determining that the vehicle does not have a sufficient amount of available traction (e.g., as a result of identifying vehicle movement via an IMU during operation of a winch).

At operation 1204, a drive system (e.g., drive system 212 in FIG. 2) of the vehicle is operated to bury at least one ground-engaging member of the vehicle. In instances where the drive system is capable of separate torque directions between the front and the rear of the vehicle (e.g., as may be the case for a dual-motor electric vehicle), the drive system may be operated so as to output opposite torque for each group of ground-engaging members and thus cause the ground-engaging members to fight against each other and dig into the terrain accordingly. In examples, the ground-engaging members may be operated in a way that causes dirt and debris to accumulate away from the underside of the vehicle (e.g., such that a front set of ground-engaging members is operated in a reverse direction and a rear set of ground-engaging members is operated in a forward direction). As another example, an antilock brake system (ABS) may be used to alternate between ground-engaging members, thereby sinking each tire individually. In such an example, the direction with which a ground-engaging member is rotated may similarly alternate.

At determination 1206, it is determined whether a ground clearance is below a predetermined threshold. For example, a proximity sensor may be located beneath the vehicle to determine an amount of remaining clearance as a result of performing operation 1204. In other examples, a similar determination may be made as to an amount of torque that is output to the ground-engaging members, such that torque above a predetermined threshold may indicate that method 1200 is to terminate. In some instances, such thresholds may be user-configurable or may vary depending on the terrain (e.g., based on how quickly the vehicle is descending and/or the sensed density of the dirt/debris under the vehicle). It will thus be appreciated that any of a variety of determinations may be used according to aspects described herein.

If it is determined that the ground clearance is below the predetermined threshold, flow branches "YES" and terminates at operation 1208. Thus, the vehicle may increase the amount of available traction as a result of performing operation 1204, while stopping before ground clearance is too low and the vehicle is stuck as a result.

If, however, it is instead determined that the clearance is not below the predetermined threshold, flow branches "NO' to determination 1210, where it is determined whether there has been a user indication to stop. Such a user indication may be similar to those discussed above with respect to operation 1202. Accordingly, if it is determined that a user has provided a stop indication, flow branches "YES" and ends at operation 1212. By contrast, if no stop indication has been received, flow instead branches "NO" and returns to operation 1204, such that method 1200 continues to loop between operations 1204-1210 until the predetermined threshold is reached or a stop indication is received.

Center of Mass Modeling and Rollover Prediction

In instances where a vehicle is operating under remote and/or autonomous control, it may be difficult to gauge associated vehicle dynamics, especially in instances where such dynamics are dependent on properties that can change between driving periods (e.g., between a key-off event and a subsequent key-on event). For example, the payload of the vehicle may change, such that the gross vehicle weight (GVW) of the vehicle may change, as may the associated center of mass (COM). Such issues may further be exacerbated in instances where an unloaded vehicle weight differs greatly from the loaded vehicle weight (e.g., the GVW), as vehicle operation otherwise be controlled based on its factory-configured (e.g., unloaded) vehicle weight.

Thus, changes to the GVW and associated COM may affect the maneuverability of the vehicle, which, for example, may limit a maximum speed and/or a maximum turning angle of the vehicle to reduce the likelihood of rollover. Accordingly, a variety of vehicle sensors (e.g., vehicle suspension position sensors and one or more IMU sensors) and/or vehicle operation information may be used in combination with vehicle driving experiences to generate one or more estimated COM metrics according to aspects described herein, which may thus be used to tune vehicle limits more accurately during remote and/or autonomous operation.

Figure 13A:
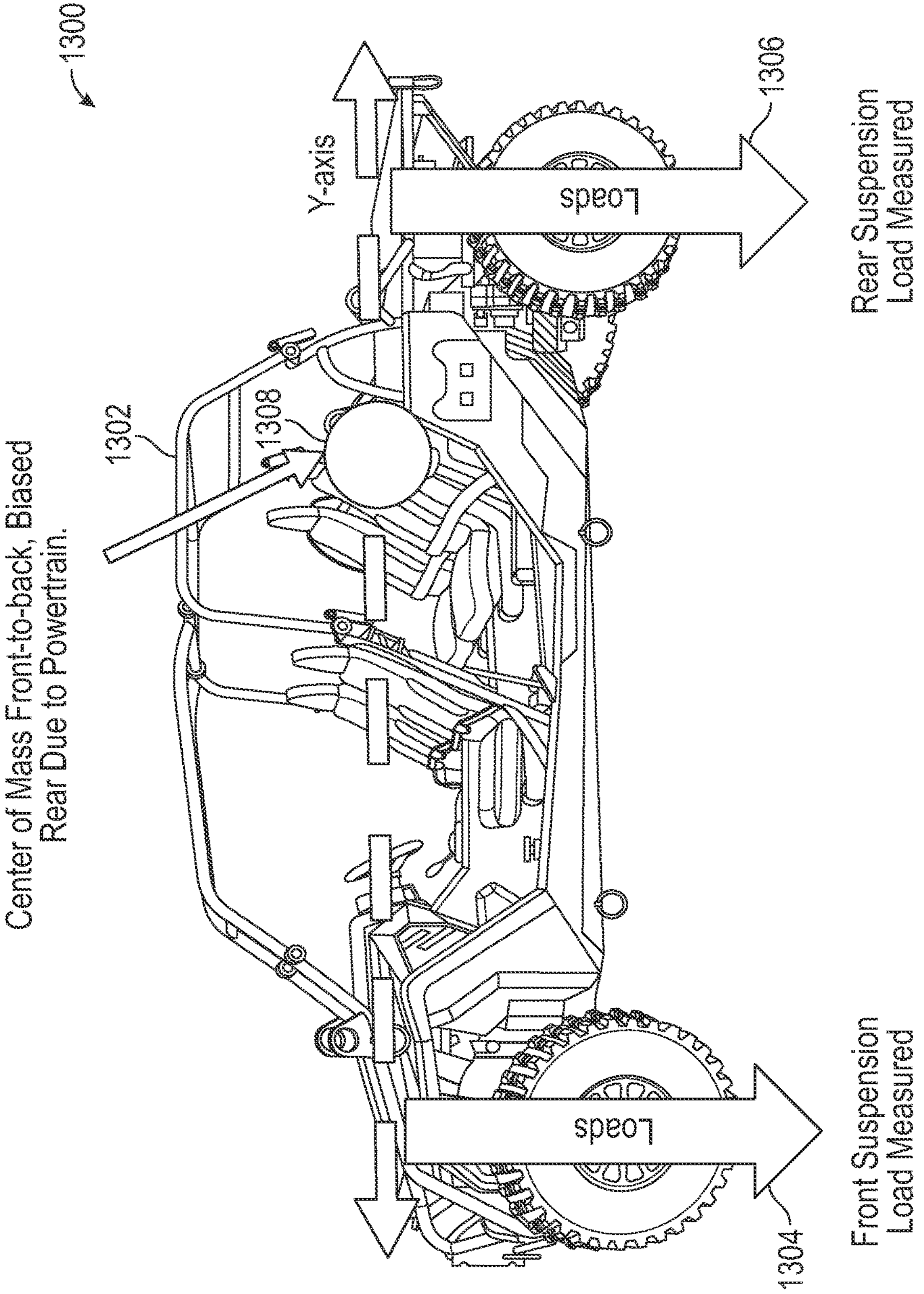
FIGS. 13A-13C illustrate example views of a vehicle for which a center of mass may be determined according to aspects described herein.

As illustrated in view 1300 of FIG. 13A, front load 1304 and rear load 1306 of vehicle 1302 may be measured using suspension positions sensors (e.g., associated with the front of vehicle 1302 or the rear of vehicle 1302, respectively), thereby determining a location 1308 of the center of mass along a longitudinal axis of the vehicle (e.g., the Y-axis). Similarly, with reference to view 1320 of FIG. 13B, left load 1322 and right load 1324 may be measured using suspension position sensors (e.g., associated with the left side of vehicle 1302 or the right side of vehicle 1302, respectively) and/or vehicle orientation data (e.g., as may be obtained from an IMU), thereby determining a location 1326 of the center of mass along a lateral axis of the vehicle (e.g., the X-axis). In an example, each suspension position sensor may be associated with a ground-engaging member of the vehicle.

Figure 13B:
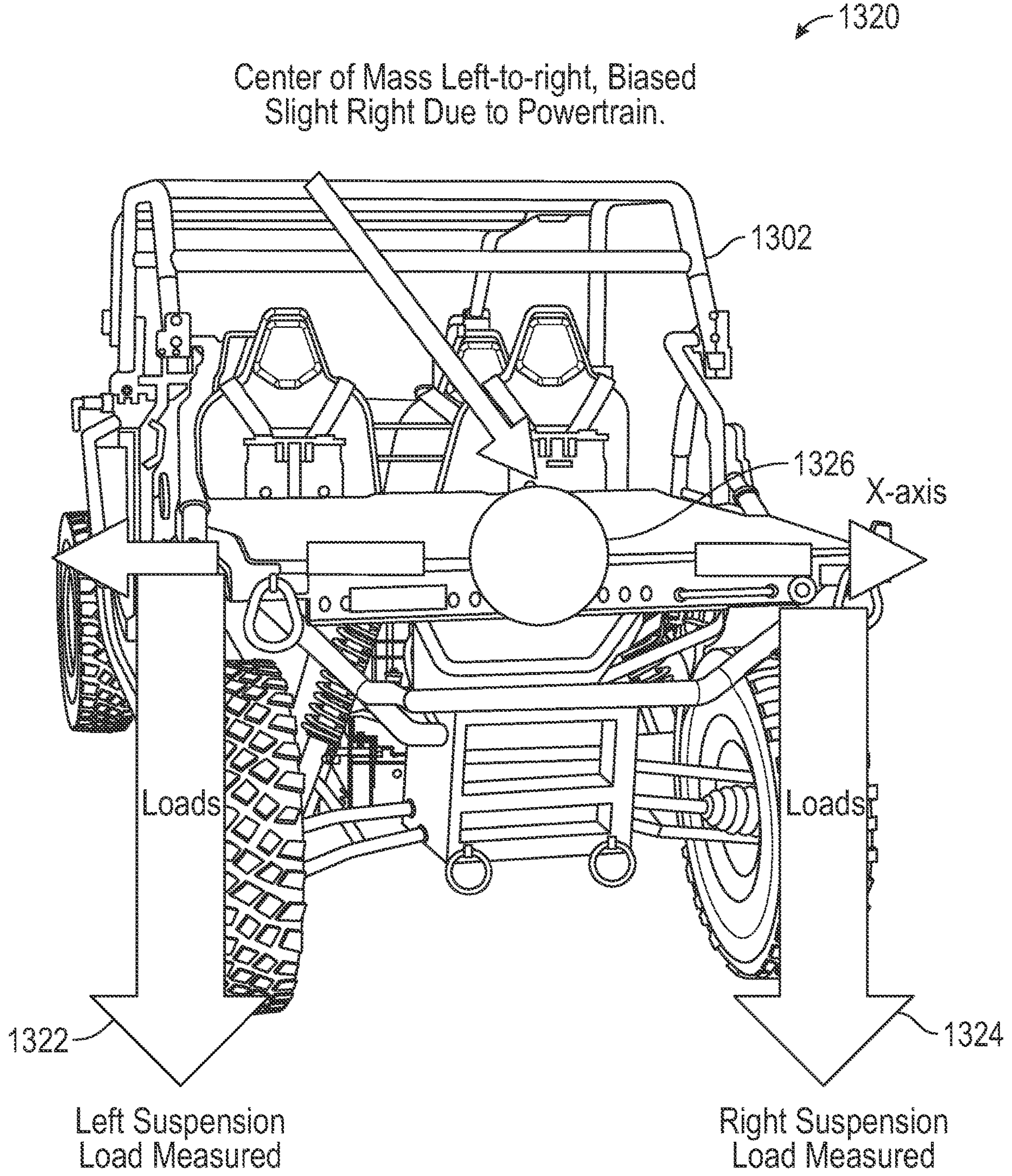

However, determined locations 1308 and 1326 in FIGS. 13A and 13B, respectively, provide an indication as to the center of mass in only two dimensions (e.g., in the X- and Y-planes), which may still result in variable or unexpected vehicle behavior depending on where the center of mass is in the Z-plane). For instance, if the center of mass is lower to the ground, vehicle 1302 may have a comparatively reduced likelihood of rollover as compared to an example where the center of mass is higher off the ground.

Accordingly, one or more driving experiences of the vehicle (e.g., based on changes to a vehicle's direction and/or magnitude during operation, as may be determined based on IMU data and/or vehicle operation information) may be used to determine the COM location in the Z-plane (e.g., the vertical axis). In examples, a vehicle may start with a relatively low-threshold rollover model (e.g., having low speed and/or steering thresholds) until additional driving experiences have been collected with which to generate an updated or refined COM location in three dimensions (e.g., having increased confidence).

As the vehicle encounters force inputs, the effect of the vehicle's COM on the vehicle's reaction may be observed using the suspension position sensors. Example force inputs include, but are not limited to, a Y-axis change resulting from a change in terrain or differing suspension changes (e.g., where outside suspension position sensors register a change of a different magnitude as compared to inside position sensors) that result from going into a high-braking corner or going into a high-speed corner.

Figure 13C:
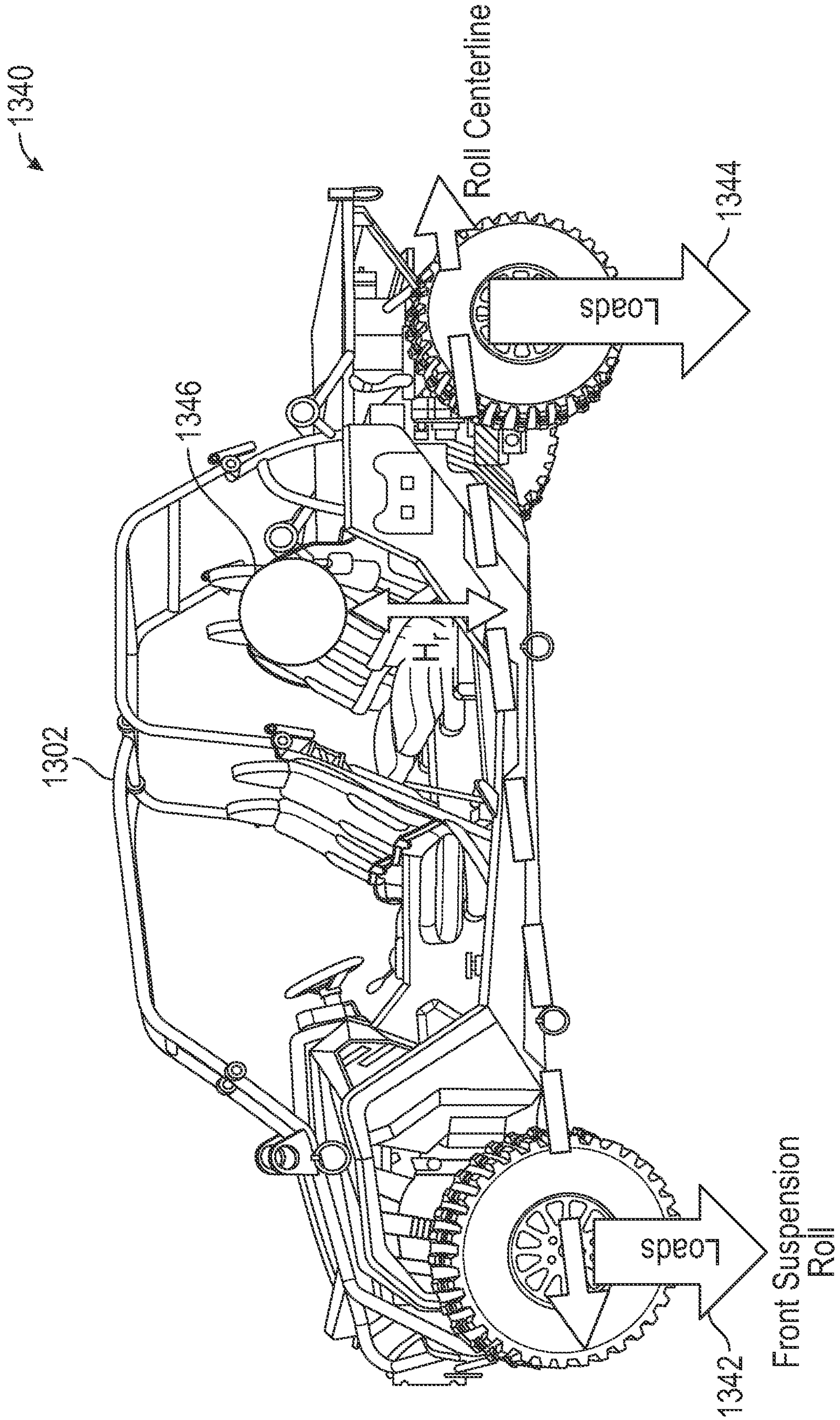

View 1340 of FIG. 13C illustrates an example in which vehicle 1302 experiences a turn, where H r is the Z-axis distance between the roll-axis line and the COM of vehicle 1302. Further, Kroll may be the reaction between the roll moment Troll and the vehicle's total roll stiffness K T, which may be a known constant for a given vehicle or may be programmatically determined from associated vehicle information. Additionally, Kroll is related to the change in the roll angle for the vehicle (e.g., dB), which may be measured via the relative change indicated by suspension position sensors of the vehicle. It will be appreciated that Kroll may be determined using any of a variety of additional or alternative information, for example as may be obtained from one or more sensors that indicate local changes within the vehicle's environment. The vehicle's mass M may be determined based on the suspension position sensors (e.g., based on an amount of compression detected by the sensors while the vehicle is at rest). Finally, the angular acceleration a L can be determined using one or more IMUs of vehicle 1302, such that the following set of equations may be used to determine the Z-axis COM offset H r of the vehicle accordingly:

$$T_{roll} = M a_L H_r$$

$$K_{roll} = \frac{T_{roll}}{K_T}$$

$$K_{roll} = \frac{\partial \theta}{\partial a_L}$$

Additionally, because forces experienced by the vehicle may occur from other inputs (e.g., separate from the vehicle), vehicle operation information (e.g., associated with braking/traction system 208, steering system 210, and/or drive system 212) may be correlated with identified forces that are used to generate a COM estimate. Example vehicle operation information includes, but is not limited to, steering angle, braking force, and/or vehicle speed.

Driving experiences may be collected and processed during normal vehicle operation, may be generated as a result of an automated sequence performed by the vehicle (e.g., a calibration sequence), or may be obtained as a result of a vehicle operator completing various tasks as instructed by the vehicle to complete calibration. Further, it will be appreciated that, depending on the resolution of the sensors of the vehicle, additional or fewer driving experiences may be used to reliably generate a COM estimate.

In some examples, driving experiences are collected and processed every time a vehicle is powered on (e.g., as loading of the vehicle may change between key-on events) or may be collected and processed after a change above a predetermined threshold is identified. For example, if data reported by suspension position sensors remains substantially consistent across periods of operation, a previously determined COM estimate may be used after a subsequent key-on event. The COM estimate may be evaluated during subsequent vehicle operation to confirm that the COM estimate is representative of the state of the vehicle. If it is determined that the COM estimate is not representative (e.g., forces encountered by the vehicle result in vehicle behavior that differs from expected vehicle behavior outside of a predetermined threshold), the vehicle may revert to a comparatively lower-threshold rollover model and/or a calibration sequence may be initiated until a sufficient amount of driving experiences have been processed to again yield a COM estimate having a predetermined confidence level.

While example equations, sensor data, and associated vehicle operation information is described, it will be appreciated that any of a variety of additional or alternative processing may be performed. For example, aspects of vehicle content identification and processing discussed above with respect to FIG. 10A may be used to identify various objects within the vehicle and generate an initial COM estimate based on locations and estimated weights accordingly. The initial COM estimate may thus be further refined based on driving experiences as described above.

Once a COM has been estimated for a vehicle (e.g., above a predetermined confidence level or having an error level below a predetermined threshold), the COM estimate may be used to facilitate autonomous path traversal (e.g., navigating the path as quickly as safely possible given the estimated COM), may be used to generate a path across terrain (e.g., accounting for the likelihood of adverse vehicle outcomes, such as rollover, based on the estimated COM), may be used to configure vehicle limits, and/or may be presented to a vehicle operator during manned vehicle operation (e.g., from within a vehicle operator area or via teleoperation according to aspects described herein). For example, a safe cornering speed may be determined based on a vehicle's current speed and the estimated COM, which may be presented to a vehicle operator using a heads-up display. In such an example, a projected path of the vehicle may be overlaid on top of the vehicle's environment, in combination with the determined safe cornering speed of the vehicle.

While a maximum vehicle speed and/or turning angle are provided as example aspects that may be configured based on a COM estimate generated according to aspects of the present disclosure, it will be appreciated that any of a variety of additional or alternative aspects of a vehicle may be configured accordingly. For example, an acceleration threshold and/or a deceleration threshold may be configured based on the COM estimate.

Additional examples of active agility control of a vehicle are disclosed in U.S. patent application Ser. No. 17/235,322, filed Apr. 20, 2021, published as U.S. Patent Publication No. 2021/0323515, titled "Systems and Methods for Operating an All-Terrain Vehicle," the entire disclosure of which is expressly incorporated herein by reference for all purposes.

Critical Momentum Detection and Auto-Rocking.

In examples, a vehicle may become stuck when traversing terrain, as may be the case when forward momentum of the vehicle drops below a threshold. For example, as forward momentum decreases and the vehicle's ground-engaging members no long clear mud or snow from in front of the vehicle, the vehicle may instead begin to sink into the mud or get stuck in the snow. Additionally, a vehicle operator may have difficulty identifying when such a critical threshold has been passed, such that the vehicle operator may attempt to continue forward movement, thus causing the vehicle to instead dig itself further into the terrain.

Figure 14:
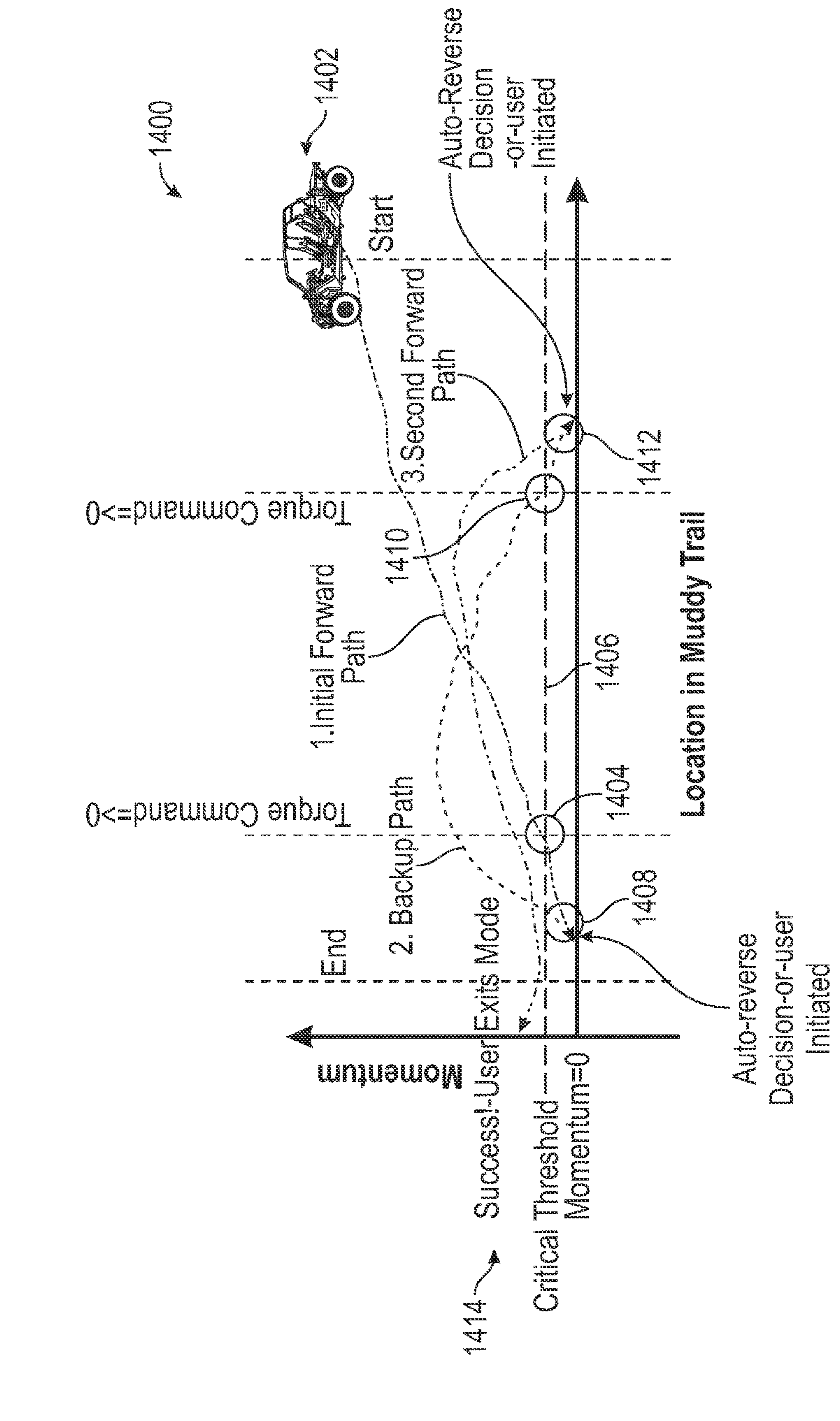
FIG. 14 illustrates an overview of an example method for automatically controlling vehicle operation based on identifying a critical momentum threshold of the vehicle.

Accordingly, FIG. 14 illustrates an overview of an example method 1400 for automatically controlling vehicle operation based on identifying a critical momentum threshold of the vehicle. In examples, method 1400 evaluates forward momentum and, more specifically, deceleration of the vehicle to determine when the vehicle is no longer making forward progress, such that the vehicle may automatically be controlled to reverse its direction and reapproach the challenging terrain with increased momentum, thereby increasing the likelihood of additional forward progress and ultimate success.

In examples, aspects of method 1400 may be performed by a vehicle controller, such as vehicle controller 202 in FIG. 2. For example, method 1400 may be performed automatically in response to determining that momentum of the vehicle has dropped below a predetermined threshold or in response to user input received from a vehicle operator. As an example, an operator interface (e.g., operator interface 204) may include a button, switch, or other input control that may be actuated by a vehicle operator to cause the vehicle controller to perform aspects of method 1400 accordingly. As another example, such an input control may enable an operating mode in which aspects of method 1400 are performed automatically based on determining that momentum of the vehicle has dropped below the predetermined threshold.

Method 1400 begins at 1402, where a vehicle is traveling along an initial forward path. For example, the vehicle operator may maneuver the vehicle (e.g., from an operator area or via teleoperation) to traverse terrain. As another example, at least a part of such vehicle operation may result from autonomous operation of the vehicle.

Momentum of the vehicle may be determined based on one or more IMUs. In some instances, sensor data from an IMU may be combined with GPS data and/or vehicle movement determined based on a ground-oriented camera (as may be the case when the IMU does not provide data with sufficient resolution and/or accuracy to reliably determine the vehicle's deceleration). As illustrated, momentum of the vehicle may gradually decrease as the vehicle's ability to clear mud, dirt, or other debris in its path decreases. Eventually, the momentum of the vehicle is beneath critical threshold 1406, at which point the vehicle is configured to output substantially zero (or, in other examples, decreased) torque at operation 1404. As a result of operation 1404, the vehicle may not dig itself into the terrain but may instead coast to a stop. In some instances, operation 1404 comprises providing an indication to the vehicle operator that vehicle momentum has decreased below critical threshold. Critical threshold 1406 may be automatically determined based on one or more characteristics of the terrain, including, but not limited to, terrain density, an amount of torque (e.g., as may be determined from a drive system of the vehicle, such as drive system 212) associated with a given amount of movement with the environment (e.g., as may be determined from one or more sensors of the vehicle), a clearance of the vehicle, and/or a type/number of ground-engaging members of the vehicle, among other examples.

Once it is determined that the vehicle has substantially no remaining forward momentum, the vehicle is automatically configured to move in the reverse direction at operation 1408. In other examples, operation 1408 may be performed in response to user input received from the vehicle operator (e.g., actuating an input control of an operator interface). Accordingly, the vehicle may move in the opposite direction (e.g., along the path that it had previously traveled as a result of operation 1402). The vehicle may use the same relative throttle as the throttle input provided by the vehicle operator (potentially using a different throttle-map torque curve). During this period, momentum increases and critical threshold 1406 is monitored (or another threshold of a different setpoint) to determine when the vehicle has reached a momentum level whereupon feature transition below threshold 1406 may again trigger the function as described (e.g., as may be implemented as a hysteresis function). Eventually, the momentum of the vehicle may once again fall below critical threshold 1406, such that the vehicle is configured to output substantially zero (or, in other examples, decreased) torque at operation 1410.

It will be appreciated that, while method 1400 is illustrated as using the same critical threshold 1406 for both operation 1404 and operation 1410, different critical torque thresholds may be used in other examples. Additionally, the determination at operation 1410 may be made with respect to any of a variety of alternative or additional thresholds, for example including determining the vehicle has traveled a sufficient distance (e.g., over which it will gather an estimated amount of momentum), such that the vehicle is likely to make additional forward progress (e.g., traveling past the point that was reached at operation 1408) once it has resumed forward progress (e.g., at operation 1412 discussed below). While the disclosed aspects are with respect to triggering based on such a critical momentum threshold, it will be appreciated that any of a variety of alternative or additional thresholds may be used (e.g., first and/or second order differentials of momentum). As another example, operation 1410 may be performed based at least in part on received user input.

Once it is determined that the vehicle has substantially no remaining backward momentum, the vehicle is automatically configured to once again move in the forward direction at operation 1412. In other examples, operation 1412 may be performed in response to user input received from the vehicle operator (e.g., actuating an input control of an operator interface). The vehicle may use the same relative throttle as the throttle input provided by the vehicle operator (potentially using a different throttle-map torque curve). Thus, as illustrated, the vehicle travels along a "second forward path" and, after experiencing a decrease in momentum, ultimately travels at an increasing momentum that is above critical threshold 1406. As noted above, the same or a different critical threshold may be used. As a result of determining that the vehicle is experiencing increasing momentum and/or has passed the initial location at which the critical momentum threshold was crossed (e.g., at operation 1404), the operating mode may automatically be disabled at operation 1414. In other examples, the operating mode may remain enabled, such that the vehicle may automatically control vehicle operation in a subsequent instance where vehicle momentum once again drops below critical threshold 1406.

It will be appreciated that additional iterations of operations 1404, 1408, 1410, and 1412 may be performed prior to operation 1414 in other examples (e.g., in instances when additional rocking is needed to achieve forward progress). Additionally, method 1400 may be preferably performed by a vehicle having a direct-drive electric vehicle powertrain, which may exhibit reduced time associated with reconfiguring the vehicle for a change in direction (e.g., as would other be associated with gear shifting).

Deep Learning for Audible Noise Reduction in Path Planning

A path for a vehicle may be generated based at least in part on a machine learning model, which may process features of the vehicle's environment to generate a path with which to traverse terrain of the environment accordingly. However, such path planning techniques may not account for an audio signature associated with terrain traversal, as may result from vehicle operation (e.g., noise generated by a prime mover and/or drive train, as well as wheel slip) or vehicle interaction with the environment (e.g., snapping twigs, moving rocks, or splashing water). Thus, automatic path planning may yield less favorable paths in instances where a reduced audio signature is desirable, as may be the case when the vehicle operator is hunting, among other examples.

Figure 15A:
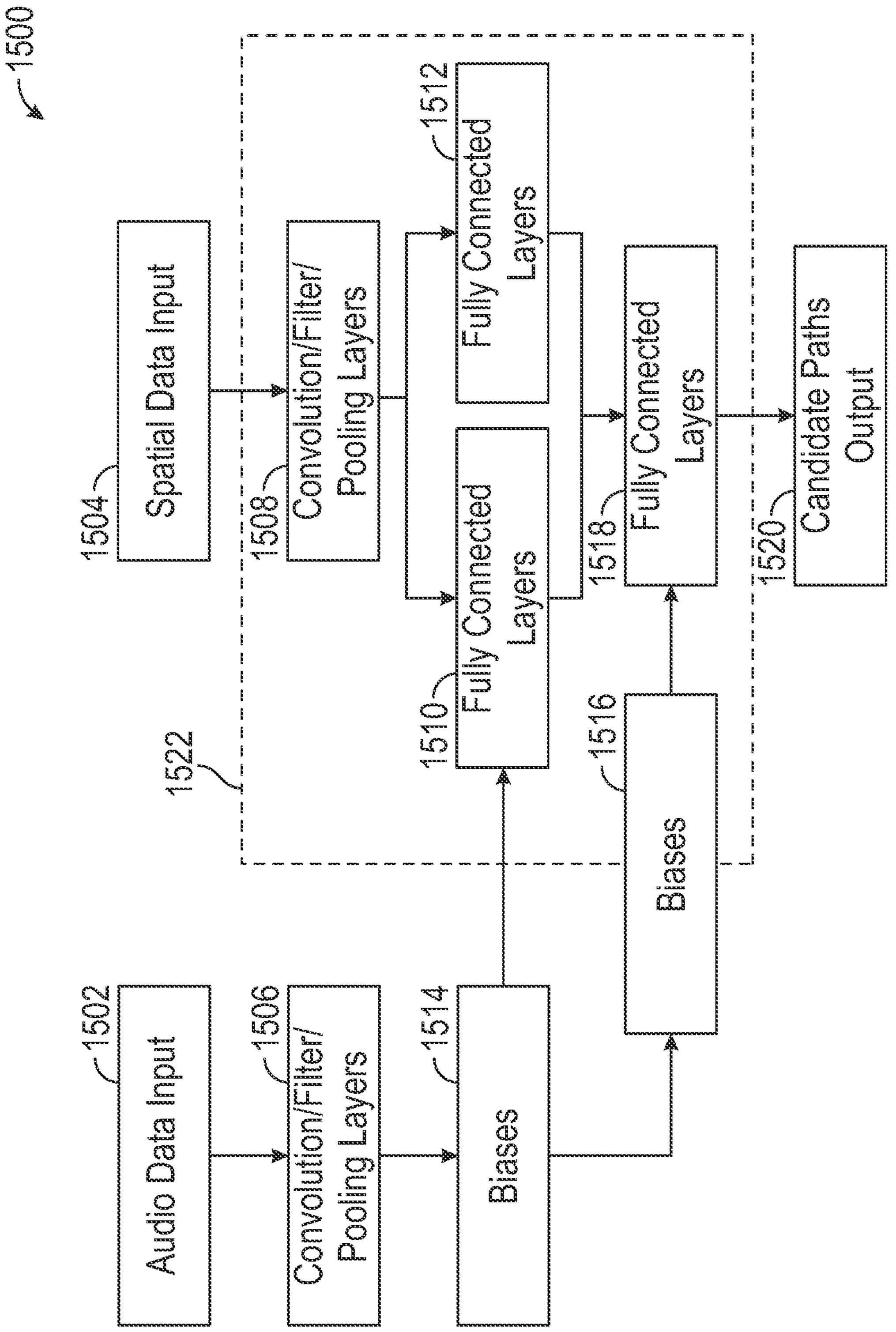
FIG. 15A illustrates an overview of an example conceptual diagram for a machine learning model with which a vehicle path having a reduced audio signature may be generated according to aspects described herein.

Accordingly, FIG. 15A illustrates an overview of an example conceptual diagram for a machine learning model 1500 with which a vehicle path having a reduced audio signature may be generated according to aspects described herein. Thus, audio considerations may influence path planning, such that a first path having a reduced audio signature may be prioritized over a second path having a higher audio signature (e.g., the first path may have a lower associated cost as compared to the second path as a result of an associated audio component).

In examples, spatial data 1504 associated with an environment (e.g., including image data, LIDAR data, and/or RADAR data, as may be obtained by a sensors of a vehicle and/or a teleoperation system) is processed using neural network 1522 (e.g., a convolutional neural network, including layers 1508, 1510, 1512, and 1518) to generate candidate paths 1520 with which to traverse the environment. Thus, as illustrated, spatial data 1504 is provided as input to a base layer (e.g., layer 1508), though at least some of the spatial data may additionally, or alternatively, be provided as input to any of a variety of other layers.

In addition to spatial data, audio data may be incorporated into neural network 1522 (e.g., during the training phase), such that associated audio features are combined with spatial features when identifying and classifying larger path features. As illustrated, audio data input 1502 is processed by convolution/filter/pooling layers 1506, thereby extracting features from the audio data accordingly. The audio data may correspond to spatial data input 1504, as may be the case when the spatial data includes a video track having an associated audio track, among other examples. For example, the audio data may be associated with vehicle noise and/or environmental noise (e.g., during normal vehicle operation and during instances having increased noise, as may be the case when climbing a hill or traversing uneven rocks). As another example, vibration data (e.g., from an IMU) may additionally, or alternatively, be provided as audio data.

Accordingly, biases 1514 and 1516 are incorporated into fully connected layers 1510 and 1518, respectively, thereby bypassing convolution/filter/pooling layers 1508 (e.g., where features are extracted from spatial data, rather than audio data). In some examples, biases 1514 may be associated with one-dimensional or two-dimensional audio data, while biases 1516 may be associated with two-dimensional audio data. Neural network 1522 may be trained separately from layers 1506 or, as another example, both branches 1506 and 1522 of machine learning model 1500 may be trained contemporaneously. While machine learning model 1500 is illustrated as an example where audio data input is used to bias neural network 1522 at layers 1510 and layers 1518, it will be appreciated that, in other examples, biasing may occur at one of layers 1510 or 1518, or at any of a variety of other layers.

As a result, higher levels of the machine learning model may learn that certain features of the spatial data are likely to have higher levels of associated noise, which may thus yield an increased penalty in a cost map from which a path is generated. The inclusion of an associated audio penalty (e.g., during model training) may therefore ultimately influence path generation to favor or otherwise prioritize a path having a predicted decrease in an associated audio signature (e.g., thus reducing the overall magnitude of noise or lowering the frequency of associated audio, among other examples). Since the trained model can include spatial feature recognition that may have little to no correlation with audio input data (e.g., using layers 1512 and 1518), a cost map may be generated that permits path planning to ignore or to follow the influence of audio dynamically in operation.

A resulting machine learning model may be used for path generation across a variety of vehicles or, as another example, may be associated with a specific type of vehicle (e.g., for an electric vs. internal combustion engine vehicle or for a vehicle having wheels vs. tracks). In some instances, a vehicle may generate a path without regard or with a reduced regard for an associated audio signature in a first operating mode, while the audio-aware aspects described above may be used in a second operating mode (e.g., as part of a "stealth" operating mode or to intentionally take a comparatively more noisy path to attract attention).

Additional examples of discreet path planning are disclosed in U.S. Pat. No. 10,520,327, issued on Dec. 31, 2019, titled "System and Method for Generating Tactical Routes," the entire disclosure of which is expressly incorporated herein by reference for all purposes.

Vehicle-to-Vehicle Thermal Model Induction

In examples, a thermal signature of a vehicle is determined using a set of sensors with which a set of temperatures corresponding to vehicle components is obtained and processed to generate the vehicle's thermal signature accordingly. However, the inclusion of these and/or other sensing systems with which such a vehicle thermal signature is determined may increase vehicle cost and/or complexity.

Figure 15B:
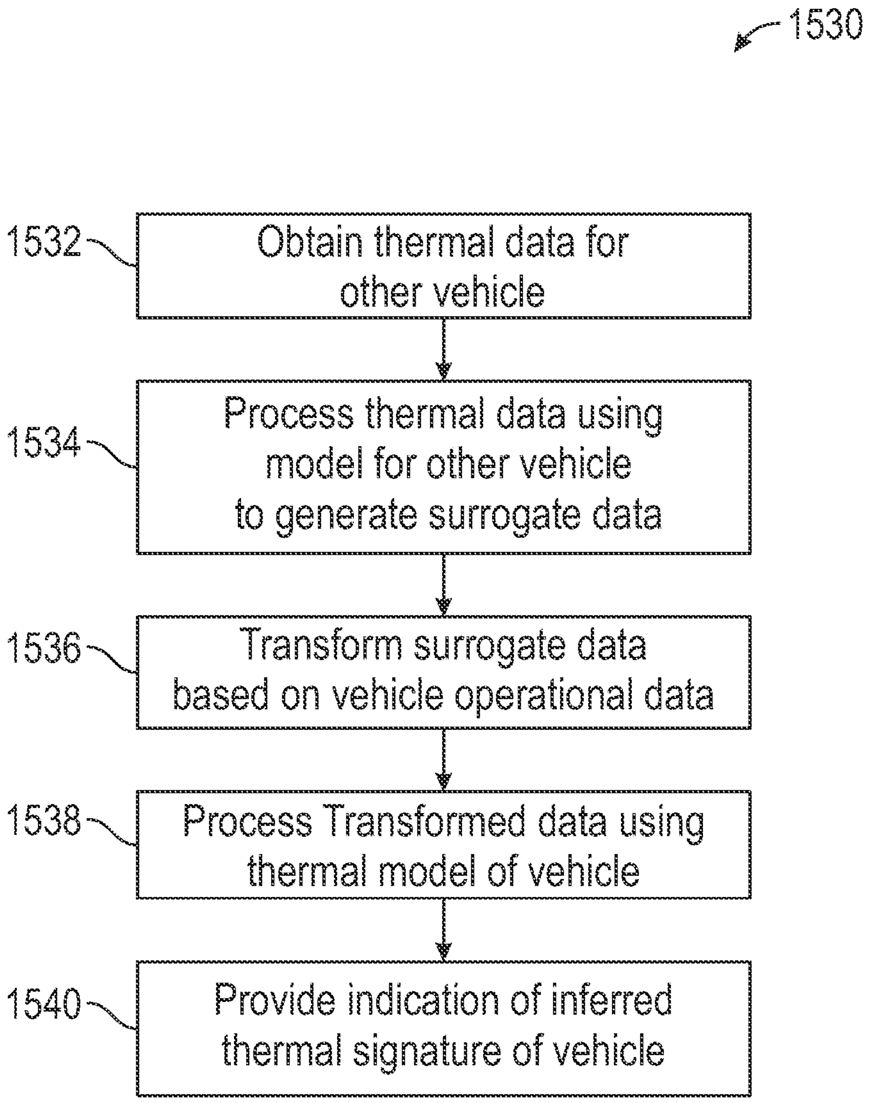
FIG. 15B illustrates an overview of an example method for generating an inferred thermal signature for a vehicle according to aspects described herein.

Accordingly, FIG. 15B illustrates an overview of an example method 1530 for generating an inferred thermal signature for a vehicle according to aspects described herein. In examples, method 1530 processes thermal data for another vehicle (e.g., with which the vehicle is traveling) to generate the inferred thermal signature, thereby reducing the extent to which on-vehicle sensors are used to monitor the thermal signature of the vehicle and/or control operation of the vehicle accordingly, which may reduce the cost and/or complexity of the vehicle accordingly.

Method 1530 begins at operation 1532, where thermal data is obtained for another vehicle. In examples, the thermal data is obtained using a thermal camera of the vehicle and/or from another data source (e.g., a teleoperation system, a drone, or a vehicle of a fleet of vehicles that includes a thermal camera). The thermal data may include one or more perspectives of the other vehicle, thereby indicating a set of temperatures that each correspond to various regions of the other vehicle accordingly. In examples, the provided thermal data is matched to a spatial location of the other vehicle, which may be accomplished via image processing, object recognition, and/or based on LIDAR data, among other examples.

Flow progresses to operation 1534, where the thermal data is processed using a model for the other vehicle to generate surrogate data based on the other vehicle accordingly. In examples, the model is obtained from the other vehicle or from a model store (e.g., local to the vehicle or from a remote data source). In some examples, the vehicle performing aspects of method 1530 may be equipped with one or more vehicle models that correspond to vehicles with which the vehicle has traveled and/or is likely to be traveling. In examples, such a model accounts for various system temperatures, exposed body temperatures over varying conditions, thermal properties (e.g., conductivity, emissivity) of one or more vehicle body panels, and/or a flow rate therein, such that thermal data for the other vehicle is transformed into surrogate data that indicates one or more estimated internal temperatures and/or other attributes for the other vehicle.

At operation 1536, the surrogate data is transformed from data that corresponds to the other vehicle to data that corresponds to the instant vehicle. For example, vehicle operational data may be obtained for the instant vehicle and the other vehicle (e.g., from the other vehicle itself, as may be determined by the instant vehicle, and/or from any of a variety of other sources), such that differences and/or similarities between operation of the other vehicle and the instant vehicle may be identified and used to transform the surrogate data accordingly. For instance, such processing accounts for situational differences between the vehicles, including, but not limited to, throttle differences, steering differences, braking differences, gear/speed differences, and/or route/terrain differences (e.g., present and/or historical), among other examples. Thus, at least some of the vehicle operational data may be data that would otherwise be processed or otherwise obtained by a vehicle controller, thereby potentially reducing the extent to which additional sensors are used to determine a vehicle's thermal signature. Accordingly, the surrogate data corresponding to the other vehicle is adapted to the instant vehicle at operation 1536 to account for operational differences between the vehicles that may result in additional or reduced heat generation by the instant vehicle as compared to the other vehicle.

At operation 1538, the transformed data is processed using a thermal model for the instant vehicle to generate an inferred thermal signature for the vehicle accordingly. In examples, the model that is applied at operation 1538 is similar to the model that was applied at operation 1534 (e.g., relating internal temperatures and other attributes of the vehicle to exposed body temperatures of one or more vehicle panels), but it relates to the instant vehicle and is applied in reverse (e.g., generating one or more panel temperatures based on the transformed data rather than generating surrogate data based on the obtained thermal data, as discussed above with respect to operation 1534).

Method 1530 progresses to operation 1540, where an indication of the inferred thermal signature is provided, for example for display to a vehicle operator (e.g., in an operator area or via teleoperation). It will be appreciated that any of a variety of alternative or additional actions may be performed in other examples, for example to adapt vehicle functionality based on the inferred thermal signature (e.g., to increase or decrease a power limit and/or to change a route of the vehicle to affect a change in the vehicle's thermal signature accordingly). As illustrated, method 1530 terminates at operation 1540.

Autonomous Payload Routing

In examples, a payload limit of a vehicle is determined based on stress that may be endured by a vehicle in a variety of scenarios. Thus, such a payload limit may be fairly conservative in certain scenarios (e.g., those that are comparatively less demanding/taxing on the vehicle). However, it may be possible to plan and/or manage the forces to which a vehicle is subjected, such that the vehicle may transport a payload that exceeds such a payload limit without damaging the vehicle. For instance, if a path between a starting location and an ending location is known, a payload limit may be calculated accordingly and/or a speed with which the path is traveled may be managed so as to manage the forces to which the vehicle is subjected while transporting the payload.

Figure 15C:
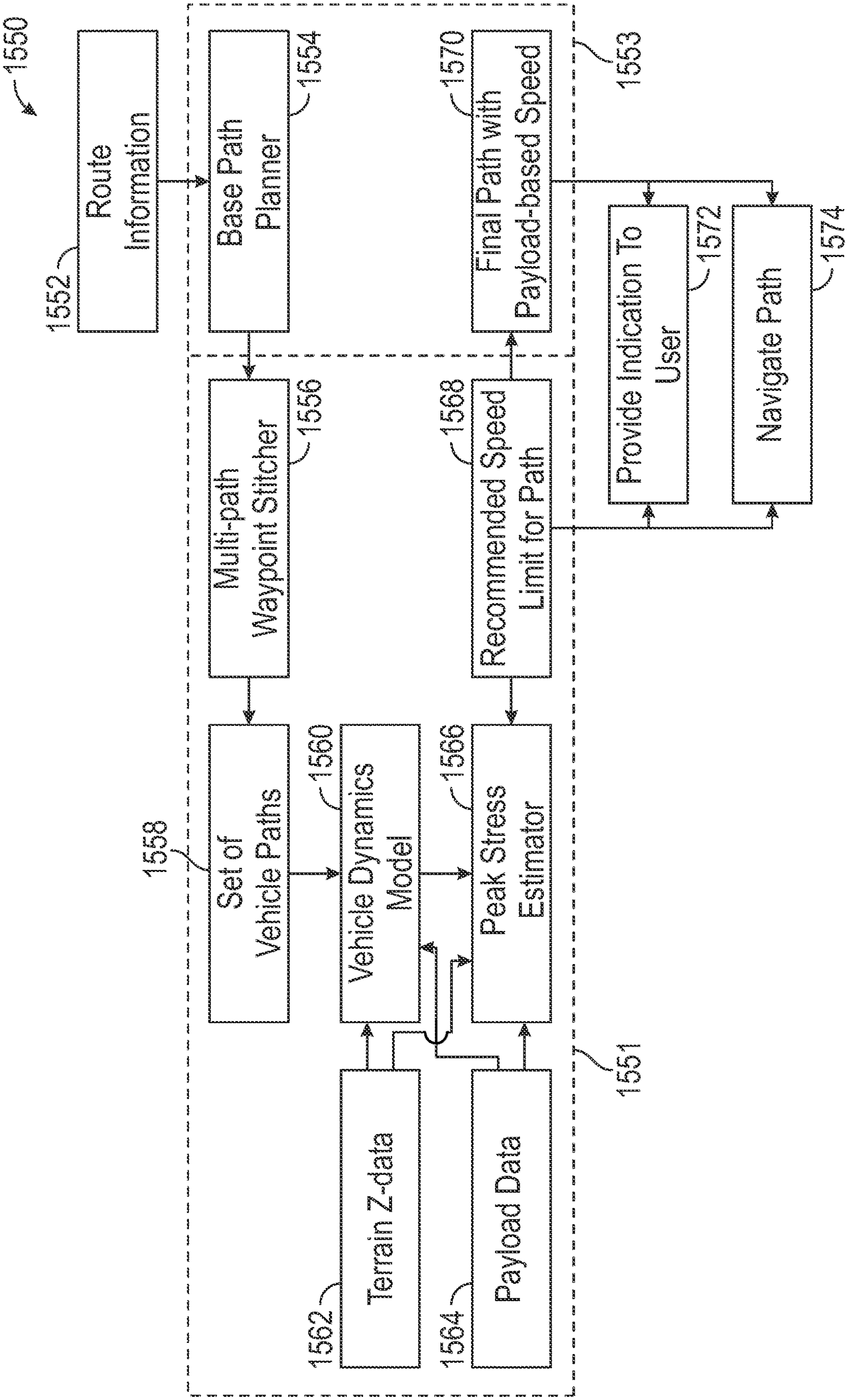
FIG. 15C illustrates an overview of an example conceptual diagram for a model with which a speed limit and/or vehicle path is generated for a given payload according to aspects described herein.

Thus, FIG. 15C illustrates an overview of an example conceptual diagram 1550 for a model with which a speed limit and/or vehicle path is generated for a given payload according to aspects described herein. As illustrated, route information 1552 is used to generate a route according to aspects described herein. As an example, route information 1552 includes a base cost map for a set of route segments (e.g., between waypoints) within an environment, where one or more sets of route segments may thus form a path between a starting location and an ending location. Thus, base path planner 1554 generates one or more sets of route segments between the starting location and the ending location based on route information 1552, such that multi-path waypoint stitcher 1556 generates a path for each set of route segments accordingly, thereby yielding the set of vehicle paths 1558.

For each of the candidate vehicle paths, vehicle dynamics model 1560 processes terrain Z-data 1562 (e.g., as may be obtained from on-vehicle sensors, a teleoperation assembly, and/or another data source, such as a stationary system, another vehicle, and/or a drone) and payload data 1564 (e.g., as may be user-provided and/or determined by one or more vehicle sensors according to aspects described herein) to predict future vehicle kinematics along a given candidate vehicle path. As an example, terrain Z-data includes from historical and/or real-time RADAR/LIDAR data from one or more data sources. For instance, vehicle dynamics model 1560 may include a stress model of the vehicle (e.g., for key components and/or chassis points) based on the terrain (e.g., from terrain Z-data 1562) and/or estimated vehicle characteristics (e.g., speed/gear, turn angle, and/or braking force). Similarly, peak stress estimator 1566 processes terrain Z-data 1562 and payload data 1564 to generate one or more peak stress metrics for the vehicle (e.g., key components and/or chassis points).

It will be appreciated that the processing described herein associated with vehicle dynamics model 1560 and peak stress estimator 1566 is in contrast to vehicle stability processing, where the objective is only to maintain vehicle stability (e.g., driving in an intended direction while maintaining traction). In examples, the processing performed by vehicle dynamics model 1560 and peak stress estimator 1566 includes a factor over a threshold value, such that even in instances where estimated kinematics and/or stresses exceed an estimated value, the vehicle is still subjected to forces below a point of failure. In examples, the factor is dynamically determined, for example based on terrain uncertainty (e.g., a boulder field versus a gravel road) and/or data granularity (e.g., as may be linked to one or more system capabilities and/or corresponding performance at varying vehicle speeds).

Accordingly, a recommended speed 1568 is determined for each path, such that final path 1570 is generated, which is determined according to the payload-based speed routing techniques described herein. In examples, final path 1570 is determined based on which path of the candidate vehicle paths has the net shortest transit time while adjusting constituent waypoint target speeds (e.g., along each route segment) to prevent damage to the vehicle (e.g., based on terrain Z-data 1562 and payload data 1564).

Accordingly, an indication of the route is provided to a user at operation 1572 (e.g., via an operator interface and/or in a teleoperation scenario) and/or the vehicle is caused to navigate the generated path (e.g., by a movement controller, such as movement controller 220 in FIG. 2). It will be appreciated that any of a variety of additional or alternative objectives may be included, such as the shortest travel distance while preventing vehicle damage and/or the flattest terrain, among other examples. As another example, a user may specify a target transit time for the destination, such that a payload limit is generated that meets the indicated target transit time while avoiding vehicle damage.

In examples, terrain Z-data 1562 is known in advance or, as another example, terrain features are known to a defined distance, such that vehicle speed and tire placement is reactively managed as new and/or better terrain information is gained. In instances where terrain Z-data is delayed or is unavailable, vehicle speed may be reduced. Thus, aspects of diagram 1550 may be iteratively performed (e.g., while the vehicle is in transit) and/or may be performed prior to travel by the vehicle, among other examples. Further, in some examples, similar aspects may be included as a driver-assistance feature (e.g., to recommend a vehicle speed/path and/or to pre-emptively affect speed/path changes to avoid or reduce vehicle damage).

Annunciation of Vehicle Modes and Human/Vehicle Detection

When a vehicle is under autonomous or remote control (e.g., according to the teleoperation aspects described herein), it may be difficult for operators of other vehicles and/or bystanders to predict how the vehicle will behave (e.g., a direction of travel, whether the vehicle will turn, or whether the vehicle has even correctly identified the individual or other vehicle as an obstacle). Such difficulties are further exacerbated in instances where pre-existing "rules of the road" (which may offer some predictability) are not in force, as may be the case when a vehicle is operating off road. In such instances, a standoff distance may be used to account for such unpredictability. However, the need for a standoff distance may be reduced in instances where the vehicle is able to communicate its understanding of its surroundings (e.g., detected vehicles, individuals, and/or obstacles) and/or its operating instructions/intentions, among other examples.

Figure 16A:
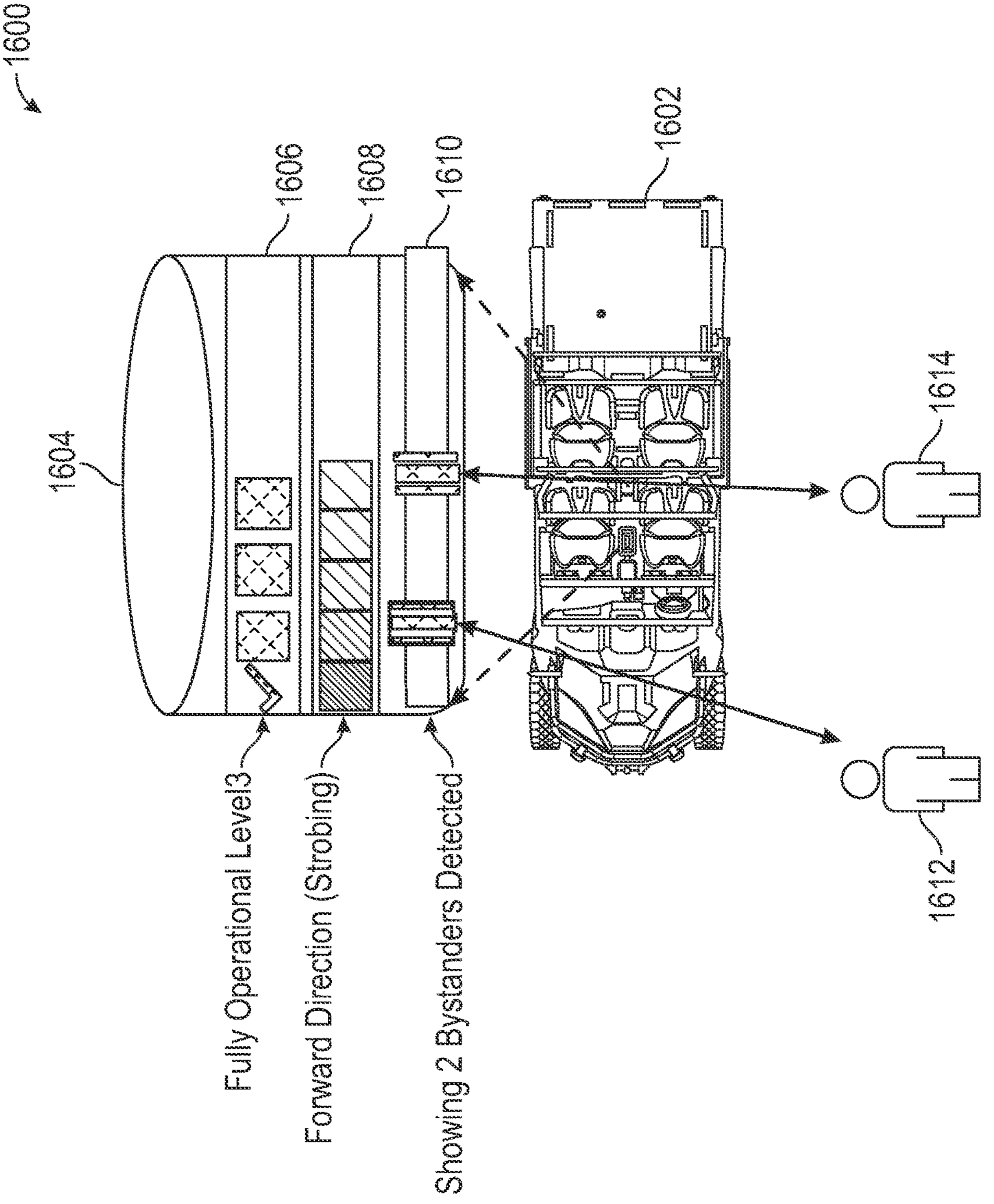
FIG. 16A illustrates an overview of an example system in which a vehicle provides indications of an operating mode and an understanding of its environment.

Accordingly, FIG. 16A illustrates an overview of an example system 1600 in which a vehicle provides an indication of an operating mode and an understanding of its environment (e.g., as may be generated by a vehicle controller, such as vehicle controller 202 in FIG. 2). As illustrated, vehicle 1602 includes display 1604, which includes operating mode subpart 1606, directional subpart 1608, and environment understanding subpart 1610. Display 1604 may include an array of light emitting diodes (LEDs) in the visible and/or infrared spectrum (e.g., in instances where visible light could be distracting or otherwise detrimental, as may be the case when hunting). As another example, one or more lasers or other projected light may be used to create a visual indication on a surface (e.g., within the environment proximate to the vehicle, on the ground, or on a wall). It will be appreciated that any of a variety of additional or alternative indications may be provided, for example including auditory indications. While display 1604 is illustrated as a central assembly, it will be appreciated that similar techniques may be used in instances where aspects of display 1604 are located at multiple locations of vehicle 1602 or includes vehicle lighting. In examples, operation of display 1604 is controlled using a set of CAN commands or using a wireless connection, among other examples.

Using operating mode subpart 1606, an operating mode of vehicle 1602 may be communicated to nearby individuals, vehicle operators, and/or vehicles. For example, operating mode subpart 1606 may comprise an indication whether vehicle 1602 is under manned operation, a level of manned autonomous operation, unmanned teleoperation, or a level of unmanned autonomous operation, among other examples. For example, varying operation modes and other indications presented by display 1604 may have associated flashing patterns, scrolling text, and/or multi-LED illumination to from basic shames (e.g., arrows, squares, and/or letters/words). In some instances, such indicators may be user-configurable.

Directional subpart 1608 may communicate navigational information (e.g., a vehicle intent), including an indication as to a maximum allowed speed and/or a direction of travel. For example, an array of LEDs may be controlled so as to provide a strobing pattern indicating a direction of travel, while the frequency with which the LEDs strobe is indicative of a maximum speed at which vehicle 1602 is currently configured to travel.

Environmental understanding subpart 1610 communicates information associated with the vehicle's current understanding of its environment. As illustrated, vehicle 1602 may be aware of individual 1612 and individual 1614, such that corresponding indicators are provided via environmental understanding subpart 1610. The location of such indicators displayed by environmental understanding subpart 1610 may correspond to the orientation of individuals 1612 and 1614 with respect to vehicle 1602 (e.g., an obstacle detected in front of vehicle 1602 may have a corresponding indicator toward the front of display subpart 1610, while an obstacle detected to the right of vehicle 1602 may have a corresponding indicator toward the right of display subpart 1610).

Bounded LIDAR Operation

In examples, a LIDAR solution emits near-IR (e.g., 900-1000 nm) light, which may be disruptive to night vision goggles and/or cameras, among other examples. Accordingly, the disclosed aspects may use another LIDAR solution that emits light in a different spectrum region (e.g., having a longer wavelength), such that operation of the near-IR LIDAR solution is selectively used (e.g., to supplement scanning by the other LIDAR solution). Such aspects may thus reduce or minimize the overall signature of the vehicle that results from such a near-IR LIDAR solution.

Figure 16B:
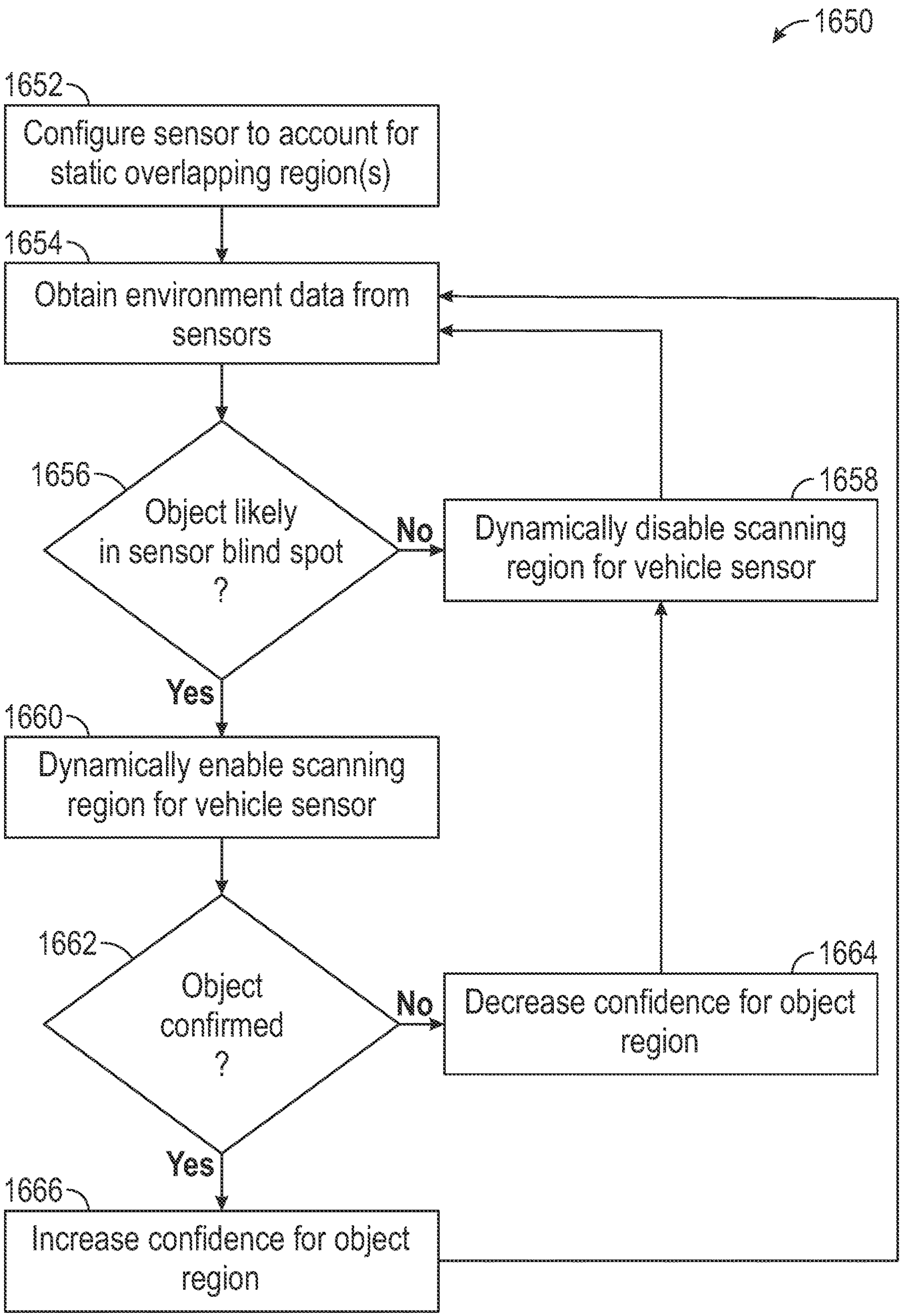
FIG. 16B illustrates an overview of an example method for managing vehicle sensors according to the environment of a vehicle.

Accordingly, FIG. 16B illustrates an overview of an example method 1650 for managing vehicle sensors according to the environment of a vehicle (e.g., as may be performed by a vehicle controller, such as vehicle controller 202 in FIG. 2). As illustrated, method 1650 starts at operation 1652, where a vehicle sensor is configured to account for one or more static overlapping regions. As an example, the vehicle includes a first LIDAR sensor configured for longer-range scanning as compared to a second LIDAR sensor. The first LIDAR sensor may operate in a spectrum region that is not readily observable by night vision goggles and/or cameras (e.g., having a longer wavelength), among other examples. Further, the first and second LIDAR sensors may be in a configuration such that they are capable of scanning one or more overlapping regions of the vehicle's environment. Thus, as a result of operation 1652, the second LIDAR sensor (e.g., the near-range sensor) may be configured to exclude scanning within the one or more overlapping regions. For instance, the second LIDAR sensor may be configured to scan only a region that is immediately in front of the vehicle, among other examples.

Flow progresses to operation 1654, where environment data is obtained from the first and second LIDAR sensors. As a result of operation 1652, the obtained data may be substantially non-overlapping (e.g., where the first sensor provides data in a first region farthest from the vehicle and the second sensor provides data in a second region that is closest to the vehicle).

At determination 1656, it is determined whether an object is likely present in a sensor blind spot. For instance, it may be determined whether an object is likely to be present in a region in which the second LIDAR sensor was configured to be disabled. In examples, determination 1656 comprises evaluating a trajectory of an object identified by the first sensor, such that it may be determined that, after a certain amount of time, the object would be detectable by the second sensor. As another example, determination 1656 additionally or alternatively comprises determining whether a confidence level of an object identified by the first sensor is beneath a threshold, such that the second LIDAR sensor may be used to confirm the presence of the object accordingly.

If it is determined that an object is likely not in the blind spot of the first LIDAR sensor, flow branches "NO' to operation 1658, where the scanning region is dynamically disabled for the second LIDAR sensor, thereby reducing the vehicle footprint that is attributable to scanning by the second LIDAR sensor. In such an example, additional scanning by the second LIDAR sensor is not needed, as the first LIDAR sensor is supplying sufficient data (e.g., with which to navigate). Flow then returns to operation 1654, such that method 1650 loops to dynamically disable and/or enable regions of the vehicle sensors according to aspects described herein.

If, however, it is instead determined that an object is likely in the blind spot of the first LIDAR sensor, flow branches "YES" to operation 1660, where the scanning region is dynamically enabled, such that additional environment data is obtained from the second LIDAR sensor accordingly. As such, at determination 1662, it is determined whether the presence of an object is confirmed based on the additional environment data. Determination 1662 is provided as an example and, in other examples, any of a variety of additional or alternative determinations may be made. For example, an object type may additionally or alternatively be confirmed.

If it is determined that an object is not present, flow branches "NO" to operation 1664, where a confidence in the region is decreased, and to operation 1658, where the corresponding scanning region is once again disabled. Thus, if the additional environment data indicates an object is not present, the second LIDAR sensor is again configured to exclude the region, thereby reducing the associated footprint of the vehicle.

If, however, it is determined that an object is present, flow branches "YES" to operation, where the confidence corresponding to the object is increased. Flow thus returns to operation 1654, such that method 1650 is used to dynamically change the regions that are scanned by the second LIDAR sensor based on environment data from the first LIDAR sensor. While examples are described with respect to the presence/absence of objects, it will be appreciated that any of a variety of alternative or additional data may be used to control operation of the LIDAR sensors, for example based on proximity to others and/or geographic location, among other examples. Further, while examples are described with respect to LIDAR sensors, similar techniques may be used to control a variety of other sensors having corresponding emissions, as may be desirable to reduce in instances when they offer little or no benefit (e.g., to vehicle operation).

ASIL D CAN-Controlled Smart Rugged Relay

The growing prevalence of advanced driver-assistance systems (ADAS) and related by-wire control of a vehicle may result in increased demand for power management subsystems that have increased reliability so as to satisfy overall functional safety requirements (e.g., Automotive Safety Integrity Level D or "ASIL D").

Figure 17:
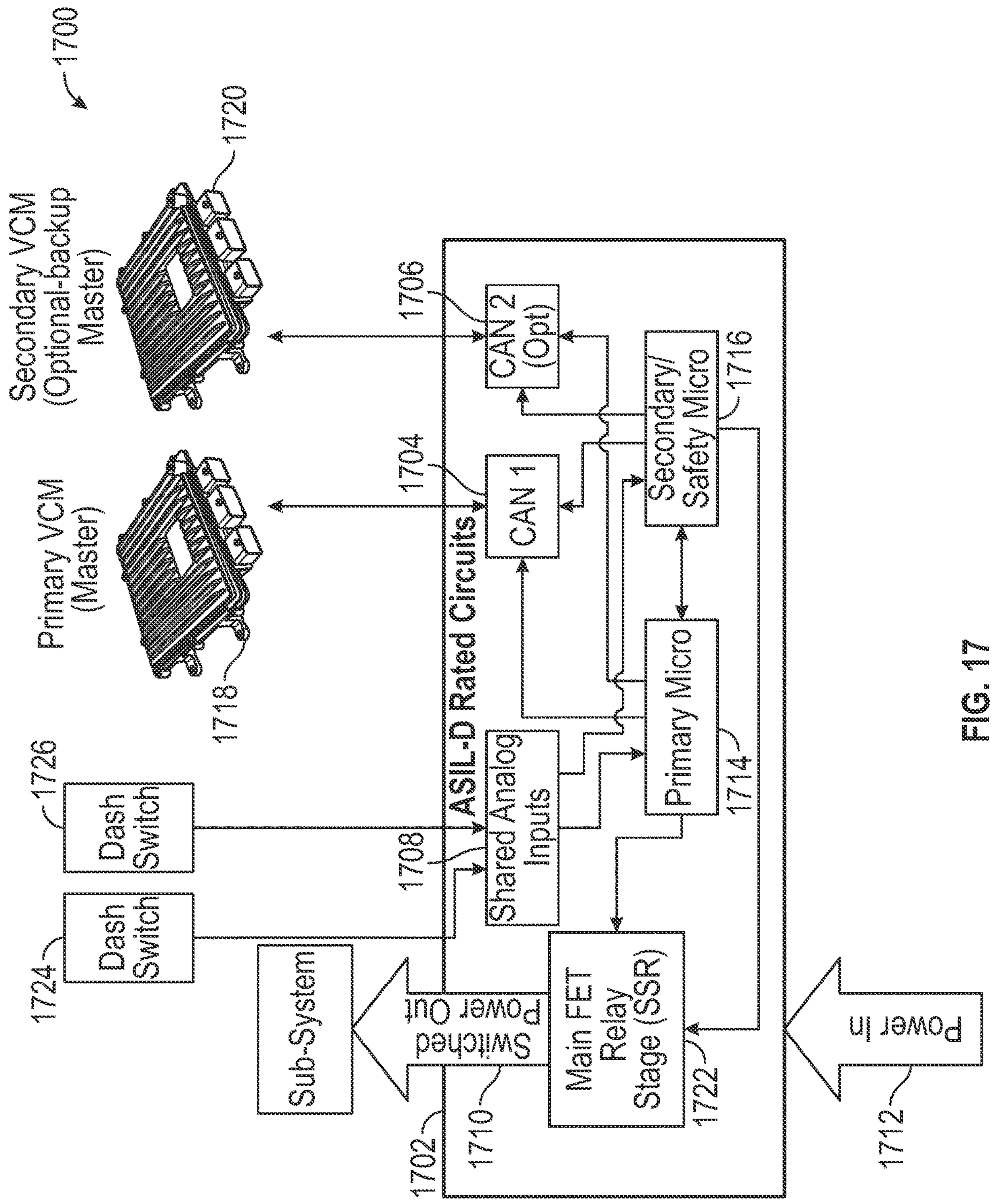
FIG. 17 illustrates an overview of an example system in which an ASIL-rated smart relay is used in conjunction with other subsystems to satisfy functional safety requirements according to aspects described herein.

Accordingly, FIG. 17 illustrates an example system 1700 in which ASIL-rated smart relay 1702 is used to satisfy functional safety requirements according to aspects described herein. As illustrated, smart relay 1702 may receive CAN commands (e.g., via CAN transceiver 1704 and CAN transceiver 1706) and other circuit inputs (e.g., via shared analog inputs 1708) to determine output power control 1710 from power in 1712, thus allowing use of off-the-shelf subsystems that need not meet functional safety requirements.

As illustrated, smart relay 1702 may be configured for low-voltage (e.g., 12 V) or high-voltage (e.g., 48V to 450V) power control. Smart relay 1702 may have an ASIL-rated dual microcontroller configuration (e.g., comprising primary microcontroller 1714 and secondary microcontroller 1716) with dual CAN transceivers 1704, 1706. As an example, secondary CAN transceiver 1706 may be used in instances where redundant master controllers (e.g., controllers 1718 and 1720) are present. Thus, because relay power control of smart relay 1702 is managed by main FET stage 1722, it is extremely reliable (e.g., conforming to the associated safety level) under substantially all vehicle conditions.

Additionally, smart relay 1702 further includes multiple analog inputs 1708 that may come from backup dash switches 1724 and 1726 for continued de-rated operation as needed (e.g., as may result from a failure of controller 1718 and/or 1720). In examples where CAN communication is the normal ON/OFF control method for smart relay 1702, smart relay 1702 may fall back to secondary ON/OFF control via analog inputs 1708. Additionally, relays of smart relay 1702 may default to OFF in instances where there is a failure. Further, internal diagnostic information may be transmitted via CAN transceiver 1704 and/or 1706 or using an optional digital output pin (not pictured).

In examples, CAN control of smart relay 1702 may provide improved reliability as compared to a digital or analog connection, due to the error detection abilities of the CAN protocol, as well as the use of request/response keys and a high speed bus for timely decisions. Additionally, power interruptions may be detected by microcontroller 1714 and/or 1716, such that output power may be (re) enabled using a specific sequence from controller 1718 and/or 1720.

While an example configuration is illustrated and described with respect to system 1700, it will be appreciated that any of a variety of similar configurations may be used to achieve improved safety characteristics using an ASIL-rated smart relay in combination with a set of components that need not themselves be ASIL-rated.

The following clauses illustrate example subject matter described herein.

1. A vehicle, comprising: a plurality of ground engaging members; a frame supported by the plurality of ground engaging members; a teleoperation assembly supported by a mast that is coupled to the frame of the vehicle, the teleoperation assembly configured to capture image data including the vehicle and at least a part of an environment of the vehicle; and a controller operably coupled the teleoperation assembly, the controller configured to: provide, to a remote computing device, image data of the teleoperation assembly; receive, from the remote computing device, a vehicle control command; and control operation of the vehicle based on the vehicle control command.

2. The vehicle of clause 1, wherein: the frame of the vehicle includes a hollow member that is configured to receive the mast in a retracted configuration; and the controller is configured to control a motor coupled to the frame of the vehicle to extend and retract the mast supporting the teleoperation assembly.

3. The vehicle of clause 1 or 2, wherein: the vehicle further comprises an electromechanical dampener supported by the frame of the vehicle, wherein the electromechanical dampener is configured to adjust a tension of a cable coupling the teleoperation assembly to the vehicle; and the controller is further configured to control the electromechanical dampener based on sensor data of the vehicle to mechanically stabilize the image data of the teleoperation assembly.

4. The vehicle of any one of clauses 1-3, wherein the controller is further configured to: process the image data of the teleoperation assembly; and provide an indication of the processing via an operator interface in an operator area of the vehicle.

5. The vehicle of any one of clauses 1-4, wherein the controller is further configured to: process the image data of the teleoperation assembly to identify a change associated with contents of the vehicle; and generate an indication of the identified change, wherein the indication comprises a type of change, image data associated with the identified change, and a location associated with the identified change.

6. The vehicle of clause 5, wherein the indication is presented via an operator interface in an operator area of the vehicle.

7. The vehicle of clause 5, wherein the indication is provided to the remote computing device.

8. The vehicle of clause 5, wherein the identified change is one of: a change in position of an object or an individual; a newly identified object or individual; or a disappearance of an object or an individual.

9. A method for processing teleoperation data obtained from a vehicle, the method comprising: receiving, from the vehicle, teleoperation data including the vehicle and at least a part of an environment surrounding the vehicle; extracting, from the teleoperation data, a portion of the teleoperation data that is associated with the vehicle; processing the extracted portion of the teleoperation data to amplify movement of the vehicle, thereby generating an amplified representation of the vehicle; generating an amplified teleoperation view including the amplified representation of the vehicle and at least a part of the teleoperation data; and providing the amplified teleoperation view for display to a vehicle operator.

10. The method of clause 9, further comprising: identifying a gap in the amplified teleoperation view associated with a difference between the extracted portion of the teleoperation data and the amplified representation of the vehicle; and filling the identified gap based on the teleoperation data.

11. A method for configuring teleoperation of a vehicle according to communication latency, the method comprising: determining a communication latency, wherein the communication latency is a round-trip time between the vehicle and a remote computing device; generating a standoff metric based at least in part of the determined communication latency, wherein the standoff metric includes at least one of a standoff distance metric or a maximum velocity standoff metric; and configuring operation of the vehicle based on the generated standoff metric.

12. The method of clause 11, wherein the standoff metric is further generated based at least in part on a user reaction time, a vehicle reaction time, and a rate of deceleration for the vehicle.

13. The method of clause 11 or 12, further comprising providing an indication of the generated standoff metric to an individual associated with the vehicle.

14. A method for controlling vehicle operation according to a path of a ground-engaging member of a vehicle, the method comprising: localizing the vehicle within an associated environment to generate a location for the vehicle; generating, for each ground-engaging member of the vehicle, an estimated location of the ground-engaging member within the environment based on the generated location for the vehicle; and providing, to another vehicle, an indication comprising: data associated with the environment of the vehicle; and the estimated locations for ground-engaging members of the vehicle.

15. The method of clause 14, wherein the indication is a positive indication that the another vehicle is to follow a similar path or the indication is a negative indication that the another vehicle is follow a different path.

16. The method of clause 15, further comprising determining whether the indication is a positive indication or a negative indication based on at least one of explicit feedback from vehicle operator or implicit feedback associated with a state of the vehicle.

17. The method of any one of clauses 14-16, further comprising: obtaining thermal data corresponding to the another vehicle; processing the thermal data according to a model for the another vehicle and operational data for the another vehicle to generate a thermal signature for the vehicle; and performing at least one of: providing an indication of the generated thermal signature; or adapting vehicle operation based on the generated thermal signature.

18. A method for controlling vehicle operation according to a path of a ground-engaging member of a leader vehicle, the method comprising: receiving, from the leader vehicle, an indication comprising environment data and a set of ground-engaging member locations of the leader vehicle; localizing, based on the environment data of the leader vehicle, the vehicle within an associated environment to generate a location for the vehicle; generating, an estimated location of a ground-engaging member of the vehicle within the environment based on the generated location for the vehicle; generating, based on the estimated location of the ground-engaging member and a corresponding ground-engaging member location received from the leader vehicle, a vehicle command; and controlling operation of the vehicle based on the generated vehicle command.

19. The method of clause 18, further comprising: providing, to a follower vehicle, a positive indication based at least in part on the estimated location of the ground-engaging member of the vehicle and the corresponding ground-engaging member location that was received from the leader vehicle.

20. A method for controlling vehicle operation based on an estimated center of mass for a vehicle, the method comprising: determining, based on the one or more suspension position sensors, a two-dimensional (2D) center of mass (COM) location along a longitudinal axis and a lateral axis; collecting, during operation of the vehicle, a set of driving experiences, wherein each driving experience includes a force experienced by the vehicle and a set of suspension positions determined by one or more suspension position sensors of the vehicle; processing the set of driving experiences to determine a vertical component of the COM along a vertical axis of the vehicle, thereby generating a three-dimensional (3D) COM for the vehicle, wherein vertical component of the COM is determined based at least in part on a change in a roll angle for the vehicle sensed by the one or more suspension position sensors; and configuring operation of the vehicle based on the determined 3D COM.

21. The method of clause 20, wherein configuring operation of the vehicle comprises at least one of configuring a maximum velocity or configuring a maximum turning angle.

22. The method of clause 20 or 21, wherein the vehicle is configured according to a low-threshold rollover model prior to determination of the 3D COM.

23. The method of any one of clauses 20-22, wherein the set of driving experiences is collected as a result of a vehicle operator performing a set of instructions that were presented to the vehicle operator.

24. The method of any one of clauses 20-23, wherein the set of driving experiences is collected as a result of autonomous control of the vehicle performing a calibration sequence.

25. The method of any one of clause 20-24, further comprising: reverting, after a key-off event, to a low-threshold rollover model; determining an updated 3D COM for the vehicle; and configuring operation of the vehicle based on the updated 3D COM for the vehicle.

26. The method of any one of clauses 20-25, further comprising generating, based on a payload of the vehicle and a vehicle dynamics model, a route for the vehicle.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A vehicle, comprising:

a plurality of ground engaging members operable to engage a ground surface;

a frame supported by the plurality of ground engaging members;

an operator area comprising at least one seat supported by the frame, the at least one seat having a seat bottom;

a teleoperation assembly supported by a mast that is coupled to the frame of the vehicle, rearward of the operator area, wherein the teleoperation assembly is configured to capture image data including the vehicle and at least a part of an environment of the vehicle;

a motor coupled to the frame of the vehicle to extend and retract the mast supporting the teleoperation assembly, wherein the frame includes a hollow member with an opening adjacent to the motor, wherein the hollow member is configured to receive at least a part of the mast in a retracted configuration, and wherein in the retracted configuration at least one section of the part of the mast is positioned generally parallel to the ground surface; and a controller operably coupled to the teleoperation assembly, the controller configured to:

provide, to a remote computing device, image data of the teleoperation assembly;

receive, from the remote computing device, a vehicle control command;

control the motor; and control operation of the vehicle based on the vehicle control command.

2. The vehicle of claim 1, wherein:

the vehicle further comprises an electromechanical dampener supported by the frame of the vehicle, wherein the electromechanical dampener is configured to adjust a tension of a cable coupling the teleoperation assembly to the vehicle; and the controller is further configured to control the electromechanical dampener based on sensor data of the vehicle to mechanically stabilize the image data of the teleoperation assembly.

3. The vehicle of claim 1, wherein the controller is further configured to:

process the image data of the teleoperation assembly; and provide an indication of the processing via an operator interface in the operator area of the vehicle.

4. The vehicle of claim 1, wherein the controller is further configured to:

process the image data of the teleoperation assembly to identify a change associated with contents of the vehicle; and generate an indication of the identified change, wherein the indication comprises a type of change, image data associated with the identified change, and a location associated with the identified change.

5. The vehicle of claim 4, wherein the indication is at least one of:

presented via an operator interface in the operator area of the vehicle; or provided to the remote computing device.

6. The vehicle of claim 4, wherein the identified change is one of:

a change in position of an object or an individual;

a newly identified object or individual; or a disappearance of an object or an individual.

7. The vehicle of claim 1, wherein the hollow member is laterally offset from a longitudinal centerline of the vehicle.

8. A method for processing teleoperation data obtained from a vehicle, the method comprising:

receiving, from the vehicle, teleoperation data including the vehicle and at least a part of an environment surrounding the vehicle;

processing the teleoperation data to extract a portion of image data that corresponds to the vehicle;

processing the extracted image data to amplify data representing movement of the vehicle within the environment surrounding the vehicle as depicted by the teleoperation data, thereby generating an amplified representation of the vehicle according to the extracted portion of image data that corresponds to the vehicle;

generating an amplified teleoperation view including the amplified representation of the vehicle and at least a part of the teleoperation data that corresponds to the environment surrounding the vehicle;

providing the amplified teleoperation view for display to a vehicle operator; and controlling, based on an instruction received by the vehicle in response to the provided amplified teleoperation view, movement of the vehicle within the environment.

9. The method of claim 8, further comprising:

identifying a gap in the amplified teleoperation view associated with a difference between the extracted portion of the teleoperation data and the amplified representation of the vehicle; and filling the identified gap based on the teleoperation data.

10. The method of claim 8, further comprising:

determining a communication latency, wherein the communication latency is a round-trip time between the vehicle and a remote computing device;

generating a standoff metric based at least in part on the determined communication latency, wherein the standoff metric includes at least one of a standoff distance metric or a maximum velocity standoff metric; and configuring operation of the vehicle based on the generated standoff metric.

11. The method of claim 10, wherein the standoff metric is further generated based at least in part on a user reaction time, a vehicle reaction time, and a rate of deceleration for the vehicle.

12. A method for controlling vehicle operation according to a path of a ground-engaging member of a vehicle, the method comprising:

processing three-dimensional (3D) sensor data of the vehicle to localize the vehicle within an associated environment, thereby generating a 3D location for the vehicle;

generating, for each ground-engaging member of the vehicle, an estimated location of the ground-engaging member within the environment based on the generated 3D location for the vehicle within the environment;

transmitting, via radio communication to another vehicle, a first indication comprising data associated with localization of the vehicle within the environment of the vehicle, and the estimated locations for ground-engaging members of the vehicle;

receiving, from a leader vehicle, a second indication comprising environment data and a set of ground-engaging member locations of the leader vehicle;

generating, based on the estimated location of the ground-engaging member and a corresponding ground-engaging member location received from the leader vehicle, a vehicle command; and controlling operation of the vehicle based on the generated vehicle command.

13. The method of claim 12, wherein the first indication is a positive indication that the another vehicle is to follow a similar path or the first indication is a negative indication that the another vehicle is to follow a different path.

14. The method of claim 13, further comprising determining whether the first indication is a positive indication or a negative indication based on at least one of explicit feedback from the vehicle operator or implicit feedback associated with a state of the vehicle.

15. The method of claim 12, further comprising:

obtaining thermal data corresponding to the another vehicle;

processing the thermal data according to a model for the another vehicle and operational data for the another vehicle to generate a thermal signature for the vehicle; and performing at least one of:

providing an indication of the generated thermal signature; or adapting vehicle operation based on the generated thermal signature.

16. The method of claim 12, further comprising:

determining, based on one or more suspension position sensors, a two-dimensional (2D) center of mass (COM) location along a longitudinal axis and a lateral axis;

collecting, during operation of the vehicle, a set of driving experiences, wherein each driving experience includes a force experienced by the vehicle and a set of suspension positions determined by one or more suspension position sensors of the vehicle;

processing the set of driving experiences to determine a vertical component of the COM along a vertical axis of the vehicle, thereby generating a three-dimensional (3D) COM for the vehicle, wherein the vertical component of the COM is determined based at least in part on a change in a roll angle for the vehicle sensed by the one or more suspension position sensors; and configuring operation of the vehicle based on the determined 3D COM.

17. The method of claim 16, wherein:

configuring operation of the vehicle comprises at least one of configuring a maximum velocity or configuring a maximum turning angle; and the method further comprises generating, based on a payload of the vehicle and a vehicle dynamics model, a route for the vehicle.

18. The method of claim 16, wherein the set of driving experiences is collected as a result of at least one of:

a vehicle operator performing a set of instructions that were presented to the vehicle operator; or autonomous control of the vehicle performing a calibration sequence.

19. The method of claim 16, further comprising:

reverting, after a key-off event, to a low-threshold rollover model;

determining an updated 3D COM for the vehicle; and configuring operation of the vehicle based on the updated 3D COM for the vehicle.

* * * * *